(12) United States Patent
Shimizu et al.

(10) Patent No.: US 6,760,115 B2
(45) Date of Patent: Jul. 6, 2004

(54) CARRIER SHAPE MEASUREMENT DEVICE

(75) Inventors: Fusao Shimizu, Fujisawa (JP);
Atsuhiro Fujii, Itami (JP)

(73) Assignees: Nikon Corporation, Tokyo (JP);
Semiconductor Leading Edge Technologies, Inc., Kanagawa (JP)

( * ) Notice: Subject to any disclaimer, the term of this patent is extended or adjusted under 35 U.S.C. 154(b) by 388 days.

(21) Appl. No.: 09/863,512

(22) Filed: May 24, 2001

(65) Prior Publication Data

US 2001/0049880 A1 Dec. 13, 2001

(30) Foreign Application Priority Data

May 25, 2000 (JP) ........................................ 2000-155496

(51) Int. Cl.[7] .............................................. G01N 21/88
(52) U.S. Cl. .................... 356/601; 356/237.1
(58) Field of Search ............... 356/601, 237.1, 356/237.2, 237.5

(56) References Cited

U.S. PATENT DOCUMENTS

| | | | |
|---|---|---|---|
| 4,583,847 A | 4/1986 | Battig et al. | |
| 5,092,557 A | 3/1992 | Sawatzki | |
| 5,291,025 A | 3/1994 | Smith | |
| 5,798,532 A | 8/1998 | Linehan | |
| 5,822,213 A | * 10/1998 | Huynh | ....................... 700/213 |
| 5,929,766 A | 7/1999 | Rochet et al. | |
| 5,944,475 A | 8/1999 | Bonora et al. | |
| 6,432,849 B1 | * 8/2002 | Endo et al. | ................. 438/800 |
| 6,567,169 B1 | * 5/2003 | Schober | ....................... 356/399 |

FOREIGN PATENT DOCUMENTS

| | | |
|---|---|---|
| DE | 197 52 509 A1 | 7/1999 |
| EP | 0 387 164 A1 | 9/1990 |
| JP | 04 075361 | 3/1992 |
| JP | 11 297797 | 10/1999 |
| JP | 2001 189371 | 7/2001 |
| WO | WO 99 16121 | 4/1999 |

* cited by examiner

*Primary Examiner*—Richard A. Rosenberger
(74) *Attorney, Agent, or Firm*—Oliff & Berridge, PLC

(57) ABSTRACT

A carrier shape measurement device includes: a stage which supports a carrier which is to be a subject of measurement; and a measurement section which measures a shape of the carrier, and the stage comprises kinematic coupling pins to support the carrier by a kinematic coupling.

23 Claims, 43 Drawing Sheets

A-A' SECTIONAL VIEW

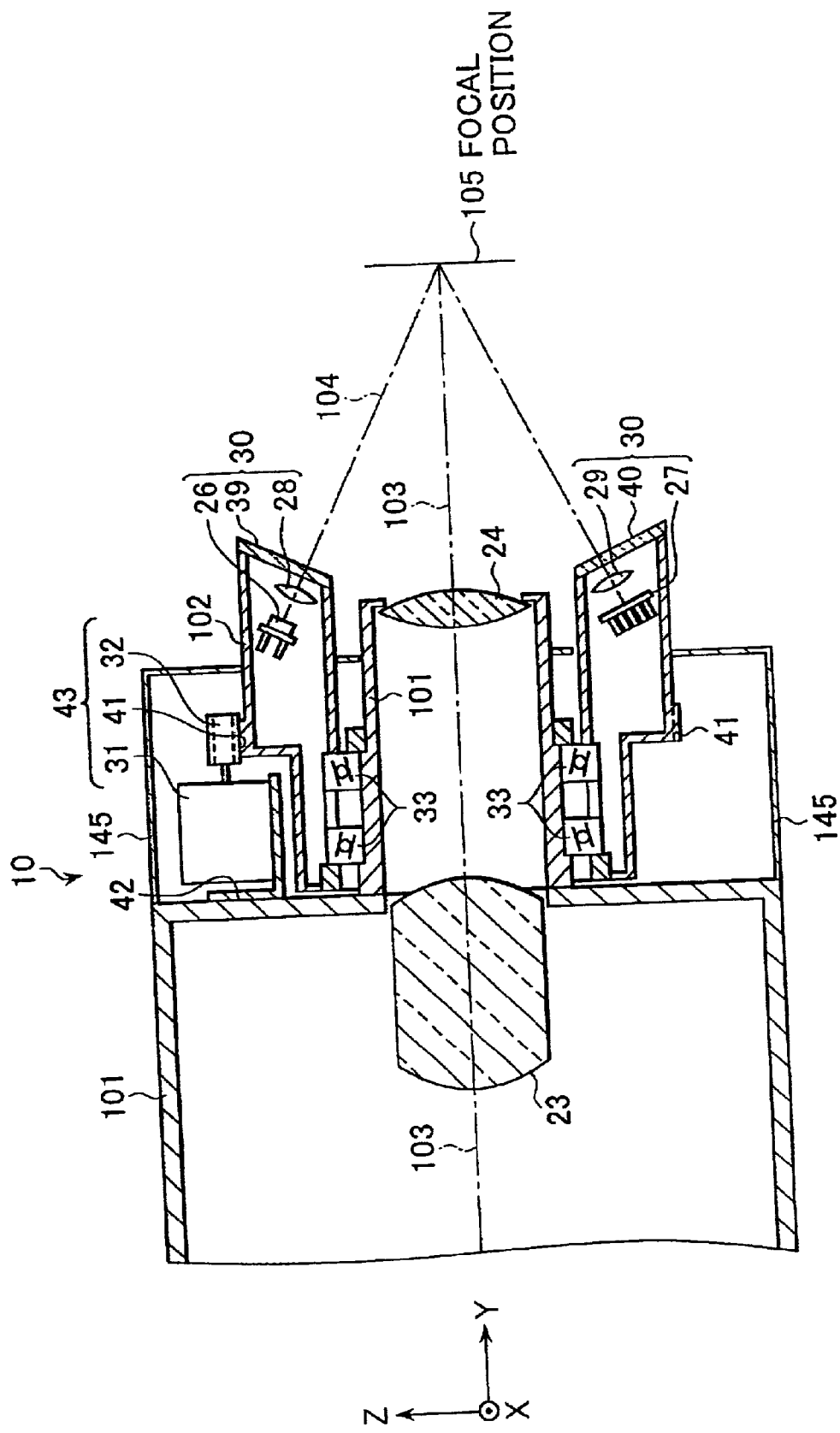

VERTICAL ORIENTATION

HORIZONTAL ORIENTATION

B-B' SECTIONAL VIEW

B-B' SECTIONAL VIEW
(WITH PRESSURE REDUCTION FAN 48 OPERATING)

A-A' SECTIONAL VIEW
(WITH PRESSURE REDUCTION FAN 48 OPERATING)

NORMAL

ABNORMAL

SECTION IN FACIAL DATUM PLANE 142

DURING MEASUREMENT OF CARRIER 18 FRONT SURFACE (xy PLANE)

DURING MEASUREMENT OF LEFT SURFACE (-yz PLANE)

DURING MEASUREMENT OF REAR SURFACE (-xz PLANE)

DURING MEASUREMENT OF RIGHT SURFACE (yz PLANE)

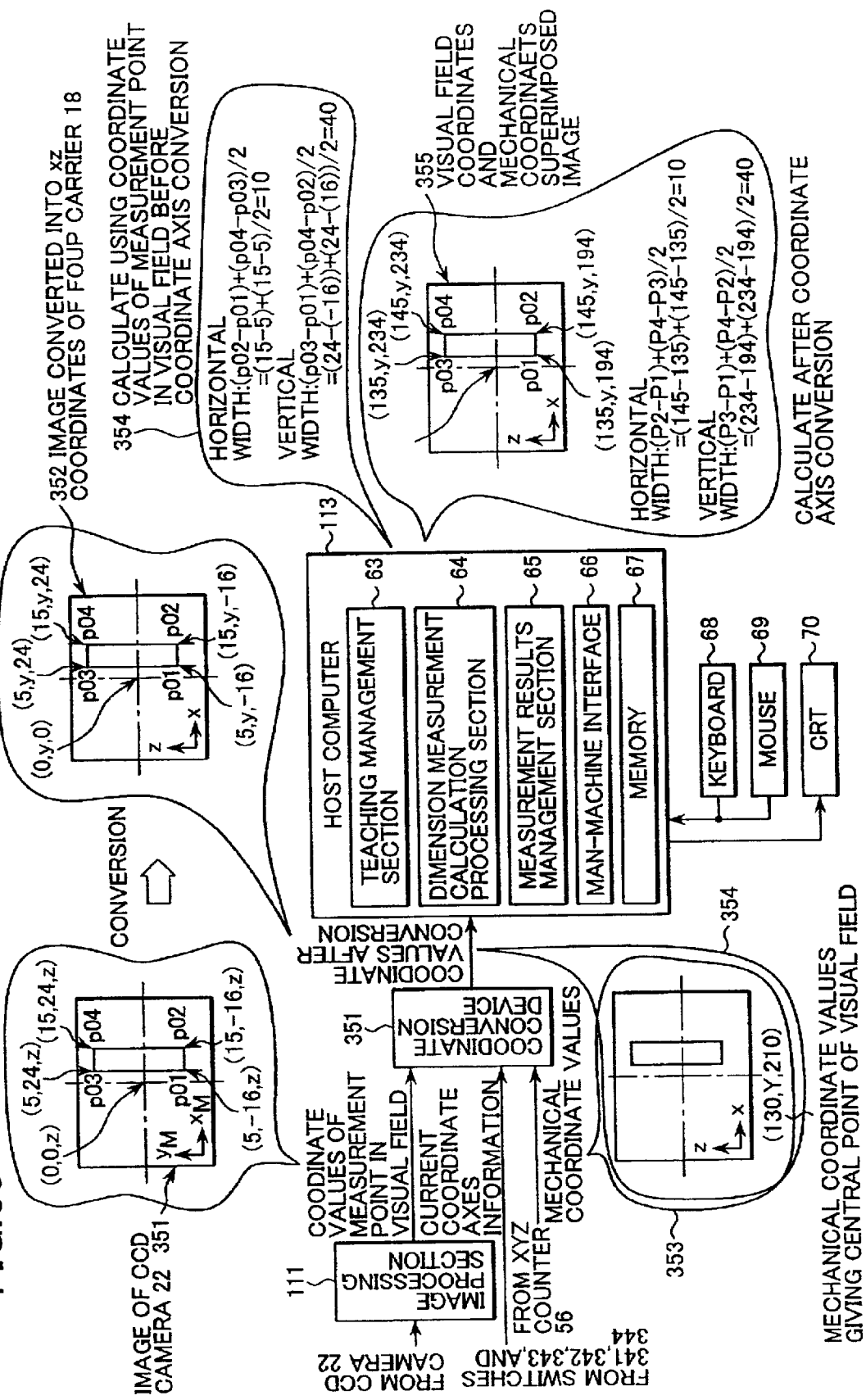

FIG.36A

| FOUP (PLATE) DIRECTION | DETECTION SWITCH | VISUAL FIELD COORDINATE SYSTEM | | | MECHANICAL COORDINATE SYSTEM | |
|---|---|---|---|---|---|---|
| | | ORIGINAL COORDINATES IN IMAGE FROM CCD CAMERA 22 | COORDINATES AFTER CONVERSION (SURFACE OF CARRIER 18 WHICH IS PHOTOGRAPHED) | COORDINATE VALUES FOR POINT P03 AFTER CONVERSION | ORIGINAL COORDINATES OF XYZ COUNTER 56 GIVING SURFACE FACING MEASUREMENT HEAD 10 | COORDINATES AFTER CONVERSION (SURFACE OF CARRIER 18 WHICH IS PHOTOGRAPHED) |
| FRONT SURFACE | SW 341 | $x_M, y_M$ (5,24,z) | xz | 5,y,24 | xz | xz |
| LEFT SURFACE | SW 342 | | -yz | x,-5,24 | | -yz |
| REAR SURFACE | SW 343 | | -xz | -5,y,24 | | -xz |
| RIGHT SURFACE | SW 344 | | yz | x,5,24 | | yz |

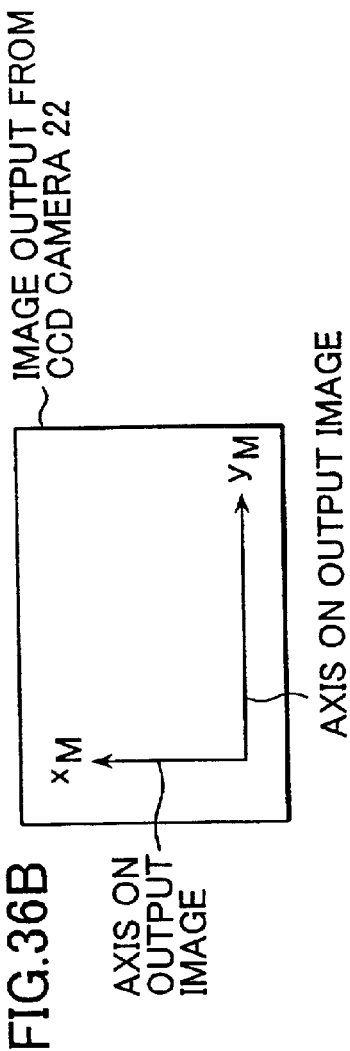

FIG.36B

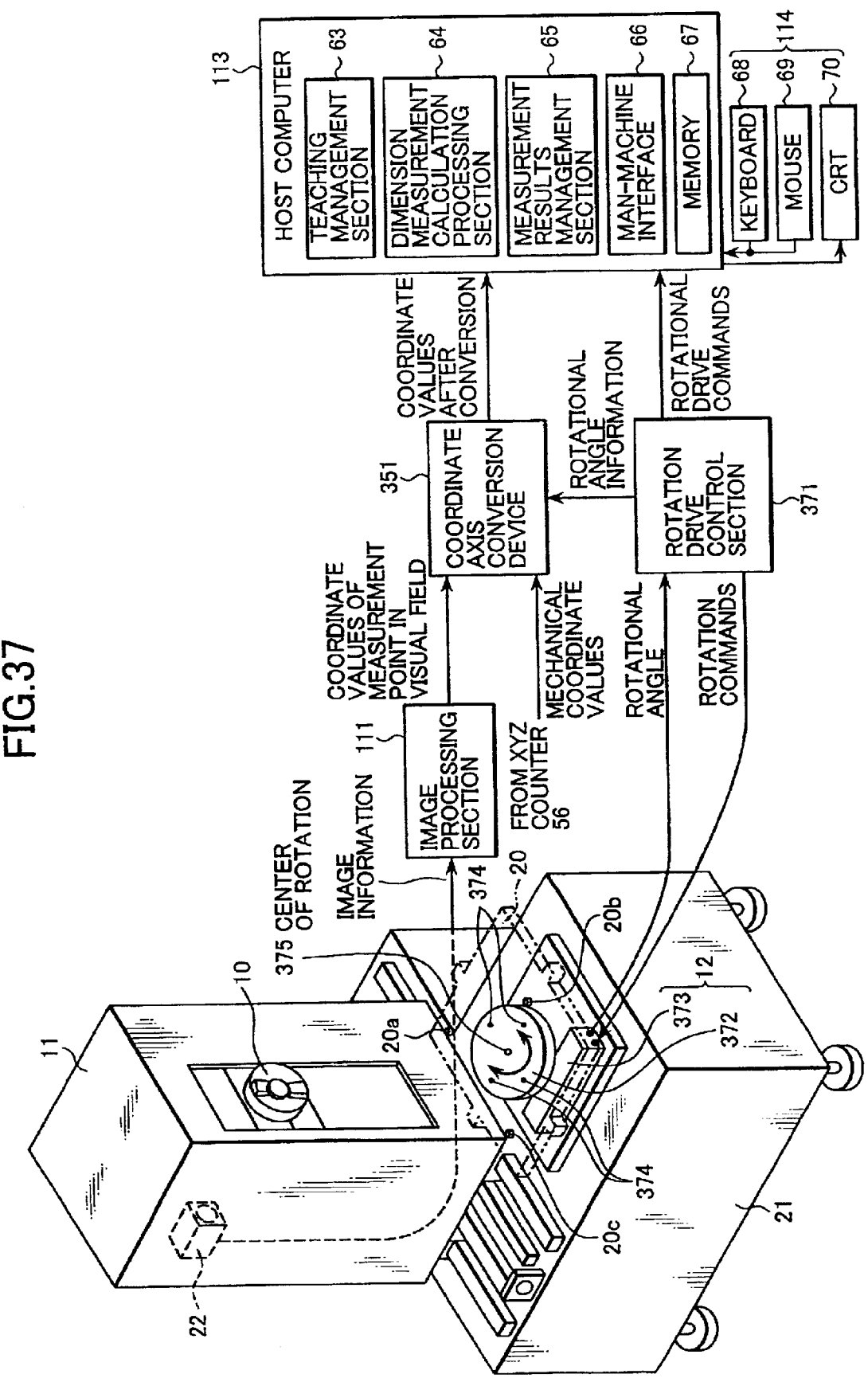

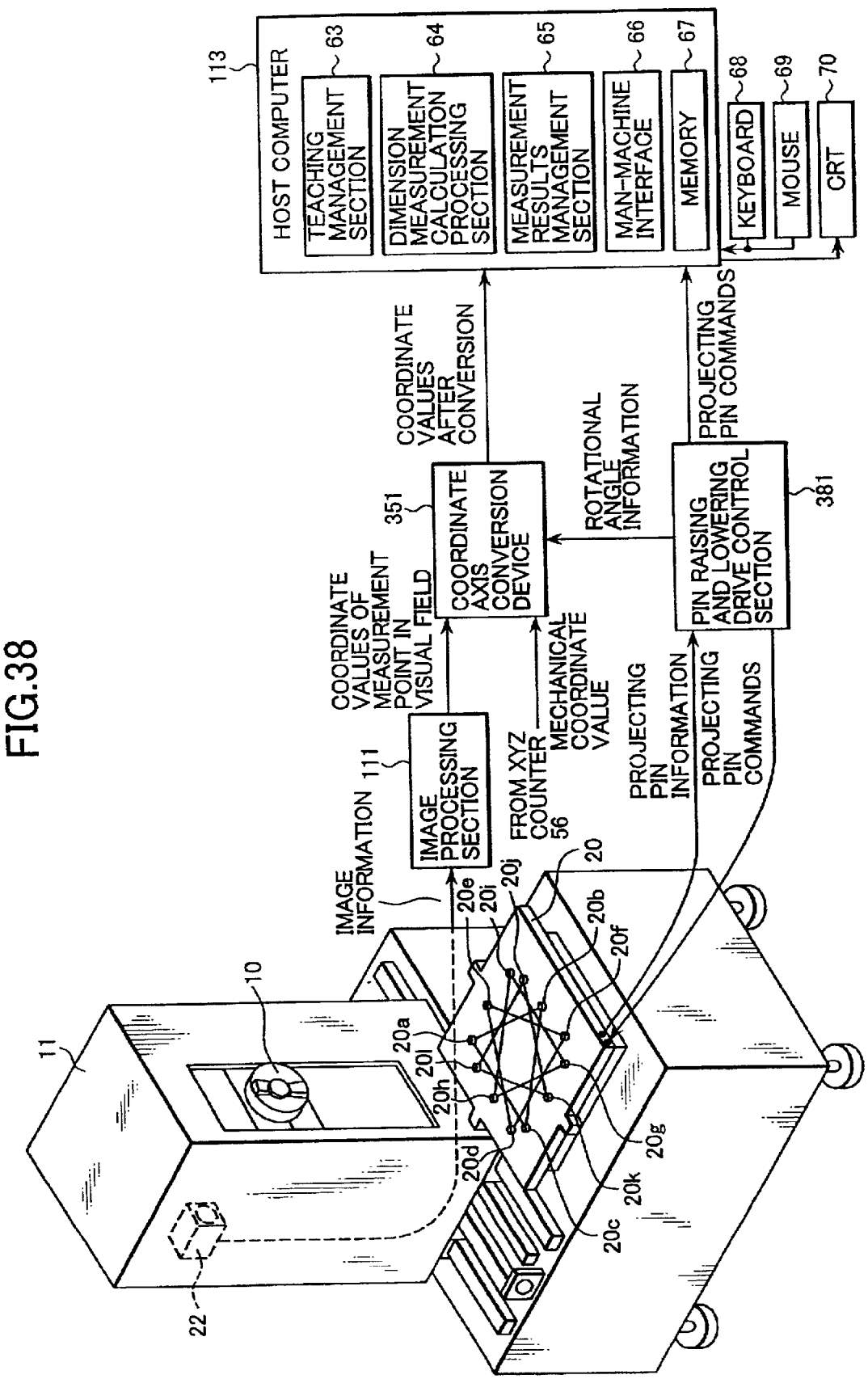

(WHEN HOUSED)

(WHEN PROJECTED)

CARRIER SHAPE MEASUREMENT DEVICE

INCORPORATION BY REFERENCE

The disclosure of the following priority application is herein incorporated by reference:

Japanese Patent Application No. 2000-155496, filed May 25, 2000.

BACKGROUND OF THE INVENTION

1. Field of the Invention

The present invention relates to a shape measurement device for an article whose shape is required to be accurate, and in particular relates to a shape measurement device intended for the measurement of a carrier which is used upon a semiconductor device production line for transporting a set of several semiconductor wafers all together.

2. Description of the Related Art

Upon a production line for semiconductor devices, in order to transport a semiconductor wafer between devices which perform film deposition, processing or the like, there has been employed a per se known method of transporting the semiconductor wafers by collecting together several at one time in a receptacle termed a "carrier". Generally, this type of carrier is formed with a number of slots being provided upon its inner walls on both its sides at predetermined intervals, and is made so as to hold a plurality of semiconductor wafers in a horizontally superimposed state with predetermined intervals between them, by supporting both the sides of the semiconductor wafers by these grooves.

When a semiconductor wafer is to be taken out from the carrier after it has been transported and is to be inserted into a device which performs a process like film deposition, processing or the like, a so called "robot arm" device inserts the end of an arm, which is formed in a thin plate shape, between two adjacent semiconductor wafers in the carrier. Then the end of the robot arm performs the operation of pulling a single semiconductor wafer out forwards towards itself along the grooves while lifting it up by its under surface.

At this time there is a danger that, if the space between one semiconductor wafer and the adjacent one supported in the carrier deviates from its design value by more than its permitted value, the end of the robot arm may touch against the upper surface of the adjacent semiconductor wafer. Since film deposition, processing or the like has been performed upon the upper surfaces of the semiconductor wafers by the previous processes up until this point, it is not desirable for the end of the robot arm to come into contact with any upper wafer surface, because damage or contamination may result. Furthermore, if the heights at which the semiconductor wafers are supported in the carrier deviate from the design values, apart from the possibility that the robot arm may touch the upper surface of some semiconductor wafer, there is a danger that one semiconductor wafer may be damaged by collision with the front edge of the semiconductor wafer. Yet further, if one of the semiconductor wafers is tilted, the end of the robot arm may not be able properly to lift up this semiconductor wafer. Due to these problems, it is extremely important for the heights at which the semiconductor wafers are supported in the carrier, the spaces between the semiconductor wafers, and the inclinations of the semiconductor wafers, all to be constrained to be within their permitted ranges around their design values.

For this reason, a shape measurement operation is performed at the time of shipping of the carrier from the carrier manufacturer and/or at the time of receipt of the carrier by the semiconductor device maker, in order to determine whether or not the shape of the carrier accords with its design values. Further, it may happen that the carrier becomes deformed during use, since cleansing processes and the like upon a semiconductor device production line are performed at high temperatures. Due to this, a measurement operation may be performed by the semiconductor device maker while the carrier is partway along the production line, in order to check whether or not its shape accords with its design values.

There is a per se known prior art carrier shape measurement device which measures the shape of a so called open carrier in which apertures are formed both in its front surface and also in its rear surface. With this structure, this open carrier is illuminated from its rear, and images are formed by a CCD camera or the like of the external shape of the carrier and the shapes of the grooves from the front, and the process of shape measurement is performed by processing these images.

However, since the grooves in the carrier are formed upon both the sides thereof, even if the shapes of these grooves are measured, it has been difficult accurately to derive from these values the spaces between the central portions of the wafers which are supported in these grooves, and their heights and inclinations. In particular, with a carrier shape measurement device according to this prior art, since the images which are used are formed from the front side of the carrier, therefore information cannot be obtained as to what the shapes of the grooves may be, further in the direction into the grooves than the depth of focus of the CCD camera. Because of this, even though the spaces between the wafers which are supported in these grooves, and their heights and inclinations, can be derived with accuracies on the order of millimeters, there have been great difficulties in increasing the accuracy above such a level.

More particularly, in recent years, the use has increased of so called large size semiconductor wafers of diameter of 300 mm or greater. Since both the edges of these large size semiconductor wafers are supported in the carrier in grooves which are several millimeters deep, it becomes more and more difficult to know, from the shapes of the grooves, the state of support with regard to the spaces between the central portions of the wafers and their inclinations and the like. Moreover since, in the case of semiconductor wafers of large diameter, if a wafer is inclined even a little, the spaces between it and the neighboring wafers become extremely restricted, therefore a measurement accuracy on the order of millimeters is no longer adequate, and a further enhancement of the accuracy of measurement is desirable.

Yet further, since such a carrier measurement device according to the prior art is directed towards measurement of an open carrier, therefore it is not capable of being applied to the measurement of the shape of a sealed type carrier which has a blocked rear side and a cover over its front side, such as a so-called FOUP (Front Opening Unified Pod) carrier for wafers of 300 mm diameter according to the SEMI standard.

SUMMARY OF THE INVENTION

The objective of the present invention is to propose a carrier shape measurement device which can measure with high accuracy the shape of a carrier and the attitudes of semiconductor wafers which are loaded into the carrier.

In order to attain the above described objective, a carrier shape measurement device according to the present invention, comprises: a stage which supports a carrier which is to be a subject of measurement; and a measurement section which measures a shape of the carrier, and the stage comprises kinematic coupling pins to support the carrier by a kinematic coupling.

In this carrier shape measurement device, it is preferred that the stage comprises a surface which coincides with or is parallel to at least one of a horizontal datum plane, a facial datum plane, and a bilateral datum plane which are specified with respect to the carrier which is supported by the kinematic coupling. In this case, it is preferred that the measurement section measures the shape of the carrier by taking as a reference the coinciding or parallel surface of the stage. Furthermore, it is preferred that a shifting section which shifts the measurement section relatively to the carrier is provided, and a direction of shifting by the shifting section is parallel or perpendicular to the coinciding or parallel surface of the stage.

In the above carrier shape measurement device, it is preferred that a calculation section which calculates results of measurement by the measurement section is further provided, and the calculation section derives coordinates of a center of a wafer which is loaded into the carrier by substituting coordinates of a plurality of points upon an edge of the wafer which have been measured by the measurement section, into a predetermined equation.

In the above carrier shape measurement device, it is preferred that the stage comprises a mechanism section which vibrates the kinematic coupling pins.

In the above carrier shape measurement device, it is preferred that a detection section which detects whether or not an engagement between the carrier and the kinematic coupling pins is normal, and a control section which, if the detection section has detected that the engagement is normal, stops vibrating by the mechanism section, are further provided.

In the above carrier shape measurement device, it is preferred that each of the kinematic coupling pins comprises an air ejection orifice for ejecting air from its tip towards the carrier, and a flow conduit which conducts air to the air ejection orifice. In this case, it is preferred that a detection section which detects whether or not an engagement between the carrier and the kinematic coupling pins is normal, and a control section which, if the detection section has detected that the engagement is normal, stops supplying air to the flow conduit, are further provided.

In the above carrier shape measurement device, it is preferred that the kinematic coupling pins comprise three pins arranged in a predetermined arrangement, and in order to support the carrier in a desired orientation with the kinematic coupling pins, the stage is made with such a structure that an orientation of the arrangement of the three pins upon the stage can be changed while the arrangement is being maintained relatively between the three pins. In this case, it is preferred that the stage comprises a plate which comprises the kinematic coupling pins, and a support portion upon which the plate is loaded; and the support portion comprises a mechanism which can change a loading direction of the plate, in order to change the orientation of the arrangement of the three pins. Furthermore, it is preferred that a dimension calculation section which calculates dimensions of the carrier from results of measurement by the measurement section is further provided, and the dimension calculation section calculates the dimensions of the carrier either by using coordinates which result from the measurements just as they are, or by using coordinates which have been converted by the coordinate conversion section. Also, it is preferred that the stage comprises a plate which comprises the kinematic coupling pins, and a rotation section which rotates the plate. Also, it is preferred that the stage comprises a plurality of kinematic coupling pins whose arrangements of the three pins differ from one another, a mechanism section for projecting and retracting the plurality of kinematic coupling pins from the stage, and a control section which controls the mechanism section so as selectively to project one of the plurality of kinematic coupling pins from the stage. Also, it is preferred that a coordinate conversion section which converts coordinates of results of measurement according to the orientation of the kinematic coupling pins upon the stage, is further provided.

In the above carrier shape measurement device, it is preferred that a calculation section which calculates results of measurement by the measurement section is further provided, and the calculation section derives coordinates of a center of a wafer which is loaded into the carrier by adding a dead weight bending amount, which has been determined in advance from a weight of the wafer, to at least one of coordinates of a wafer support portion of the carrier which have been measured by the measurement section, and coordinates of a point upon an edge of the wafer which have been measured by the measurement section.

In the above carrier shape measurement device, it is preferred that a calculation section which calculates results of measurement by the measurement section is further provided, and the calculation section, by using coordinates of left and right wafer support portions of the carrier which have been measured by the measurement section, derives an inclination of a wafer which is loaded into the carrier and which is supported by the wafer support portions.

In the above carrier shape measurement device, it is preferred that the stage comprises a surface which coincides with or is parallel to a surface based upon a designed shape of the carrier.

In the above carrier shape measurement device, it is preferred that the measurement section measures a shape of the carrier by comparison with the coinciding or parallel surface of the stage.

Another carrier shape measurement device comprises: a stage which supports a carrier which is to be a subject for measurement; an imaging section which forms an image of the carrier; and a calculation section which calculates image formation results of the imaging section, and the imaging section comprises an objective lens, and an operational distance of the objective lens is longer than a distance from an opening of an aperture for taking a wafer out from the carrier and inserting it thereinto, to a wafer support portion within the carrier.

BRIEF DESCRIPTION OF THE DRAWINGS

FIG. 4 shows a sectional view showing the structure of an end portion of a measurement head 10 of this carrier shape measurement device according to the first embodiment of the present invention.

FIG. 35 shows an explanatory figure showing the operation of a coordinate axis conversion device 351 of this carrier shape measurement device according to the third embodiment of the present invention FIG. 36A shows, with the carrier shape measurement device according to the third embodiment of the present invention, an explanatory figure showing the coordinate systems which are converted by the coordinate axis conversion device 351, and FIG. 36B shows an explanatory figure showing the coordinate axes upon the output image of a CCD camera 22.

FIG. 37 shows a perspective view and a block diagram showing the structure of a measurement device main body of a carrier shape measurement device according to a fourth embodiment of the present invention, and of a rotation drive control section 371 thereof.

FIG. 38 shows a perspective view and a block diagram showing the structure of a measurement device main body of a carrier shape measurement device according to a fifth embodiment of the present invention, and of a pin raising and lowering drive control section 381 thereof.

DESCRIPTION OF THE PREFERRED EMBODIMENTS

Various embodiments of the carrier shape measurement device according to the present invention will now be described with reference to the drawings.

Figure 1:
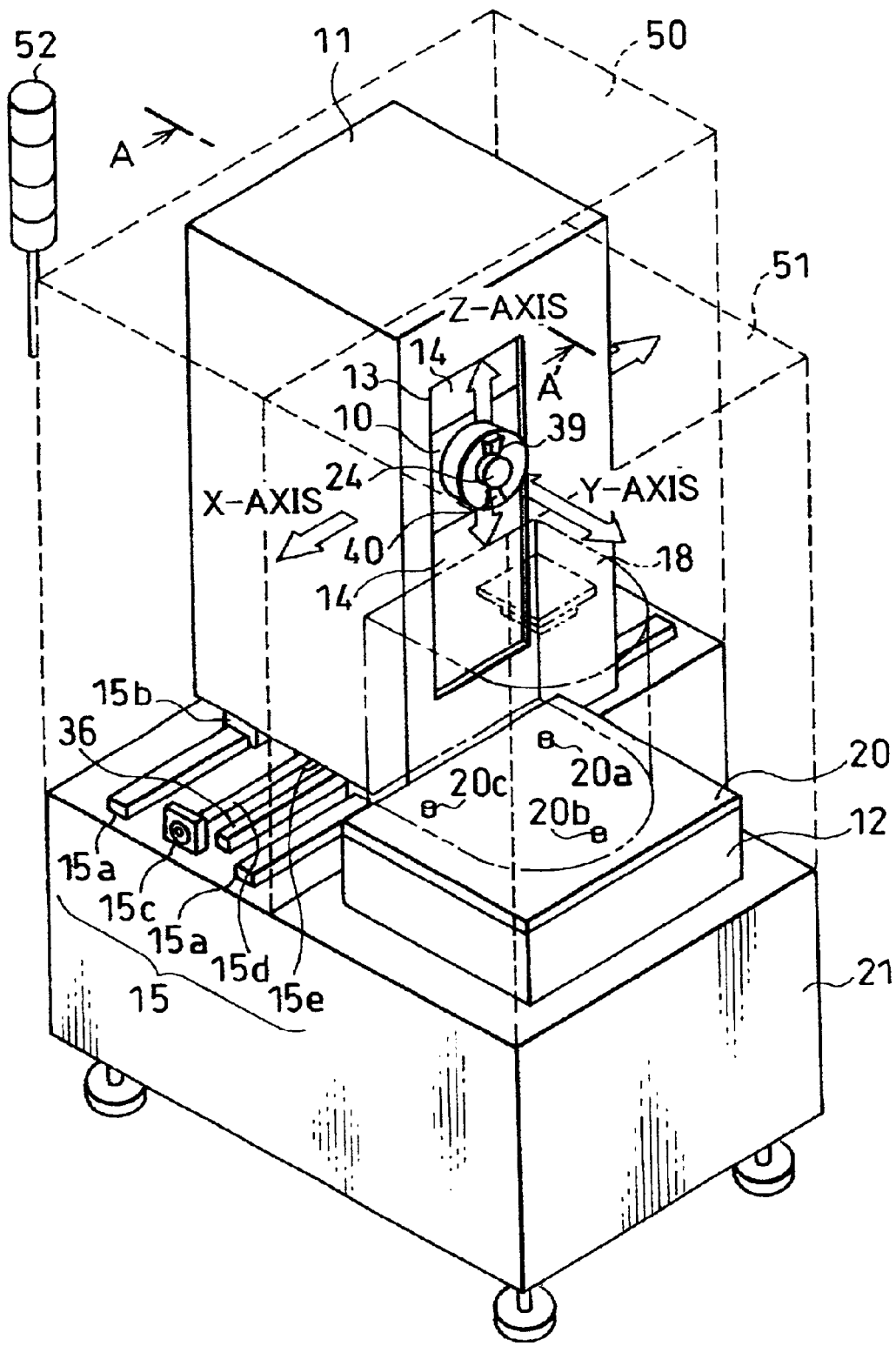
FIG. 1 shows a perspective view showing a measurement device main body 110 of the carrier shape measurement device according to the first embodiment of the present invention as seen from the outside.
Figure 2:
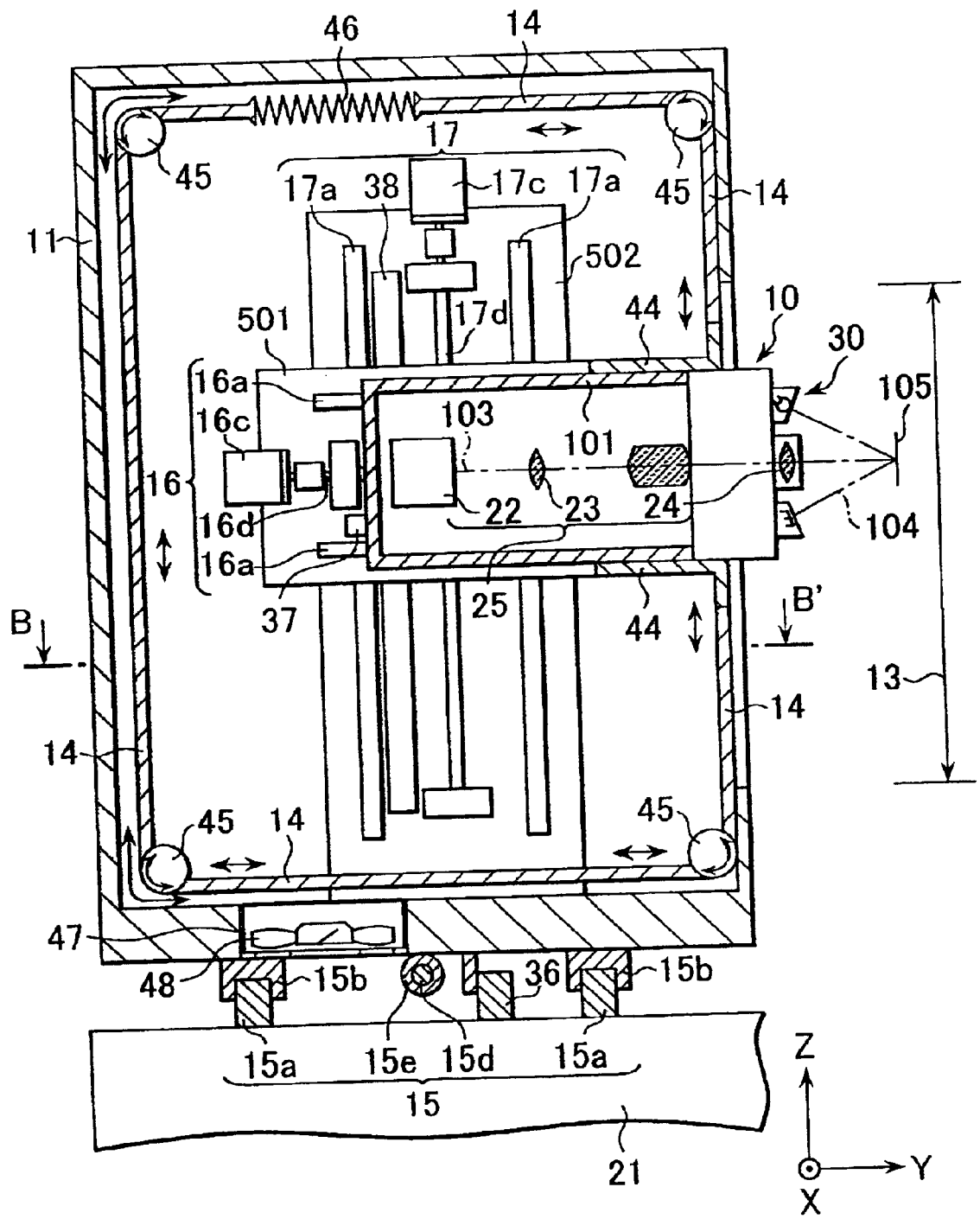
FIG. 2 shows a sectional view, taken looking along the arrows A–A' in FIG. 1, showing this carrier shape measurement device according to the first embodiment of the present invention, shown when a pressure reduction fan 48 is not operating.
Figure 3:
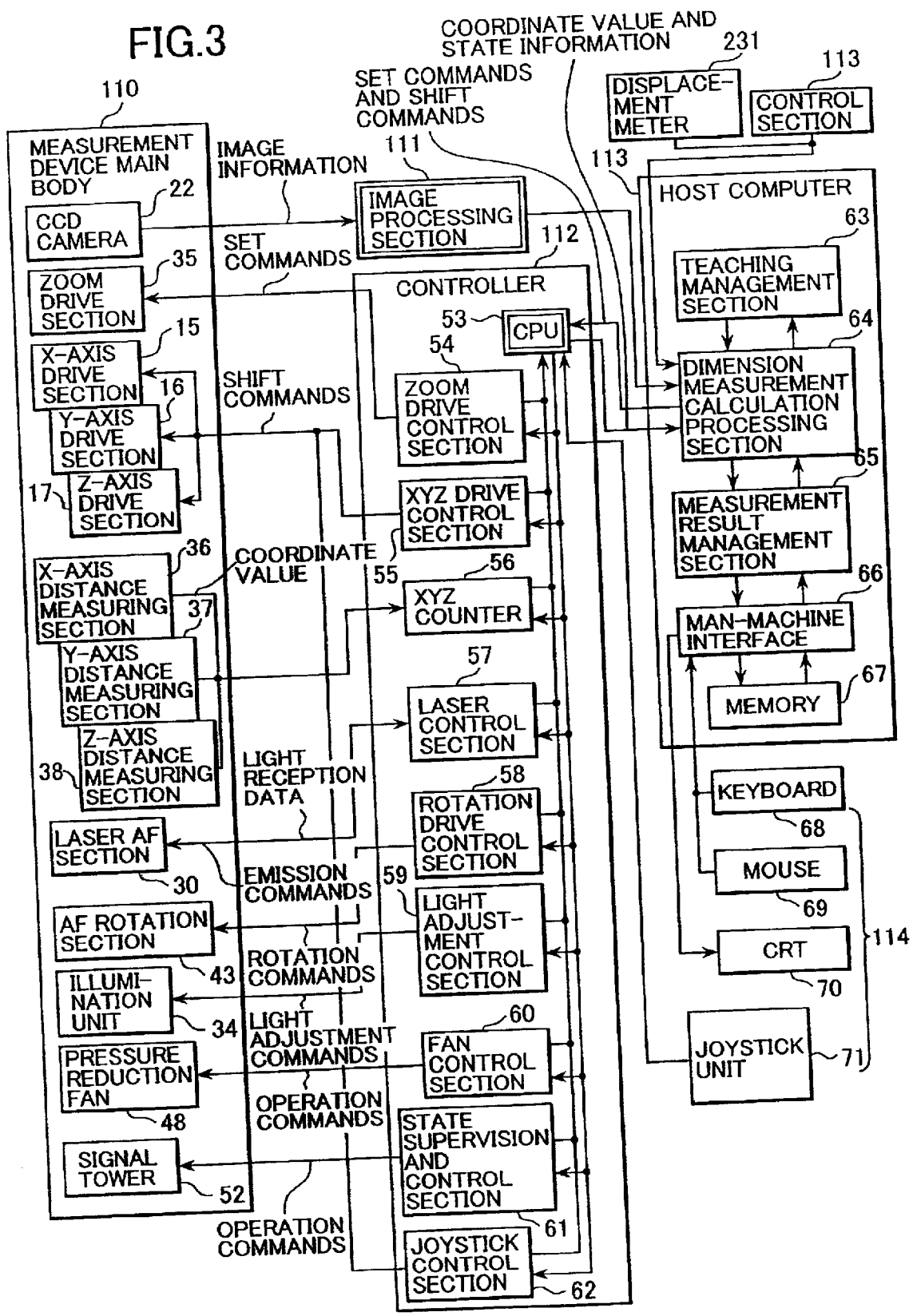
FIG. 3 shows a block diagram showing the overall structure of this carrier shape measurement device according to the first embodiment of the present invention.

The first embodiment of the carrier shape measurement device according to the present invention, as shown in FIG. 3, comprises a measurement device main body 110, an image processing section 111, a controller 112, a host computer 113, and an input and output section 114. First, the measurement device main body 110 will be explained. As shown in FIGS. 1, 2, 3, and 4, this measurement device main body 110 comprises a stage 12 upon which is loaded a carrier 18 which is to be the subject of measurement, and a measurement head 10. In this first embodiment, the stage 12 is fixed with respect to a pedestal 21, and the measurement head 10 is made so as to measure the shape of the carrier 18 as it is shifted by X-, Y-, and Z-axis shift sections 15, 16, and 17 in three dimensions with respect to the carrier 18. Thus, a chassis 11 which holds the measurement head 10 is loaded upon the pedestal 21, and the X-axis shift section 15 is arranged between the pedestal 21 and the chassis 11 for shifting the chassis 11 in the X-axis direction.

The X-axis shift section 15 comprises rails 15a which are formed upon the pedestal 21 and extend along the X-axis direction, sliding movement members 15b which are fixed to the under surface of the chassis 11 and are capable of sliding movement along the rails 15a, a motor 15c, a feed screw 15d which is connected to the rotation shaft of the motor 15c, and a nut 15e which is fixed to the under surface of the chassis 11 and is engaged upon the feed screw 15d. When the rotation shaft of the motor 15c rotates, the feed screw 15d rotates along with it, and thereby the nut 15e is shifted along the X-axis direction, so that the sliding movement members 15b slide along the rails 15a as well along the X-axis direction, and the chassis 11 to which the nut 15e and the sliding movement members 15b are fixed also are shifted along the X-axis direction.

The Y-axis shift section 16 is disposed within the chassis 11 between the measurement head 10 and a Z-axis movable plate 501. This Y-axis shift section 16 comprises rails 16a which are formed upon the front surface of the Z-axis movable plate 501 and which extend along the Y-axis direction, sliding movement members not shown in the figures which are formed upon the rear surface of the measurement head 10 and are capable of sliding movement along the rails 16a, a motor 16c, a feed screw 16d which is connected to the rotation shaft of the motor 16c, and a nut not shown in the figures which is fixed to the rear surface of the measurement head 10 and is engaged upon the feed screw 16d. When the rotation shaft of the motor 16c rotates, the feed screw 16d rotates along with it, and thereby the nut is shifted along the Y-axis direction, so that the sliding movement members also slide along the rails 16a along the Y-axis direction, and the measurement head 10 is also shifted along the Y-axis direction.

The Z-axis shift section 17 is provided within the chassis 11, and comprises rails 17a which are formed upon the front surface of a support post 502 and extend along the Z-axis direction, sliding movement members not shown in the figures which are formed upon the rear surface of the Z-axis movable plate 501 and are capable of sliding movement along the rails 17a, a motor 17c, a feed screw 17d which is connected to the rotation shaft of the motor 17c, and a nut not shown in the figures which is fixed to the rear surface of the Z-axis movable plate 501 and is engaged upon the feed screw 17d. When the rotation shaft of the motor 17c rotates, the feed screw 17d rotates along with it, and thereby the nut is shifted along the Z-axis direction, so that the sliding movement members also slide along the rails 17a along the Z-axis direction, and the Z-axis movable plate 501 is also shifted along the Z-axis direction. As a result, the measurement head 10 is shifted along the Z-axis direction.

The measurement head 10 can be shifted along the X-axis direction, the Y-axis direction, or the Z-axis direction by these structures. It should be noted that it would be possible for the construction to be such that any of the rails 15a, 16a, and 17a of the X-, Y-, and Z-axis shift sections 15, 16, and 17 were fixed by means of screws, so that, by loosening these screws, the axial directions of the rails may be adjusted. Furthermore, X-, Y-, and Z-axis distance measuring sections 36, 37, and 38 (see FIGS. 1, 2, and 3) are fitted to the X-, Y-, and Z-axis shift sections 15, 16, and 17, for measuring the actual amounts of movement along the X-, Y-, and Z-axes.

Moreover, a kinematic plate 20 is mounted upon the stage 12 for loading a carrier 18 of the so-called FOUP (Front Opening Unified Pod) type according to the SEMI standard. This kinematic plate 20 comprises three pins 20a, 20b, and 20c upon its upper surface. The forms and arrangement of these three pins 20a, 20b, and 20c are those specified by the SEMI standard (SEMI E57-1296).

A kinematic coupling that is a positioning mechanism for loading a carrier according to the SEMI standard is implemented by these three pins 20a, 20b, and 20c being engaged into a concave member shaped with V-grooves which is provided on the bottom surface of the aforesaid FOUP type carrier 18. By this construction, the FOUP type carrier 18 is supported on the stage 12 with its position being accurately determined. Accordingly, since with the shape measurement device of this first embodiment it is possible to perform measurement of the shape of the carrier 18 while supporting the carrier 18 by the same kinematic coupling arrangement as the carrier 18 would be supported by upon an actual semiconductor device production line, thereby it is possible to measure the shape and the attitude of the carrier 18 and the wafers which are loaded into it accurately in the same state as during actual use of the carrier 18.

Figure 14:
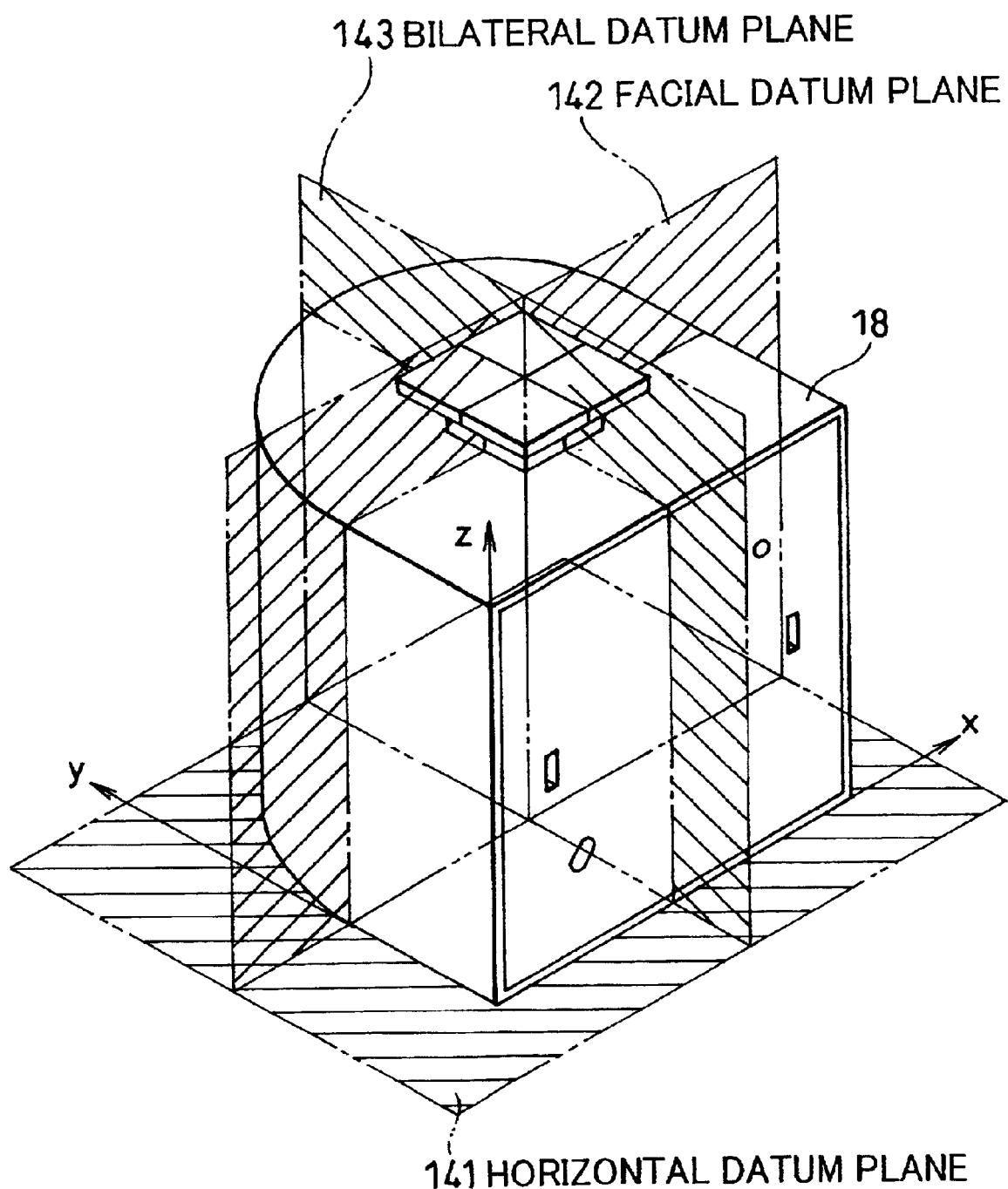
FIG. 14 shows an explanatory figure showing the shape of a FOUP type carrier 18 which is to be the subject of measurement by the carrier shape measurement device according to the first embodiment of the present invention, and showing certain datum planes thereof.

Further, in this first embodiment, measurement is performed while taking as references either datum planes which are ascertained upon the FOUP type carrier 18 based upon the shape of the FOUP type carrier 18, or planes parallel thereto, in order to perform measurement of the FOUP type carrier 18 with high accuracy. As datum planes upon the FOUP type carrier 18, as shown in FIG. 14, there are a horizontal datum plane 141, a facial datum plane 142, and a bilateral datum plane 143, as specified according to the SEMI standard. The horizontal datum plane 141 is a horizontal plane established by the carrier 18 via the kinematic coupling pins 20a, 20b and 20c. The facial datum plane 142 is a vertical plane which is parallel to the front surface of the carrier 18 and divides each of the wafers within the carrier into two equal portions. And the bilateral datum plane 143 is a vertical plane which makes a right angle with the horizontal datum plane 141 and divides each of the wafers within the carrier into two equal portions. The horizontal datum plane 141 is not necessarily parallel to the bottom surface of the carrier 18 due to its construction.

Figure 15:
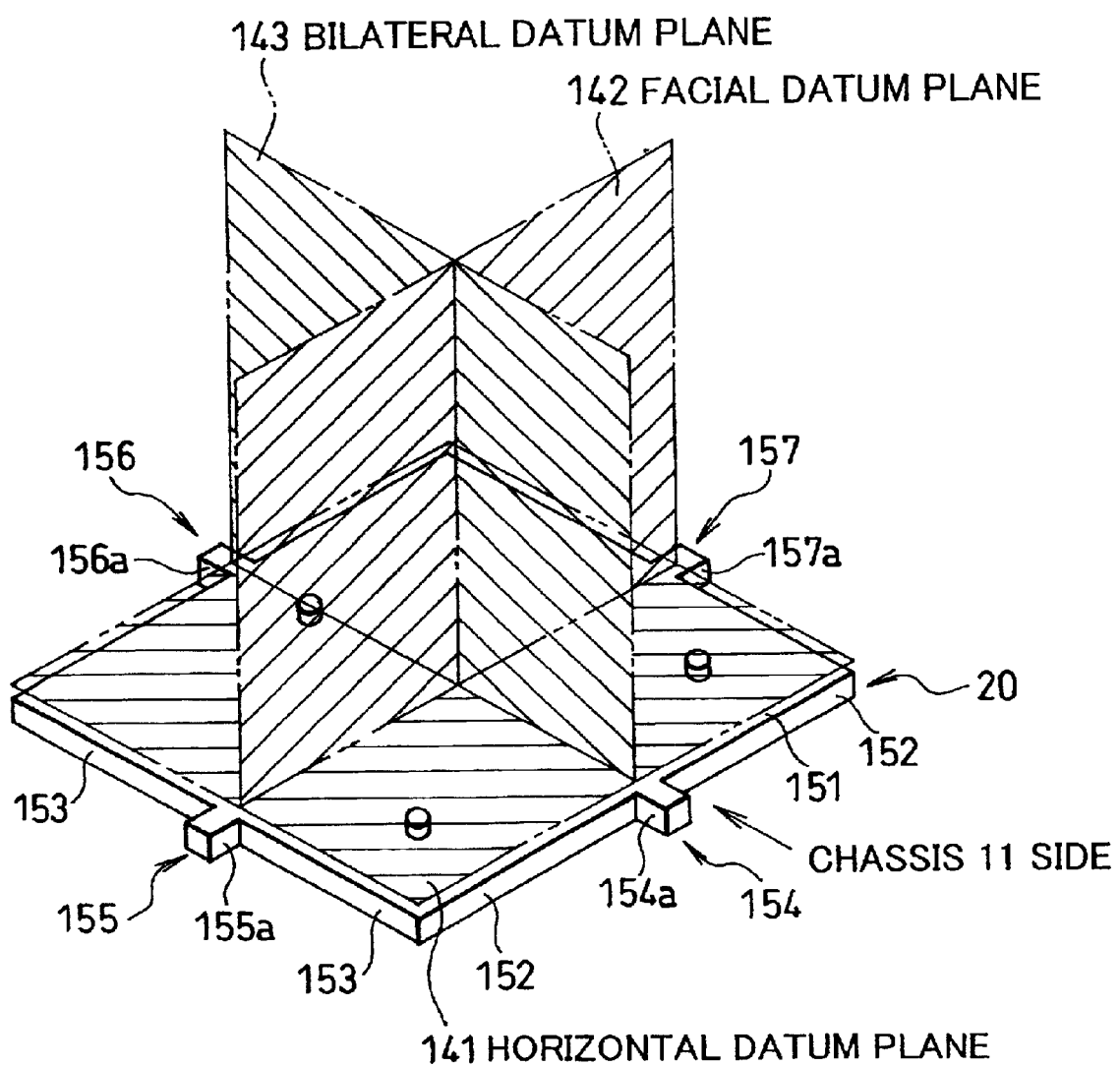
FIG. 15 shows an explanatory figure showing the shape of a kinematic plate 20 of the carrier shape measurement device according to the first embodiment of the present invention, and its relationship with the datum planes of the FOUP carrier 18.

With this first embodiment, it is arranged to be possible to measure the shape and the attitudes of the carrier 18 and the wafers by taking these datum planes 141, 142 and 143 as references. To this purpose, in this first embodiment, the kinematic plate 20 is formed as shown in FIG. 15, and, in the state in which the kinematic plate 20 is fixed upon the stage 12, it is arranged for its upper surface 151 to coincide with the horizontal datum plane 141, or to define a plane which extends parallel with said horizontal datum plane 141. In the same manner, the front edge surface 152 of the kinematic plate 20 (its surface which opposes the chassis 11) defines a plane which is parallel to the facial datum plane 142, while its side edge surface 153 defines a plane which is parallel to the bilateral datum plane 143. Further, as shown in FIG. 15, projections 154, 155, 156 and 157 are provided upon the four edge surfaces 152, 153 etc. of the kinematic plate 20, and their side edge surfaces 154a and 156a are arranged to define a plane which coincides with the bilateral datum plane 143. Similarly, their side edge surfaces 155a and 157a are arranged to define a plane which coincides with the facial datum plane 142.

By a positional alignment process which will be described hereinafter, using the upper surface 151 and the edge surfaces 152 and 153 of this kinematic plate 20, adjustment is performed for the directions of movement of the X-, Y- and Z-axis shift sections 15, 16 and 17, so as to bring them parallel to the above described datum planes 141, 142 and 143. By doing this, it is possible to measure the shape of the FOUP type carrier 18 with high accuracy by taking the datum planes 141, 142 and 143 of the FOUP type carrier 18 as a reference. In this manner, it is possible easily to check whether or not the carrier shape is acceptable, by measuring the front surface 18a and the side surfaces of the carrier while taking the front edge surface 152 and the side edge surface 153 as references.

Figure 16:
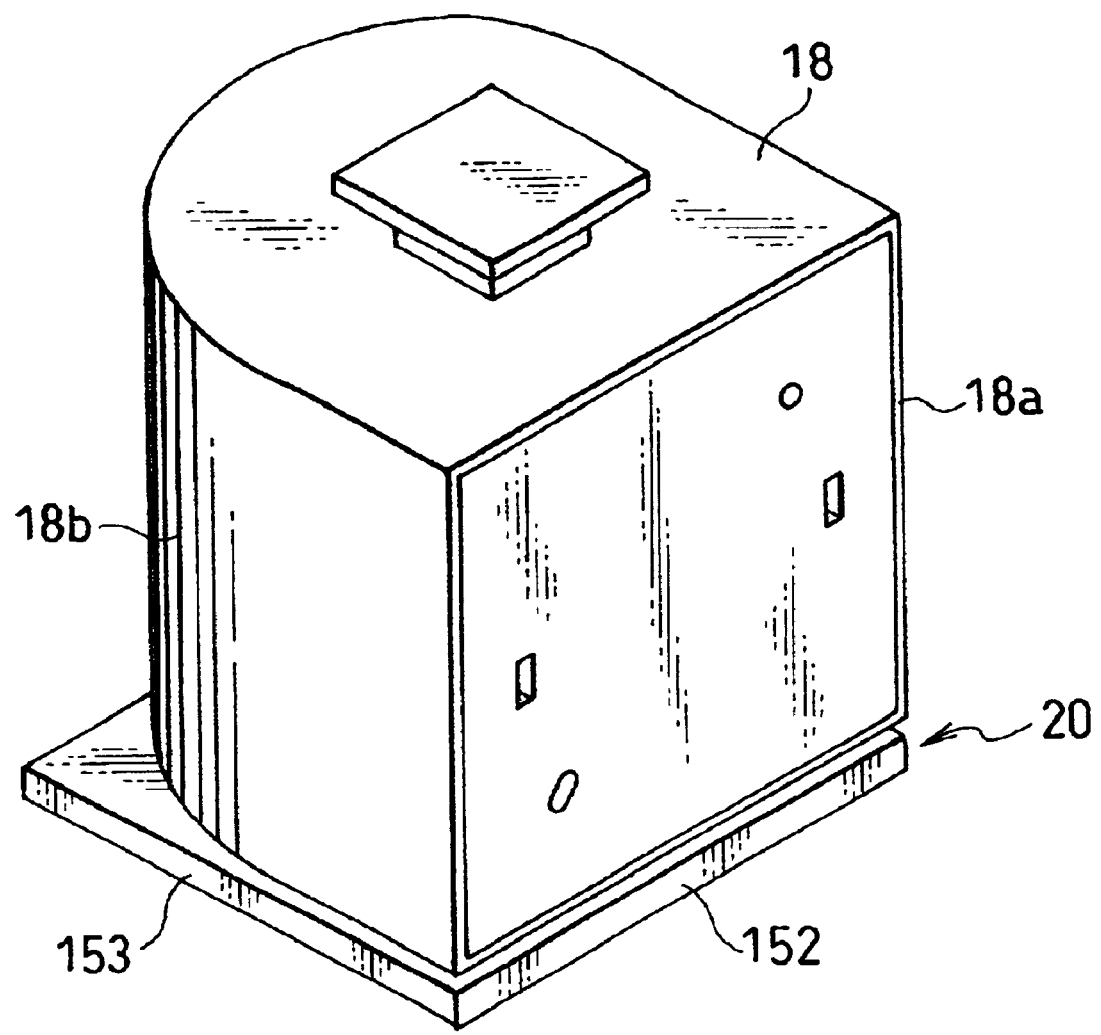
FIG. 16 shows an explanatory figure showing the size of the kinematic plate 20 of the carrier shape measurement device according to the first embodiment of the present invention, and its relationship with the outer shape of the FOUP carrier 18.

Further, with this first embodiment, the size of the kinematic plate 20 is set so as to match with the size of the FOUP type carrier 18 as shown in FIG. 16. In other words, the front edge surface 152 of the kinematic plate 20 aligns with the front surface 18a of the FOUP type carrier 18 according to the design, while the side edge surface 153 of the kinematic plate 20 aligns with the side surface 18b of the FOUP type carrier 18 according to the design.

Figure 19A:
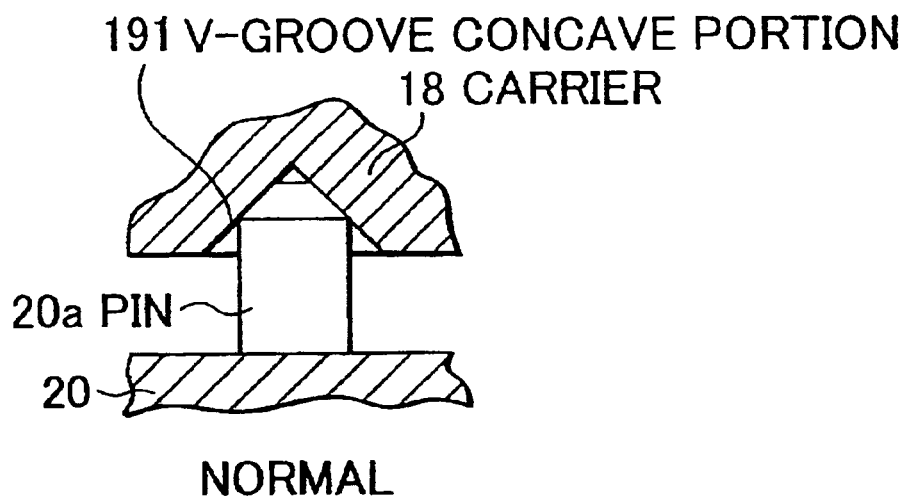
FIG. 19A shows a figure showing the engagement between pins 20a, 20b, and 20c of the kinematic plate 20, and a concave member 191 of the carrier 18, of the carrier shape measurement device according to the first embodiment of the present invention in a perfect state.
Figure 19B:
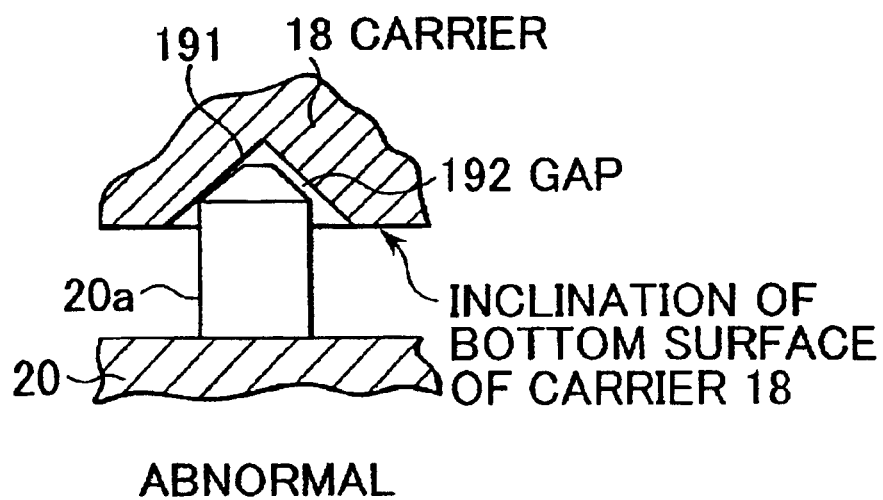
FIG. 19B shows it in an imperfect state.

Furthermore, with this first embodiment, the pins 20a, 20b and 20c of the kinematic plate 20 are made so as to be able to be vibrated, in order, when the FOUP type carrier 18 is loaded upon the kinematic plate 20, to securely implement a kinematic coupling by the pins 20a, 20b and 20c engaging with the V-groove shaped concave member of the FOUP type carrier 18. That is to say, when the FOUP type carrier 18 is loaded upon a prior art type kinematic plate 20, the V-groove shaped concave member 191 upon the under surface of the carrier 18 is laid directly upon the pins 20a, 20b and 20c, and due to the dead weight of the carrier 18 and the wafers, the V-groove shaped concave member 191 and the pins 20a, 20b and 20c are mutually engaged together. However, since in the prior art the pins 20a, 20b and 20c have been made of metallic material and the FOUP type carrier 18 has been made of resin, therefore it has been easy for the sloping surface of the V-groove shaped concave member 191 to become scarred due to repetition of the loading operation. If such scarring of the V-groove shaped concave member 191 occurs, the frictional force between the pins 20a, 20b and 20c and the V-groove shaped concave member 191 increases, and it becomes impossible to assure smooth engagement. If the engagement becomes inadequate, as shown in FIG. 19B a gap 192 may open up between, for example, the pin 20a and the V-groove shaped concave member 191, and the bottom surface of the carrier 18 maybe tilted. In other words, it become impossible to implement adequate support of the carrier 18 by this kinematic coupling.

Figure 20:
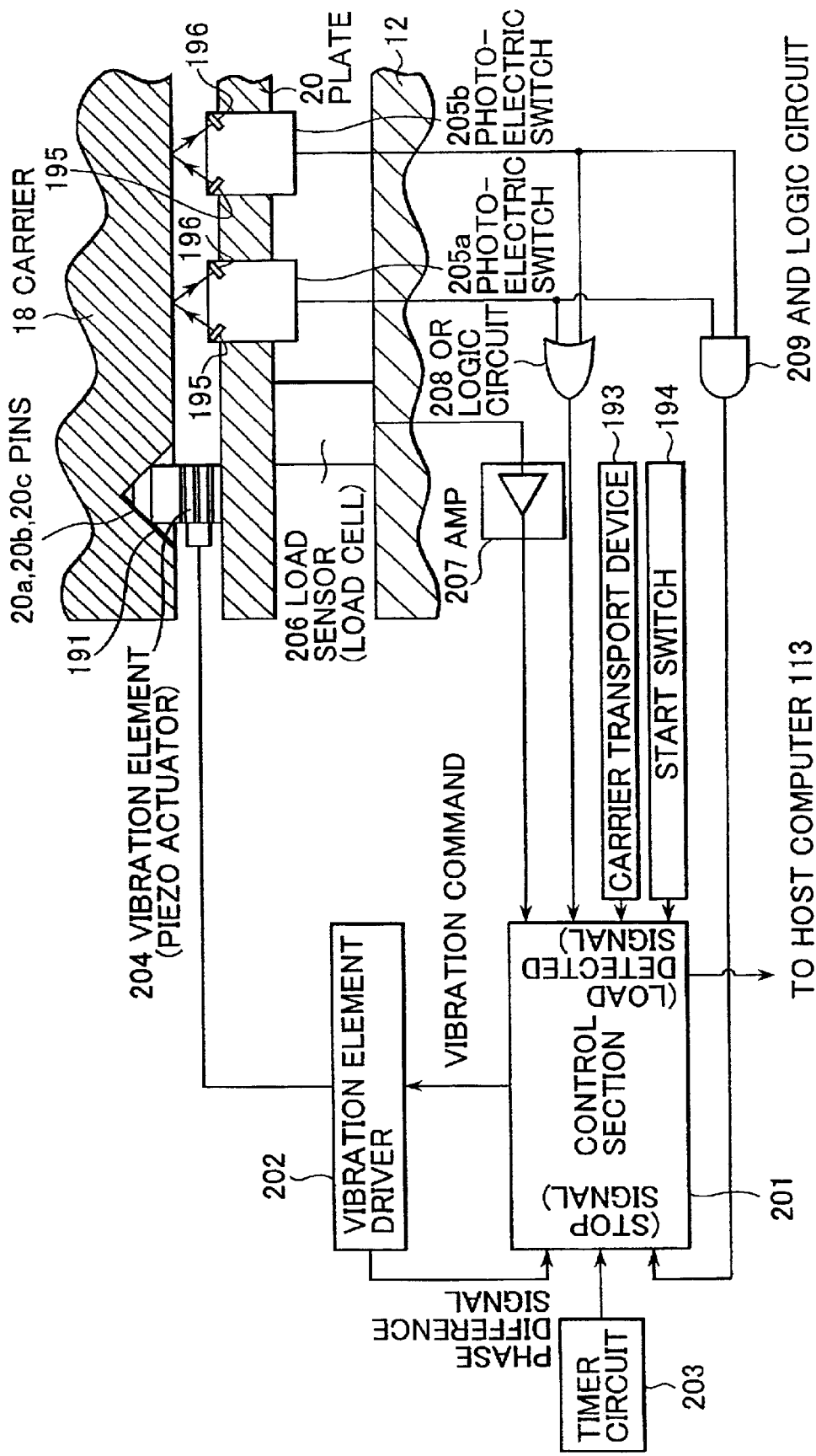
FIG. 20 shows a block diagram showing a structure for swinging the pins 20a, 20b, and 20c of the kinematic plate 20 of the carrier shape measurement device according to the first embodiment of the present invention.

In this first embodiment, as shown in FIG. 20, the pins 20a, 20b and 20c are made so as to incorporate in their base portions vibration elements 204 which consist of piezo actuator elements. The outer shapes of the pins 20a, 20b and 20c satisfy the shape specification for kinematic coupling pins according to the SEMI standard (SEMI E57-1296), when the vibration elements 204 are in their states of not vibrating.

The directions of vibration of the vibration elements 204 are the directions in which the axes of the pins 20a, 20b and 20c vibrate in the sidewise direction (the direction parallel to the main plane of the plate 20). Further, photoelectric switches 205a and 205b are disposed on the plate 20 and detect the bottom surface of the carrier 18 keeping a predetermined distance. These photoelectric switches 205a and 205b comprise light emitting elements 195 which emit light towards the bottom surface of the carrier 18, and light reception elements 196 which detect this light when it is reflected back.

When the V-groove shaped concave member 191 and the pins 20a, 20b and 20c are properly engaged together, then light reflected back from the bottom surface of the carrier 18 is properly incident upon the light reception elements 196; but the positions and orientations of these light reception elements 196 are so determined that, when the engagement between the V-groove shaped concave member 191 and the pins 20a, 20b and 20c is imperfect as shown in FIG. 19B and the bottom surface of the carrier 18 is raised, the reflected back light is not properly incident upon them. Further, a load sensor 206 which incorporates a load cell is provided to the stage 12, for detecting the load upon the plate 20.

A circuit like the one shown in FIG. 20 is connected to the vibration elements 204, the photoelectric switches 205a and 205b, and the load sensor 206 in the stage 12. The electrodes of the piezo actuator elements which are incorporated in the vibration elements 204 are connected to vibration element drivers 202, and control signals are output by a control section 201 to these vibration element drivers 202. Further, the vibration element drivers 202 have the function of detecting the differences in phase of the vibrations of the vibration elements 204, and output the results of detection to the control section 201. The outputs of the photoelectric switches 205a and 205b are input to an OR logic circuit 208 and an AND logic circuit 209, and the outputs of this OR logic circuit 208 and this AND logic circuit 209 are input to the control section 201. Further, the output of the load sensor 206 is input to the control section 201 via an amp 207. Apart from the above, the outputs of a timer circuit 203 and of a start switch 194 which receives a vibration start command from the operator are input to the control section 201. Further, the output of a carrier transport mechanism 193 which loads the carrier 18 upon the shape measurement device according to this first embodiment is also input to the control section 201.

If the output of the load sensor 206 is greater than a load determined in advance, or if it is determined from the output of the OR logic circuit 208 that at least one of the photoelectric switches 205a and 205b has detected the bottom surface of a carrier 18, or if a carrier loading completed signal has been received from the carrier transport mechanism 193, or if the start switch 194 has received a vibration start command from the operator, then the control section 201 decides that a carrier 18 has been loaded, and outputs a signal which commands the vibration element drivers 202 to vibrate. The vibration element drivers 202 output voltage signals to the electrodes of the piezo actuator elements which are included in the vibration elements 204, and thus cause the vibration elements 204 to vibrate at predetermined frequencies. Due to this, since the pins 20a, 20b and 20c vibrate in their sidewise directions, the frictional force between the curved end surfaces of the pins 20a, 20b and 20c and the sloping surfaces of the V-groove shaped concave member 191 is reduced. Accordingly, even if the engagement with the V-groove shaped concave member 191 by only the dead weight of the carrier 18 has become imperfect as shown in FIG. 19B, it is possible to resolve this problem, and to convert this engagement into a perfect engagement, as shown in FIG. 19A.

If the vibration element drivers 202 detect that the phases of the vibrations of the pins 20a, 20b and 20c have changed, and/or if it is known from the output of the AND logic circuit that both of the photoelectric switches 205a and 205b have detected the bottom surface of the carrier 18, then the control section 201 decides that the pins 20a, 20b and 20c have perfectly engaged into the V-groove shaped concave member 191, and it outputs vibration termination signals to the vibration element drivers 202. Due to this, the vibrations of the pins 20a, 20b and 20c cease. Further, the control section 201 stops the vibrations if it is detected from the output of the timer circuit 203 that a time period determined in advance has elapsed from when the vibrations were started. Furthermore, after the vibrations have ceased, the control section 201 outputs signals which will be explained hereinafter to the host computer 113 in order to notify it that the loading of the carrier 18 has been completed.

In this manner, with this first embodiment, by making the kinematic plate 20 as shown in FIG. 20, it is possible to resolve imperfect engagement between the pins 20a, 20b and 20c of the kinematic plate 20 and the V-groove shaped concave member 191, and it is possible to support and position the FOUP type carrier 18 with this kinematic coupling. Furthermore since with the structure shown in FIG. 20 it is possible to determine, from the outputs of the photoelectric switches 205a and 205b and from the phase changes which are detected by the vibration element drivers 202, whether or not the engagement between the pins 20a, 20b and 20c of the kinematic plate 20 and the V-groove shaped concave member 191 is perfect, therefore it is easily possible to detect a state of engagement which is difficult to check by visual inspection.

Figure 21A:
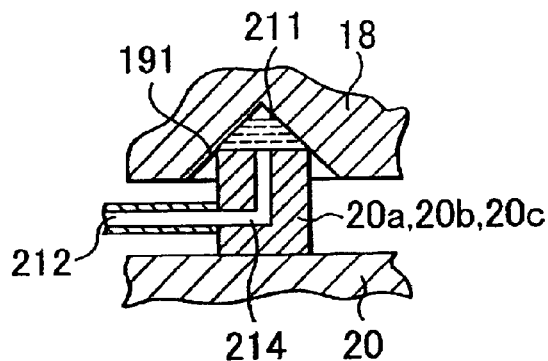
FIGS. 21A, 21B, 21C and 21D show sectional views of the pins 20a, 20b, and 20c of various structures in which air is ejected from the pins 20a, 20b, and 20c of the kinematic plate 20 of the carrier shape measurement device according to the first embodiment of the present invention.
Figure 21B:
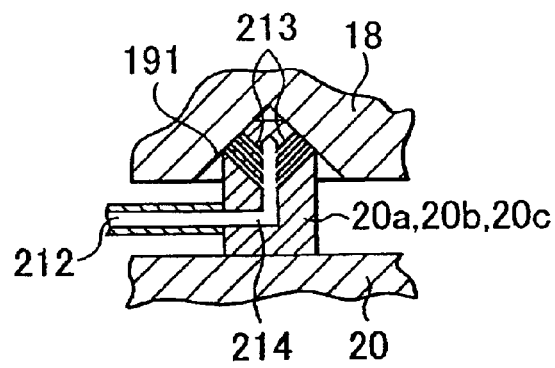
Figure 21C:
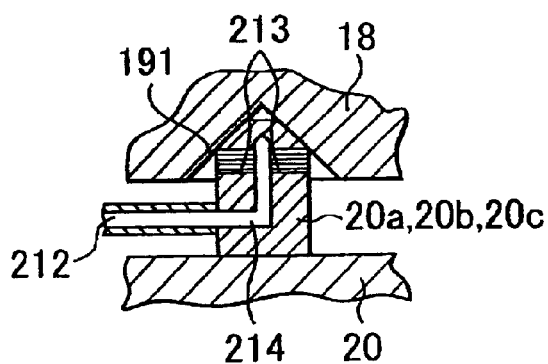
Figure 21D:
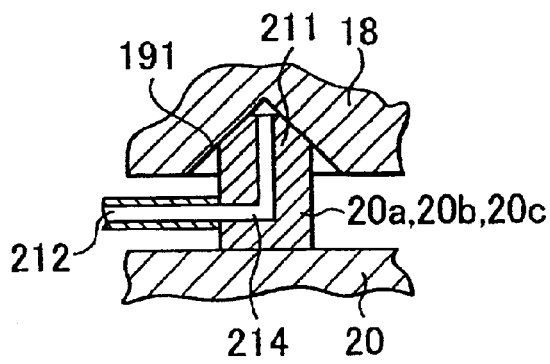
Figure 22:
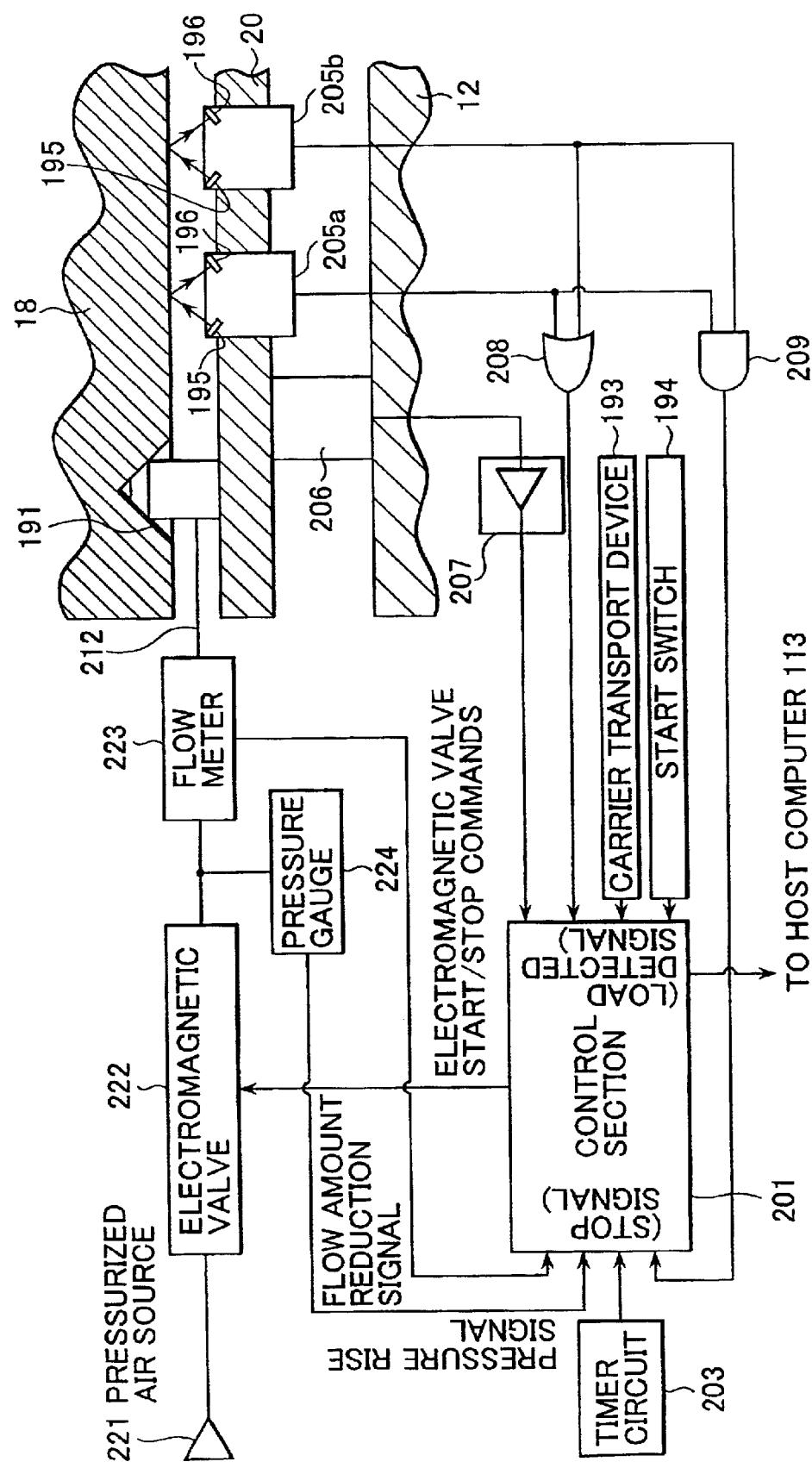
FIG. 22 shows a block diagram showing a structure for ejecting air from the pins 20a, 20b, and 20c of the kinematic plate 20 of the carrier shape measurement device according to the first embodiment of the present invention.

It should be noted that, although imperfect engagement may be rectified by the process of vibration with the structure shown in FIG. 20, it would also be possible, with a variant structure to eject air from the ends of the pins 20a, 20b and 20c in the direction of the sloping surface of the V-groove shaped concave member 191, instead of utilizing this vibration process. In order to implement this concept, for example, the end portions 211 of the pins 20a, 20b and 20c may be formed from a porous (multiperforate) material which is pierced with a large number of holes as shown in FIG. 21A, with flow conduits 214 being provided in their base portions which conduct compressed air to these end portions 211 from external supply conduits 212. By doing this, it is possible to eject air from these holes (orifices) in the porous material of the end portions 211. Furthermore, it is also possible to provide branch conduits from the flow conduits 214 as shown in FIGS. 21B and 21C, and with this constrution it is possible to eject air from the ends of these branch conduits 213. Yet further, a construction is also possible in which the flow conduits 214 are formed as elongated, so that air is ejected from the ends of the pins 20a, 20b and 20c. And a compressed air source 221 is connected to the supply conduit 21 as shown in FIG. 22, with an electromagnetic valve 22 and a flow meter 223 and an air pressure gauge 224 being provided at intermediate points thereof.

The control section 201 detects that the carrier 18 has been loaded in the same manner as in FIG. 20, and, taking this as a trigger, the electromagnetic valve 223 goes into the open state, thus causing compressed air to be ejected from the ends of the pins 20a, 20b and 20c in the direction of the sloping surfaces of the V-groove shaped concave member 191. Further, if the amount of flow through the flow meter 223 becomes less than a value which is determined in advance, or if the air pressure in the supply conduit 212 measured by the air pressure gauge 224 exceeds a value which is determined in advance, then it is determined that the engagement between the pins 20a, 20b and 20c and the V-groove shaped concave member 191 has become perfect, i.e. that the air ejection holes in the ends of the pins 20a, 20b and 20c have become blocked by the sloping surfaces of the V-groove shaped concave member 191, and the electromagnetic valve 222 is closed. Yet further, in the same manner as with the structure of FIG. 20, if it is determined from the output of the AND circuit 209 or from the output of the timer circuit 203 that the engagement is perfect, then the electromagnetic valve 222 is closed. It should be understood that, in the cases of the structures shown in FIGS. 21A and 21B, it is desirable for the holes in the ends of the pins 20a, 20b and 20c to face the sloping surfaces of the V-groove shaped concave member 191. By this, it is possible for the air ejection holes which face the sloping surface of the V-groove shaped concave member 14 to be blocked.

Next, the structure of the measurement head 10 will be explained with reference to FIGS. 2 and 4. The measurement head 10 comprises two types of measurement section. First there is an imaging section 25 for measuring the shape according to an image which has been formed, and also there is a laser AF section 30 which measures the distance in the Y-axis direction using a laser.

The imaging section 25 comprises an objective lens 24, an optical system 23 which includes a zoom lens, and a CCD camera 22, all arranged in the specified order within a lens barrel 101 and along its optical axis 103. Although the zoom lens incorporated in the optical system 23 is not shown in FIGS. 2 and 4, it can be driven along the direction of the optical axis 103 by a zoom drive section 35 (refer to FIG. 3), whereby change of the zooming ratio is implemented. An optical fiber (not shown in the figures) which conducts illumination light emitted by an illumination unit 34 (refer to FIG. 3) which is arranged upon the pedestal 21 is taken into the lens barrel 101, and this illumination light which is emitted from the end of the optical fiber illuminates the subject of measurement via the objective lens 24.

Further, with regard to the diameter of the lens barrel 101, as shown in FIG. 4 its end portion in which the objective lens 24 is fitted is narrowed down, and a ring shaped lens barrel 102 is fitted around this end of the lens barrel 101. Bearings 33 are fitted between the lens barrel 101 and the ring shaped lens barrel 102, and thereby the ring shaped lens barrel 102 can rotate with respect to the lens barrel 101. Within the ring shaped lens barrel 102 there are provided a semiconductor laser 26, condenser lenses 28 and 29, and a light reception element 27, in the specified order along an optical path 104, all being incorporated in the laser AF section 30. As shown in FIG. 4, the semiconductor laser 26 and the condenser lens 28 are arranged on one side of the optical axis 103 of the imaging section 25, and the light reception element 27 and the condenser lens 29 are arranged in a symmetrical position thereto on the other side of said optical axis 103. Here, a CCD line sensor is utilized as the light reception element 27. Further, transparent windows 39 and 40 are provided in the ring shaped lens barrel 102 in positions in front of the semiconductor laser 26 and the light reception element 27 respectively, so that laser light which is emitted from the semiconductor laser 26 can pass through these transparent windows 39 and 40 to impinge upon the light reception element 27.

The imaging section 25 and the laser AF section 30 are made so that the focal point position 105 of the imaging section 25 and the position at the center of the range of detection of the laser AF section 30 agree with one another. Accordingly, the optical axis 103 and the optical axis 104 intersect at this focal point position 105.

A gear 41 is provided upon the outer periphery of the ring shaped lens barrel 102. Further, a motor 31 is fixed in the lens barrel 101 upon a fixing bracket 42, and a gear 32 is fitted upon the rotation shaft of this motor 31. This gear 32 is meshed with the above described gear 41, and thereby, when the motor 31 rotates, the ring shaped lens barrel 102 is thereby rotated around the lens barrel 101. These gears 41 and 32 and the motor 31 are included within the AF rotation section 43. Accordingly, by controlling the amount of rotation of the motor 31, the arrangement of the laser AF section 30 can be changed over between a vertical orientation shown in FIG. 5A in which the plane which contains its optical axis 104 is a vertical one, and a horizontal orientation shown in FIG. 5B in which said plane is a horizontal one. It should be understood that the base portions of the motor 31 and the ring shaped lens barrel 102 are covered over by a cover 145.

Moreover, although in this first embodiment the construction is such that the lens barrel 102 is rotated by the use of a gear, in an alternative possible structure, it would be acceptable to rotate the lens barrel 102 by fitting a belt between the rotation shaft of the motor 31 and the lens barrel 102.

Further, an aperture 13 of rectangular shape elongated along the Z-axis direction is provided to the chassis 11 (refer to FIG. 1) in the range within which the measurement head 10 is shifted by the Y-axis shift section 16. The width of this aperture 13 is of the same size as the width of the measurement head 10. The end portion of the measurement head 10 projects to the outside from the aperture 13. Furthermore, in order to prevent trash or dust generated within the chassis 11 from leaking to the outside from the aperture 13, a dustproof sheet 14 is arranged across the aperture 13 above and below the measurement head 10. This dustproof sheet 14 is a belt shaped sheet whose width is somewhat wider than the width of the aperture 13, and it is made from a material well endowed with pliability and which has a low surface coefficient of friction, and moreover whose frictional endurance is high. Both the ends of this belt shaped dustproof sheet 14 are fixed to the Z-axis movable plate 501 by a fixture 44 (refer to FIG. 2), and by this construction the dustproof sheet 14 is extended in a ring around the interior of the chassis 11, as shown in FIG. 2. It should be understood that the fixture 44 does not hamper movement of the measurement head 10 along the Y-axis direction, and moreover that the gap between the fixture 44 and the measurement head 10 is set to be of very minute width, in order to prevent the leakage of trash or dust through between the fixture 44 and the measurement head 10 to the outside.

Further, four rollers 45 are arranged at the corner portions of the chassis 11, as shown in FIG. 2, and the dustproof sheet 14 is guided by these rollers 45. Due to the dustproof sheet 14 being guided by these rollers 45, it is maintained in a shape so as to extend along the inner wall surface of the front surface portion of the chassis 11, and is tightly held against the aperture 13 and blocks it, while being extended along the inner wall surfaces of the upper and lower surface portions and the rear surface portion of the chassis 11 with a certain space being left between it and said inner wall surfaces. Further, a spring member 46 is arranged at an intermediate position along the ring shaped dustproof sheet 14. This spring member 46 stretches the dustproof sheet 14 along its lengthwise direction, thus preventing the occurrence of loosening thereof.

Since the dustproof sheet 14 is extended in a ring shape with both of its ends being fixed to the Z-axis movable plate 501 in this manner, when the measurement head 10 is shifted along the Z-axis direction by the operation of the Z-axis shift section 17, then the dustproof sheet 14 also shifts along with the shifting of the measurement head 10. At this time, by the ring shape of the dustproof sheet 14 being fed while being guided by the rollers 45, the portions of the aperture 13 above and below the measurement head 10 are always covered over by the dustproof sheet 14, and the leakage of trash or dust within the chassis 11 to the outside is always positively prevented. Further, since both the ends of the dustproof sheet 14 are fixed to the Z-axis movable plate 501 so as not to hamper the motion of the measurement head 10 in the Y-axis direction, therefore it is still possible for the measurement head 10 to be projected and withdrawn from the aperture 13 along the Y-axis direction.

Figure 7:
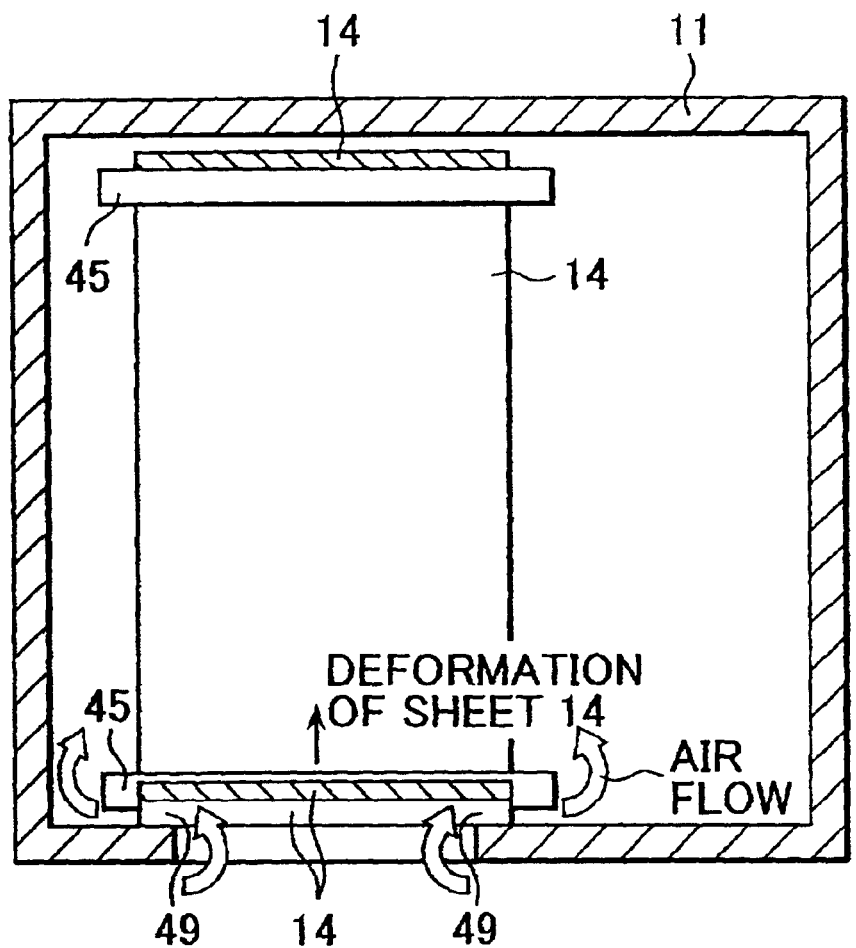
FIG. 7 shows a sectional view, taken looking along the arrows B–B' in FIG. 2, showing the situation when the pressure reduction fan 48 of this carrier shape measurement device according to the first embodiment of the present invention is operating.
Figure 8:
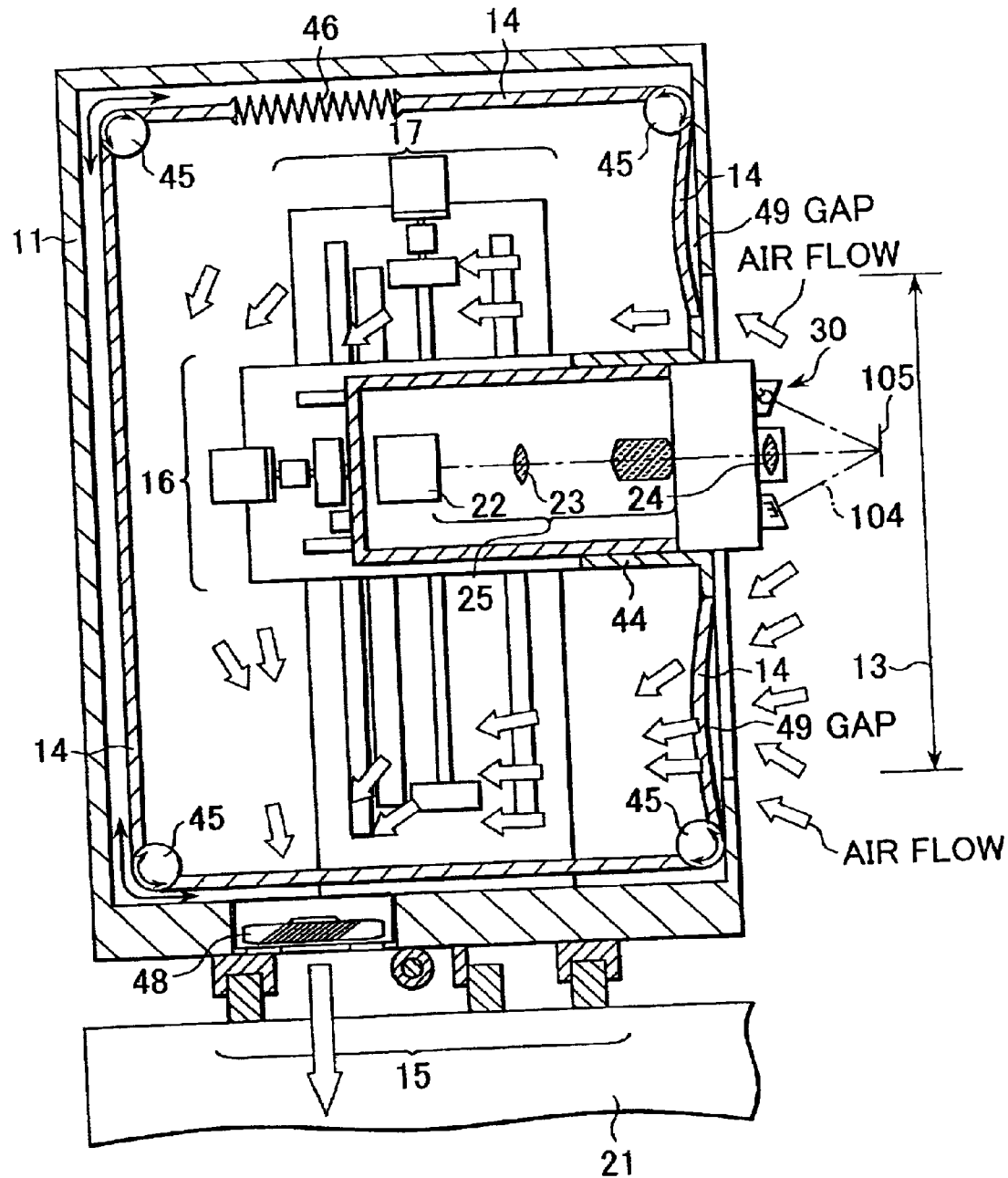
FIG. 8 shows a sectional view, taken looking along the arrows A–A' in FIG. 1, showing the situation when the pressure reduction fan 48 of this carrier shape measurement device according to the first embodiment of the present invention is operating.

An exhaust aperture 47 is opened through the lower portion of the chassis 11, and within it a pressure reduction fan 48 is disposed. This pressure reduction fan 48 is set to operate whenever the carrier shape measurement device according to this first preferred embodiment of the present invention is in the operational state. The inside of the chassis 11 achieves negative pressure by the operation of this pressure reduction fan 48. Due to this, the dustproof sheet 14 becomes somewhat bent as it is stretched toward the inner side at the aperture 13, and as shown in FIG. 8 a slight gap 49 is created between the chassis 11 and the dustproof sheet 14. Air flows in through this gap 49 from the outside into the interior of the chassis 11, as shown in FIGS. 7 and 8. Accordingly, it is possible yet more effectively to prevent the leakage of trash or dust which have been generated during operation by movable members inside the chassis 11, such as the X-, Y-, and Z-axis shift sections 15, 16, and 17 and the like, to the outside. Upon consideration of the sucking force of the pressure reduction fan 48, it should be noted that the magnitude of the reaction force by which the spring member 46 stretches the dustproof sheet 14 cannot prevent the generation of this gap 49, and in fact this reaction force is set so that no loosening in the dustproof sheet 14 away from its portions over the aperture 13 is caused.

Further, the outside of the chassis 11 is entirely covered over by a safety cover 50, except for its face which confronts the carrier 18 which is to be the subject of measurement. The size of the safety cover 50 is determined in consideration of the range of possible movement of the chassis 11 in the X-axis direction. Furthermore, the empty space in the upper portion of the stage 12 is covered over by a safety cover 51, except for its face which confronts the measurement head 10. The size of the safety cover 51 is determined in consideration of the size of the carrier 18 which is loaded. Further, the material from which the safety cover 51 is made is a material which has the optical characteristic of being non-transparent to the laser light which is emitted from the laser AF section 30 of the measurement section 10.

Further, to the upper portion of the safety cover 50 there is fitted a three color signal tower 52 for reporting the operational state of this carrier shape measurement device according to the first embodiment of the present invention.

Next, the image processing section 111, the controller 112, the host computer 113, and the input and output section 114 will be explained with reference to FIG. 3. The controller 112 comprises a CPU 53, a zoom drive control section 54, an XYZ drive control section 55, an XYZ counter 56, a laser control section 57, a rotation drive control section 58, a light adjustment control section 59, a fan control section 60, a state supervision and control section 61, and a joystick control section 62.

The zoom drive control section 54 outputs drive amount commands to the zoom drive section 35 of the measurement device main body 100 according to an imaging magnification ratio which it has received from a dimension measurement calculation processing section 64 of the host computer 113. By doing this, the amount of movement of the zoom lens of the optical system of the imaging section 25 is controlled, and thereby the imaging magnification ratio of the CCD camera 22 is controlled. Accordingly, it is possible to vary the imaging magnification ratio according to the size of the carrier 18 and the measurement accuracy which is to be required, and thereby it is possible to enhance the throughput.

The XYZ drive control section 55 receives shift commands from the dimension measurement calculation processing section 64 of the host computer 113, and commands the X-, Y-, and Z-axis shift sections 15, 16 and 17 of the measurement device main body 110 to be driven according thereto. Further, the XYZ counter 56 detects the coordinates to which the X-, Y-, and Z-axis shift sections 15, 16 and 17 have shifted, from the results of distance measurement which it receives from X-, Y-, and Z-axis distance measuring sections 36, 37 and 38 of the X-, Y-, and Z-axis shift sections 15, 16 and 17. The dimension measurement calculation processing section 64 of the host computer 113, along with shifting the measurement head 10 to the coordinates required for dimensional measurement by inputting these detected coordinates and controlling the amount of shifting by feedback, also performs minute adjustments in the Y-axis direction using the output results of the image processing section 111, and brings the focal point position 105 of the measurement head 10 to coincide with the subject for measurement.

Figure 5A:
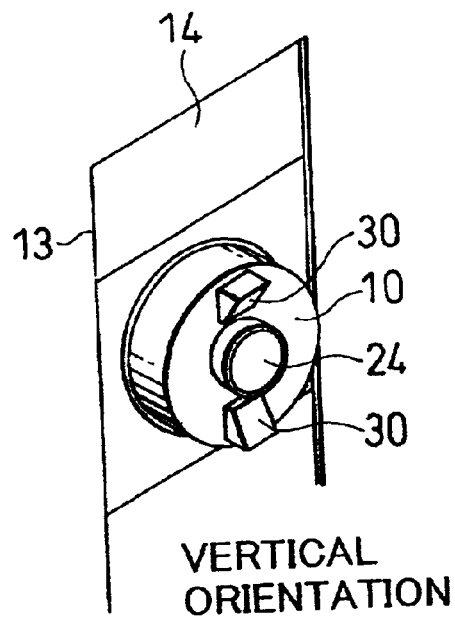
FIG. 5A shows a perspective view showing a laser AF section 30 of the measurement head 10 of the carrier shape measurement device according to the first embodiment of the present invention, in the case when it is oriented vertically.
Figure 5B:
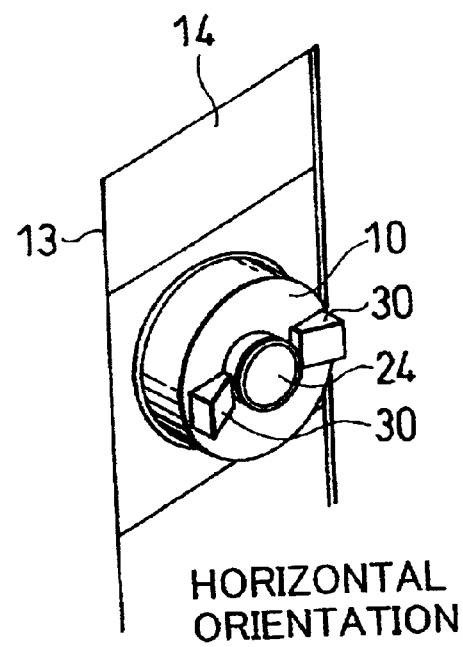
FIG. 5B shows it in the case when it is oriented horizontally.
Figure 6:
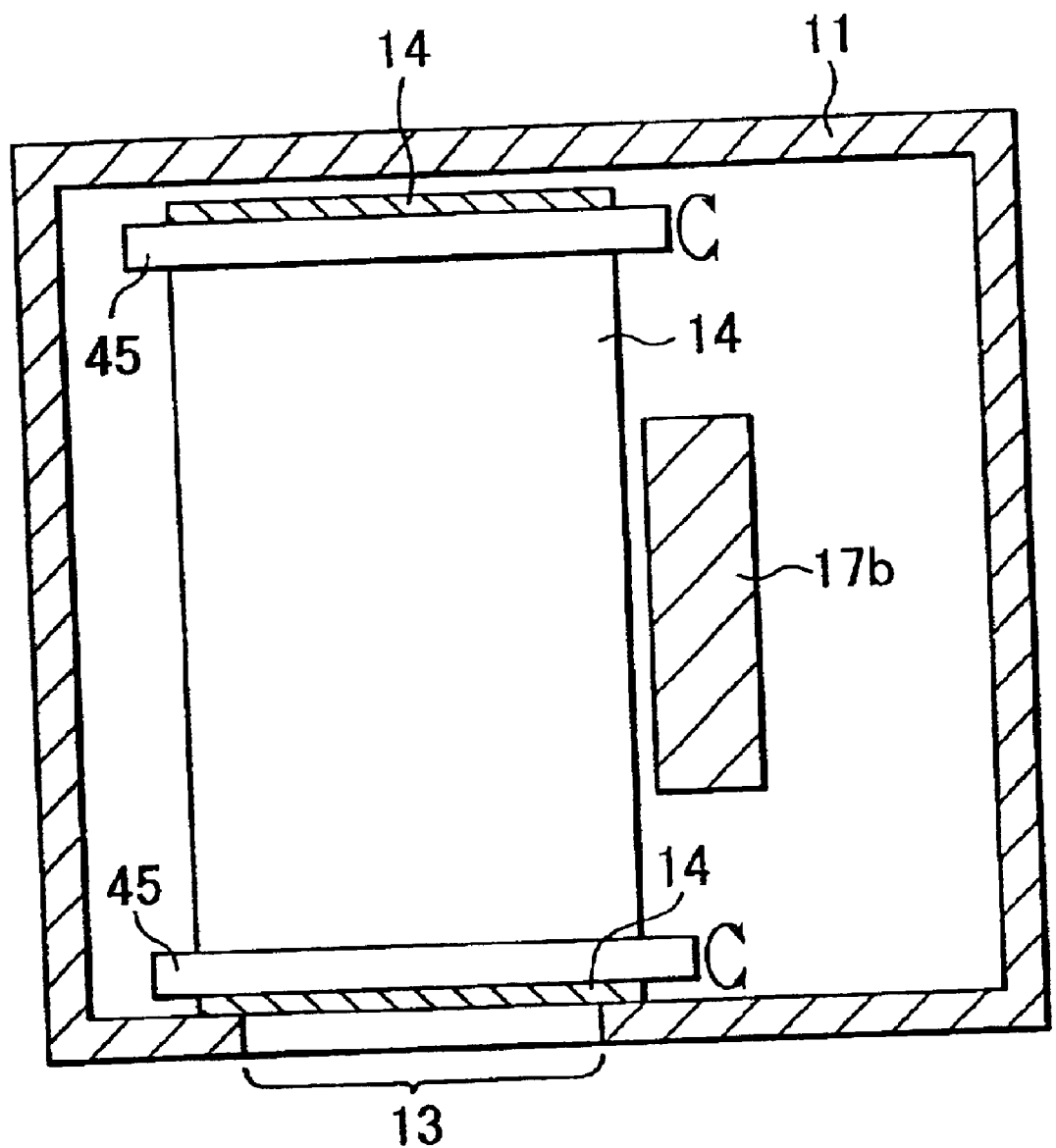
FIG. 6 shows a sectional view, taken looking along the arrows B–B' in FIG. 2, showing the situation when the pressure reduction fan 48 of this carrier shape measurement device according to the first embodiment of the present invention is not operating.

When the laser control section 57 has received a command from the host computer 113 for measurement using the laser AF section 30, along with outputting a command signal for light emission to the semiconductor laser 26 of the laser AF section 30, it also inputs a light reception signal from the light reception element 27 which comprises the CCD line sensor, and it derives the amount of deviation of the subject of measurement from the focal point position 105 by detecting at which position upon the CCD line sensor the laser light is being received. Further, when the rotation drive control section 58 has received a command from the host computer 113 which indicates to which of its orientations—the vertical orientation as shown in FIG. 5A or the horizontal orientation as shown in FIG. 5B—the laser AF section 30 is to be changed, it outputs a signal to the motor 31 of the AF rotation section 43 which commands it to rotate by a predetermined rotation amount exactly. Due to this, it is possible to change over the orientation of the laser AF section 30 to the vertical orientation or to the horizontal orientation.

The light adjustment control section 59 receives adjustment commands for the amount of illumination light from the host computer 113 which the input and output section 114 has received from the operator, and outputs a signal which increases or decreases the amount of light which is emitted by the illumination unit 34, as appropriate. By doing this, the amount of illumination light which is incident upon the subject of measurement through the objective lens 24 of the imaging section 25 is adjusted, and the brightness of the image which is formed by the CCD camera 22 is varied. When the state supervision and control section 61 has received a signal which indicates that the host computer 113 is operating, it illuminates a green signal upon the signal tower 52; while, when the dimension measurement calculation processing section 64 of the host computer 113 is performing calculation for processing the results of distance measurement by the laser AF section 30, it illuminates a yellow signal upon the signal tower 52. Further, when the state supervision and control section 61 has received a signal which indicates that the host computer 113 is commanding the laser control section 57 to perform measurement using the laser AF section 30, it determines that light is being emitted by the semiconductor laser 26, and it flashes the yellow signal upon the signal tower 52. Moreover, when the state supervision and control section 61 has received an error signal which has been output by the host computer 113, it illuminates a red signal upon the signal tower 52.

Furthermore, when a joystick of a joystick unit 71 of the input and output section 71 is actuated by the operator, the joystick control section 62 commands the X-, Y-, and Z-axis shift sections 15, 16, and 17 to drive directly, and performs control of the measurement head 10 by shifting it in the X-, Y-, and Z-directions by exactly the amount by which the joystick is operated.

The CPU 53 of the controller 53 performs overall control of the operation of the various elements within the controlled 112 as described above.

On the other hand, the image processing section 111 receives imaging information which is output by the CCD camera 22, performs image processing thereupon such as binarization processing and the like, and outputs it to the host computer 113.

The host computer 113 comprises a teaching management section 63, a dimension measurement calculation processing section 64, a measurement result management section 65, a man-machine interface 66, and a memory 67. In the memory 67 there is stored in advance a program which is utilized for performing a plurality of measurements for measuring the dimensions of places upon a carrier 18 which is to be the subject of measurement, as desired by the operator. The teaching management section 63 receives commands designating the places which the operator desires to measure, or designating the desired method of measurement, from a keyboard 68 or a mouse 69 via the man-machine interface 66, and selects a program in the memory 67 for implementing these commands. And, along with commanding the execution of the aforesaid program to the dimension measurement calculation processing section 64, it checks upon the progress thereof.

By reading in from the memory the program which has been designated by the teaching management section 63 and executing it, the dimension measurement calculation processing section 64 issues commands as described above to the various sections of the controller 112, so as to shift the measurement head 10 to the desired coordinates and so as to perform measurement by the imaging section 25 and the laser AF section 30 of the measurement head 10. In concrete terms, the coordinates of each pixel of the output image are converted into XYZ coordinates by performing calculation to establish a correspondence between the output coordinates of the XYZ counter 56 (in the XYZ coordinate system of the X-, Y- and Z-axis shift sections 15, 16 and 17) which correspond to the coordinates of the central point of the image which is output from the image processing section 111, and processing is performed in order to derive the dimensions between the desired places in the output image of the image processing section 111. Further, the dimension measurement calculation processing section 64 performs calculation processing and the like in order to measure and detect the distribution of dimensions in the Y-axis direction (the depth direction) of the subject of measurement with high accuracy, by deriving the amount of deviation of the subject of measurement in the Y-axis direction from the focal point position 105, using the laser AF section 30. It should be noted that the XYZ coordinates of the focal point position 105 at the time of measurement by the laser AF section 30 correspond to the central point coordinates of the output image of the image processing section 111.

The dimension data for each place which have been calculated by the dimension management calculation processing section 64 are stored in a memory within the measurement result management section 65. This measurement result management section 65 either displays the dimension data within its memory just as they are upon a CRT 70, or, according to the command of the operator, performs calculation to derive statistical data or dimension deviation (error) data or the like for the dimension data, and displays the results of this calculation upon the CRT 70.

Figure 9:
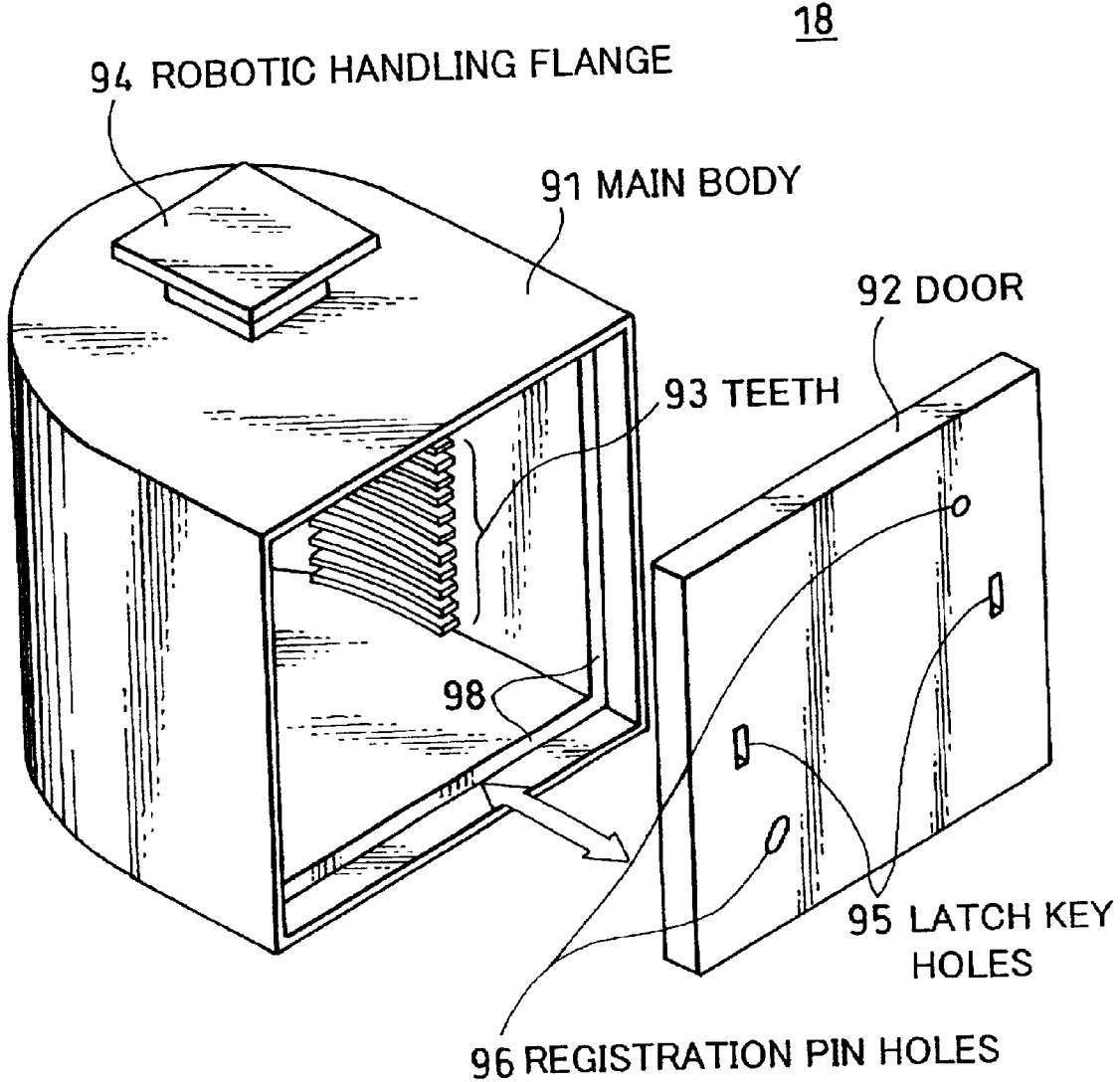
FIG. 9 shows a perspective view showing the structure of a FOUP type carrier 18 which can be measured utilizing the carrier shape measurement device according to the first embodiment of the present invention.
Figure 11:
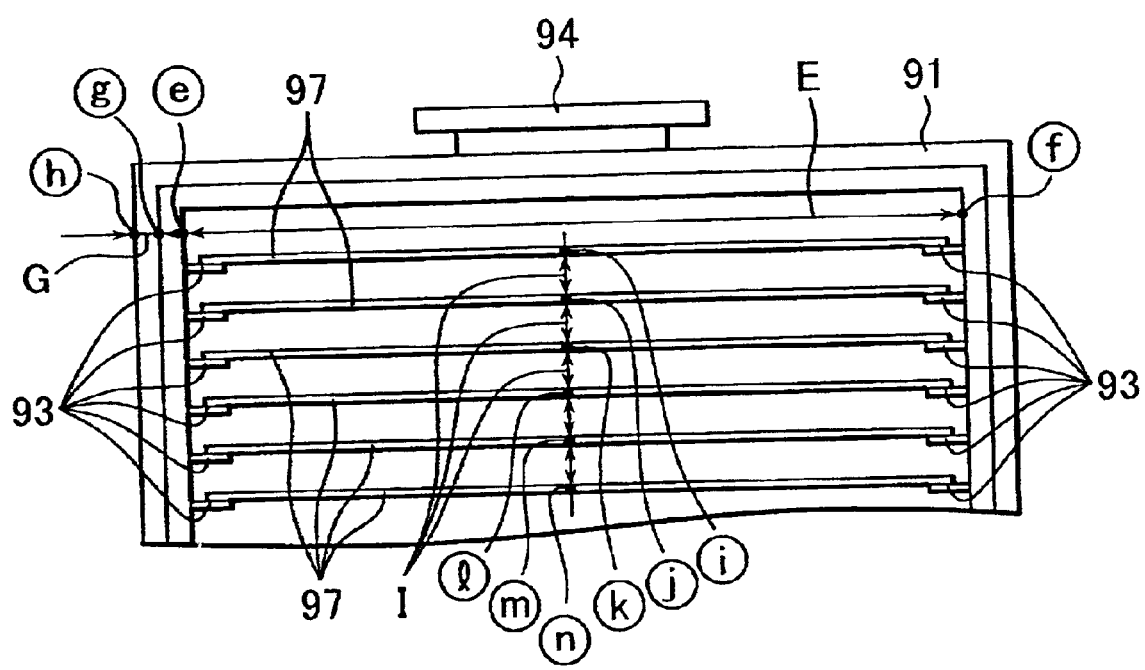
FIG. 11 shows an explanatory figure for explanation of an example of the situation and the measurement position when semiconductor wafers 97 are loaded into the carrier 18 of FIG. 9.

Now, the structure of a FOUP type carrier 18 which is the subject of measurement by this carrier shape measurement device according to the first embodiment of the present invention will be explained in detail with reference to FIG. 9. FOUP (Front Opening Unified Pod) is a carrier shape which is specified by the SEMI standard, and it is a carrier of the sealed type which receives wafers of 300 mm diameter. In concrete terms, the FOUP carrier 18 comprises a main body 91 which has an aperture only at its front surface, and a door 92 which is for closing this aperture. On both the side surfaces of the inside of the main body 91 there are provided a plurality of projections, i.e. of so-called teeth 93, with fixed spaces between them. Both the edges of wafers of 300 mm diameter are supported by these teeth 93 as shown in FIG. 11. Further, three concave members (not shown in the figures) are provided upon the bottom surface of the main body 91. A kinematic coupling according to the SEMI standard is implemented by these three concave members engaging with the pins 20a, 20b and 20c of the kinematic plate 20 of the stage 12.

Further, the door 92 of the FOUP type carrier 18 is provided with registration pin holes 96 for positioning the door 92, and with latch key holes 95 for keeping the door 92 in the unlocked state or in the locked state. When the door 92 is opened, first, positioning of the door 92 is performed by registration pins of a loading port being inserted into the registration pin holes 96, and then, after the door 92 has been put into the unlocked state by latch keys being inserted into the latch key holes and being rotated, the door 92 is separated from the main body 91 by the load port pulling the door 92 forward to itself, as shown in FIG. 9.

It should be noted that the orientation of the kinematic plate 20 upon the stage 12 is arranged to be such that the aperture surface of the carrier 18 extends parallel to the XZ plane.

The carrier shape measurement device of this first embodiment is made so as to perform measurement by the measurement head 10 shifting in the X-, Y- and Z-directions as described above, and does not shift the carrier 18. Accordingly, since the carrier is not subjected to any vibration or shock or the like due to shifting, therefore it is possible to perform measurement with high accuracy in the state in which the semiconductor wafers 97 are loaded into the carrier 18. As for the places to be measured, although it is possible for the operator to measure places as desired, it is possible, for example, to obtain the width E of the interior of the opening in the carrier 18 by capturing with the imaging section 25 of the measurement head 10 an image which includes as places the points e, g and h shown in FIG. 11 and an image which includes the point f shown in FIG.

11; by the image processing section 111 detecting edge portions which correspond to the points e, f, g and h in these images; by the dimension measurement calculation processing section 64 calculating the coordinates of those points e, f, g and h; and by calculating the distance between the coordinates of the points e and f. Further, by calculating the distance between the points g and h, it is possible to obtain the width G of the edge of the aperture. It should be understood that, by performing the same measurements upon a plurality of places upon the carrier 18, it is possible to obtain the width E of the inside of the aperture and the width G of the edge of the aperture at a plurality of places. By doing this, it is possible to obtain the distributions of said widths E and said widths G. These measurements are performed upon the main body 91 of the carrier 18 in its state with the door 92 opened.

Further, in the same manner, as shown in FIG. 11, it is possible to measure the spaces I between the central portions of the front edges of the wafers 97 by forming with the imaging section 25 images including the points i, j, k, l, m and n at the central portions of the wafers 97, by the image processing section 111 detecting the edge portions which correspond to these points i, j, k, l, m and n in each of these images, and by the dimension measurement calculation processing section 64 calculating the coordinates of these points i, j, k, l, m and n, and deriving the spaces between the points i, j, k, l, m and n. At this time it is possible to measure the wafer spaces I at any positions such as at the edge portions of the wafer 97 or their central portions or the like, by using, for the X15 coordinates of the points i, j, k, l, m and n the X-coordinates of the desired positions upon the wafers 92 whose space I it is desired to obtain from the width E of the inner walls of the aperture which was previously derived.

Figure 10:
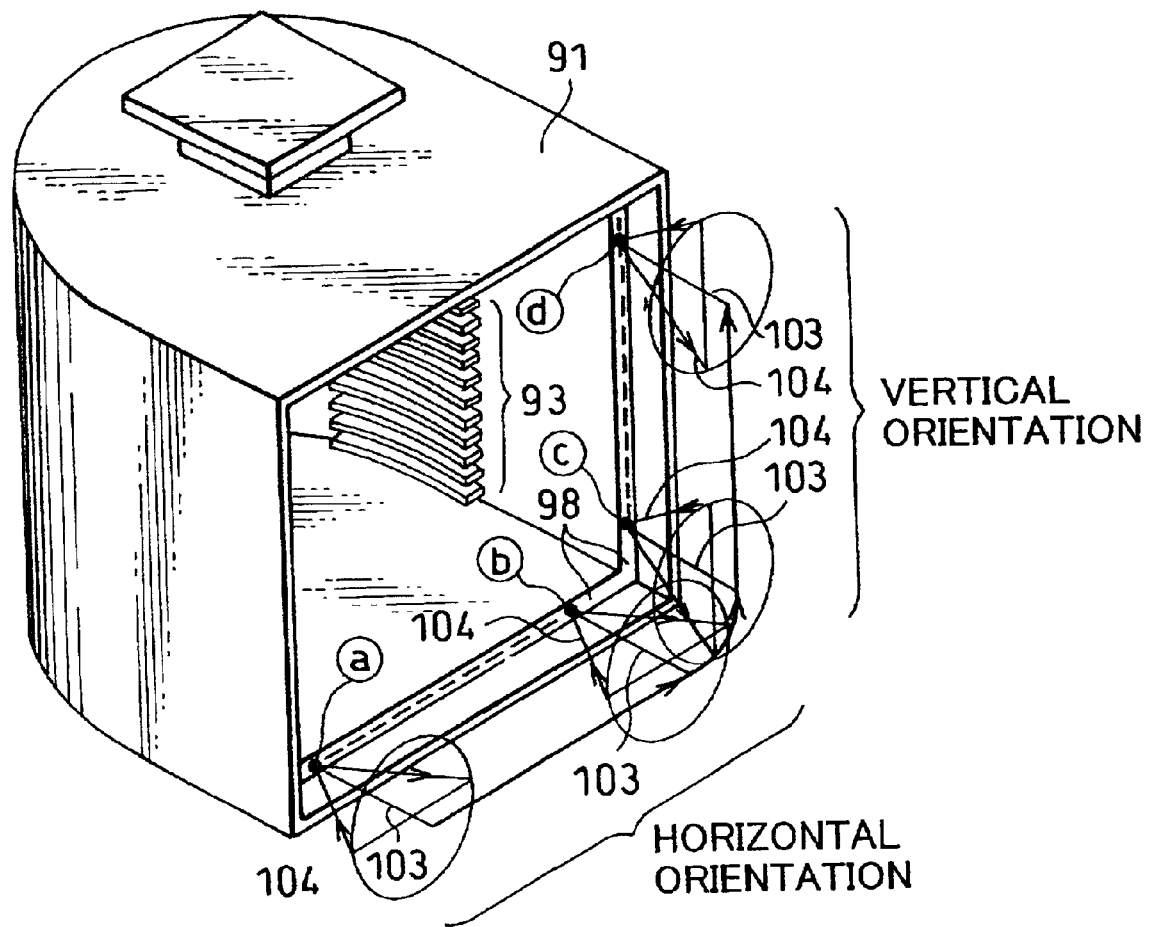
FIG. 10 shows an explanatory figure for explanation of the procedure for measurement of the degree of planarity of a surface 98 of a carrier 18 of FIG. 9 utilizing the carrier shape measurement device according to the first embodiment of the present invention.
Figure 12:
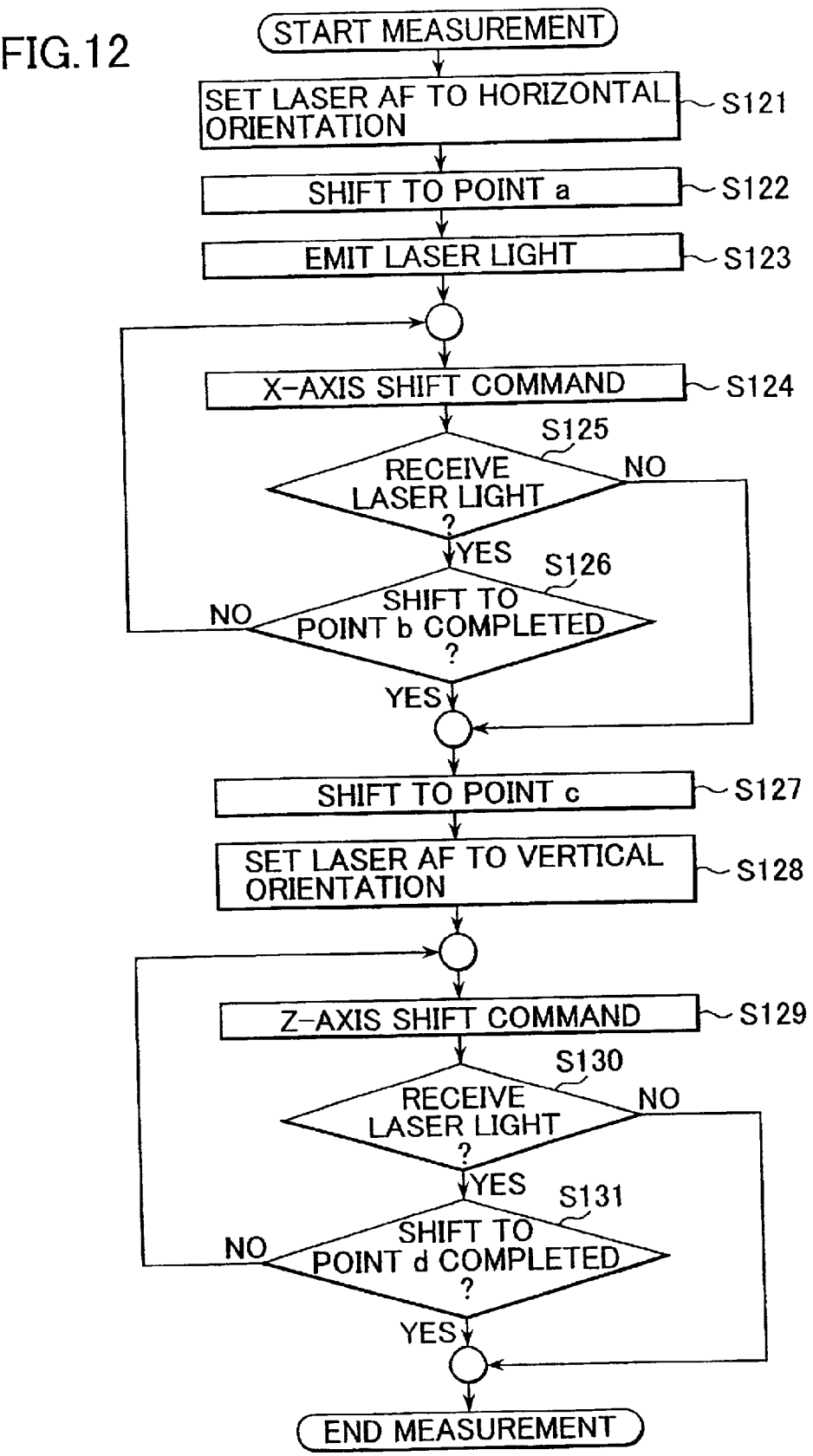
FIG. 12 shows a flow chart showing the operation for measuring the degree of planarity of the surface 98 of the carrier 18 of FIG. 9 utilizing the carrier shape measurement device according to the first embodiment of the present invention.
Figure 13A:
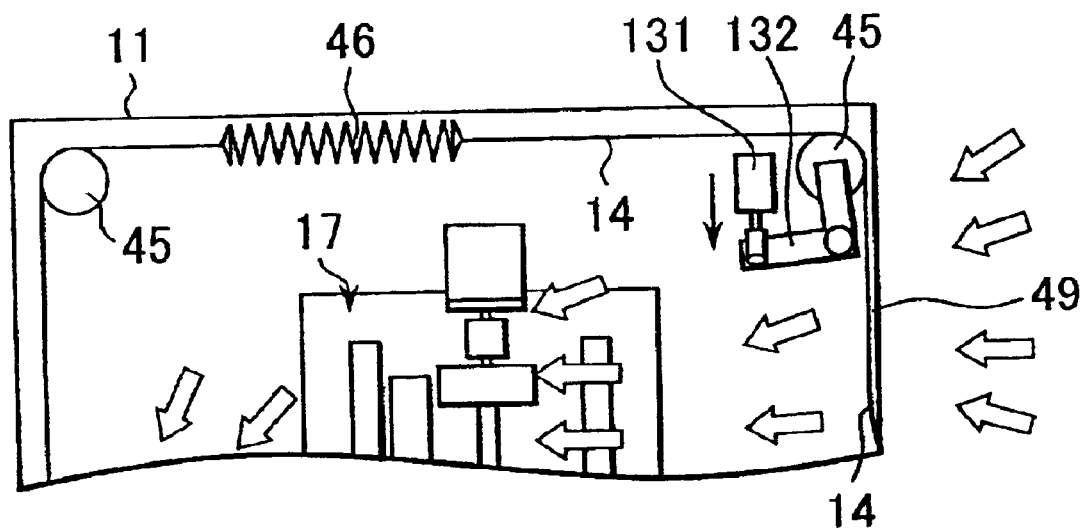
FIG. 13A shows, for the carrier shape measurement device according to the first embodiment of the present invention, an explanatory figure showing a structure in which a gap 49 can easily occur in a dustproof sheet 14.
Figure 13B:
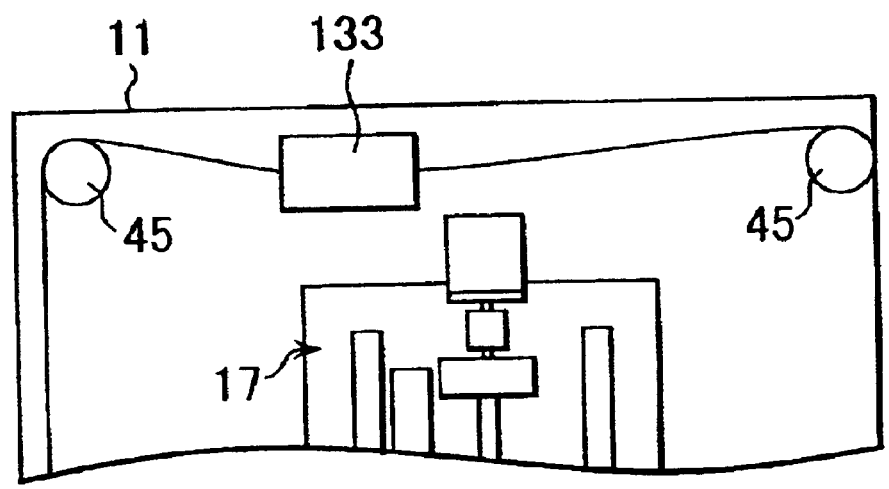
FIG. 13B shows another exemplary structure for preventing loosening of the dustproof sheet 14.

Further, in addition to forming an image by the imaging section 25 of the measurement head 10, it is possible to obtain the coordinates in the Y-axis direction with high accuracy by using the laser AF section 30. At this time, since as has been explained with reference to FIGS. 5A and 5B the direction of emission of laser light by the laser AF section 30 can be changed over between the vertical orientation and the horizontal orientation, therefore it is also possible to perform measurement with the laser AF section 30 for narrow portions where it is easy for the laser light to be eclipsed by a structure in which the subject of measurement projects forward. Herein, as an example of measurement using the laser AF section 30, the case of performing measurement operation for the degree of planarity (flatness) of the surface 98 at the edge of the aperture where the door hits and stops and will be described with reference to FIG. 10 and FIG. 12. The dimension measurement calculation section 64 reads in a program which is stored in the memory 67 the details of which are shown in the flow chart of FIG. 12, and performs measurement by executing this program. Although the coordinates of the points a, b, c and d in FIG. 10 are used in the flow chart of FIG. 12, they correspond to coordinates which the dimension measurement calculation processing section 64 had measured, before the above measurements, by forming an image by the imaging section 25, or coordinates which have been designated by the operator via the input and output section 114.

First, in a step S121, the orientation of the laser AF section 30 is set to the horizontal orientation shown in FIG. 5B by the dimension measurement calculation processing section 64 outputting commands to the rotation drive control section 58 for rotation of the AF rotation section 43 of the laser AF section 30. Next, in a step S122, the dimension measurement calculation processing section 64, along with commanding the XYZ drive control section 55 to perform shifting, also receives the results of detection from the XYZ counter 56 so as to perform feedback processing for the amount of shifting, and thereby shifts the focal point position 105 of the measurement head 10 to the point a upon the hitting surface 98. Next, in a step S123, the dimension measurement calculation processing section 64 commands the laser control section 57 to emit light from the semiconductor laser 26, and in this state while commanding (in a step S124) the XYZ drive control section 55 to shift the measurement head 10 in the X-axis direction at a speed which is determined in advance, it receives from the laser control section 57 (in a step S125) the amount of deviation of the subject of measurement from the focal point position 105 in the Y-axis direction. The dimension measurement calculation processing section 64 accurately calculates the Y-axis coordinate from the amount of deviation in the Y-axis direction which it has received from the laser control section 57. Further, as for the X- and Z-coordinates at each point, the detection signals from the XYZ axis distance measuring devices 36, 37 and 38 are read in by the XYZ counter 56 and these coordinates are determined therefrom. These steps S124 and S125 are repeated until it is determined in a step S126 that the coordinates of the measurement head 10 have reached the point b. However, if during this process it has become apparent from the output of the laser control section 57 that light reception by the light reception element 27 in the step S125 has become impossible, then it is determined that the laser light has eclipsed by the edge of the aperture, and the flow of control is transferred to a step S127.

In the step S127 the dimension measurement calculation processing section 64 shifts the measurement head 10 to the coordinates of the point c, in order to measure the accuracy of planarity of the hitting face 98 in the vertical direction. When performing this shifting, in the same manner as in the step S122, along with commanding the XYZ drive control section 55 to perform shifting, feedback processing is performed by receiving the results of detection from the XYZ counter 56. Next, by the dimension measurement calculation processing section 64 outputting commands to the rotation drive control section 58 so as to rotate the AF rotation section 43 of the laser AF section 30, the orientation of the laser AF section 30 is set (in a step S128) to the vertical orientation as shown in FIG. 5A. And while commanding (in a step S129) the XYZ drive control section 55 to shift the measurement head 10 in the Z-axis direction at a speed which is determined in advance, it receives from the laser control section 57 (in a step S130) the amount of deviation of the subject of measurement from the focal point position 105 in the Y-axis direction. The dimension measurement calculation processing section 64 accurately calculates the Y-axis coordinate from the amount of deviation in the Y-axis direction which it has received from the laser control section 57. Further, as for the X- and Z-coordinates at each point, the detection signals from the XYZ axis distance measuring devices 36, 37 and 38 are read in by the XYZ counter 56 and these coordinates are determined therefrom. These steps S129 and S130 are repeated until it is determined in a step S131 that the coordinates of the measurement head 10 have reached the point d, and then measurement is terminated. However, if during this process it has become apparent from the output of the laser control section 57 that light reception by the light reception element 27 in the step S130 has become impossible, then it is determined that the laser light is eclipsed by the edge of the aperture, and measurement is terminated.

The dimension measurement calculation processing section 64 derives the degree of planarity from the Y-coordinates of the various points upon the hitting surface 98 which have been obtained by this measurement process, and, along with storing the results thereof in the measurement result management section 65, also displays them upon the CRT 70.

In this manner, since in this first embodiment of the present invention the measurement head 10 is provided with the laser AF section 30, it is possible to measure the coordinates in the Y-axis direction with high accuracy. Accordingly, it is possible to measure the degree of planarity of the carrier 18 with high accuracy. Furthermore, since with the measurement of the above described hitting surface 98 it is possible to change over the orientation of the laser AF section 30 between the vertical orientation and the horizontal orientation while performing the measurement, therefore it becomes possible to perform measurement while following along the peripheral direction of a hitting surface 98 which could not be measured with the laser AF section 30 remaining in either one of the vertical orientation and the horizontal orientation alone, due to the laser light being eclipsed by the edge.

Figure 17:
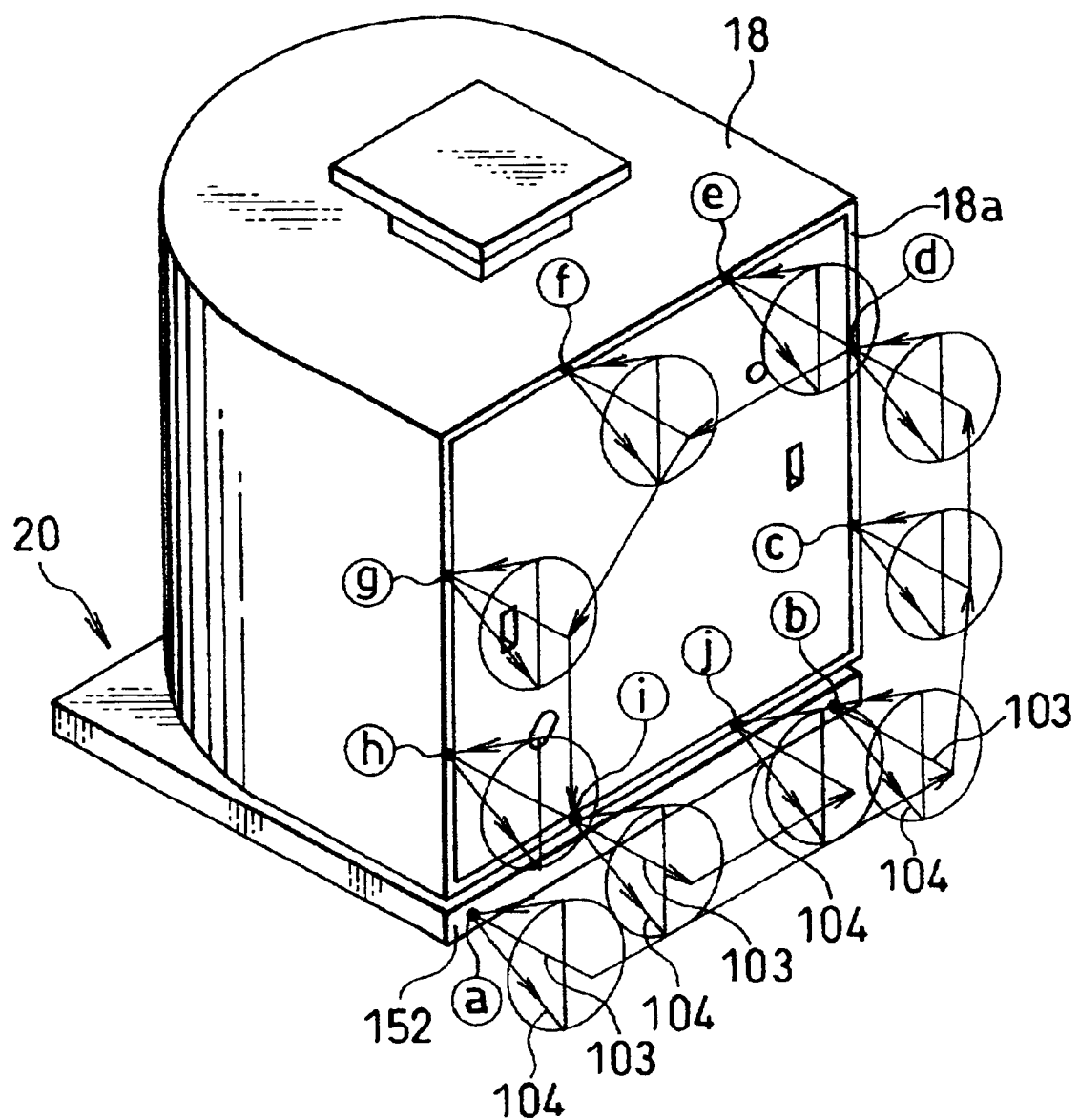
FIG. 17 shows an explanatory figure showing the procedure for measuring the degree of planarity of the front surface 18a of the carrier 18, utilizing the carrier shape measurement device according to the first embodiment of the present invention, and taking the front surface 152 of the kinematic plate 20 as a reference.
Figure 18:
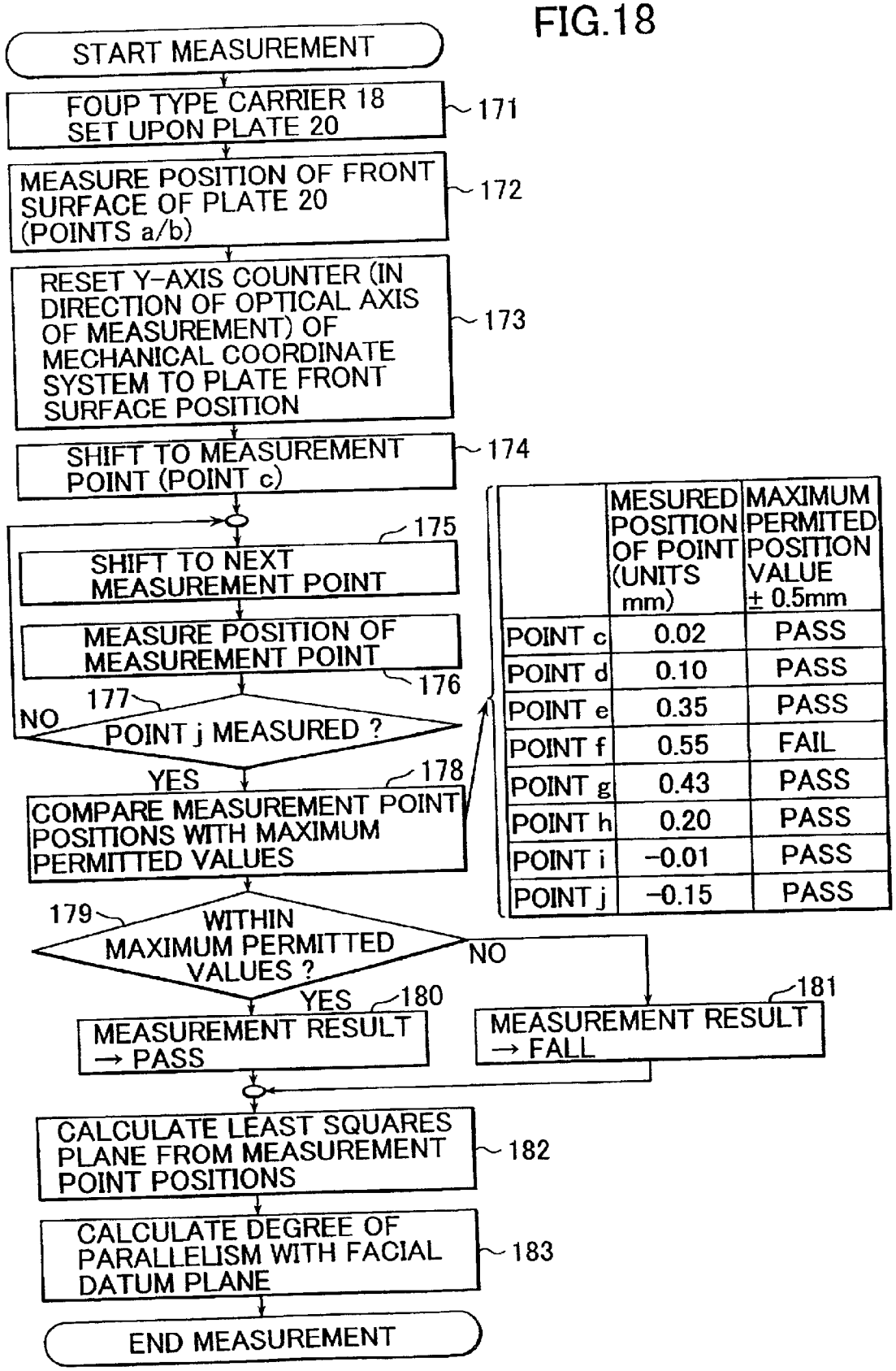
FIG. 18 shows a flow chart showing the measurement operation of FIG. 17.

Next, as an example of another measurement which is performed using the laser AF section 30, an example will be explained of the measurement of the distance from the facial datum plane 142 of the edge surface of an aperture in the front surface 18a of a FOUP type carrier 18, and of its degree of parallelism thereto. This measurement is performed by taking advantage of the fact that the front edge surface 152 of the kinematic plate 20 is parallel to the facial datum plane 142, and moreover coincides with the front surface 18a of the carrier 18. The measurement is performed by the dimension calculation processing section 64 executing a program which is stored in advance in the memory 67 and whose flow chart is shown in FIG. 18. Although in the flow chart of FIG. 18 the Y-coordinates of the points a through j in FIG. 17 are accurately measured by the laser AF section 30, the required XYZ coordinates for shifting the focal point position 105 of the measurement head 10 to the points a through j, correspond to coordinates which the dimension measurement calculation processing section 64 had measured before the above measurements by forming an image by the imaging section 25, or coordinates which were designated by the operator via the input and output section 114.

Referring to FIG. 18, first in a step S171 the dimension measurement calculation processing section 64 checks from the output of the control section of FIGS. 20 and 21 described above that the FOUP type carrier 18 is set upon the kinematic plate 20. Next, in a step S172, the dimension measurement calculation processing section 64, along with commanding the XYZ drive control section 55 to perform shifting, also receives the results of detection from the XYZ counter 56 so as to perform feedback processing for the amount of shifting, and thereby shifts the focal point position 105 of the measurement head 10 to the points a and b upon the front edge surface 152 of the kinematic plate 20, and measures the respective Y-axis coordinates of the points a and b by the laser AF section 30. The measured values are stored in the measurement result management section 65. Next, in a step S173, the Y-counter of the XYZ counter 56 is reset to zero at the Y-coordinate position of these points a and b. It should be noted that the Y-axis coordinates of the points a and b agree with one another, since the X-axis direction of the X-axis shift section 15 is accurately adjusted to be parallel to the front edge surface 152 by a process of adjustment of the directions of the XYZ axes which will be explained hereinafter with reference to FIGS. 23 through 27.

In steps S174 through S177, the dimension measurement calculation processing section 64 shifts the measurement head 10 to the points c through j in order, and measures the respective Y-axis coordinates by the laser AF section 30. By doing this, the positions along the Y-axis direction of the points c through j from the front edge surface 152 which was reset to are measured. In a step S178 the results of measurement are compared with certain maximum permitted values for them (±0.5 mm), and (in steps S180 and S181) if they are within their maximum permitted values then a pass decision is made, while if they are outside their maximum permitted values then a fail decision is made. Further, in a step S182 a least-squares plane is calculated using the positions in the Y-axis direction of the points c through j which have been measured and the XZ coordinates of these points c through j, and in a step S183 the degree of parallelism between this calculated plane and the facial datum plane 142 is calculated. The positions in the Y-axis direction of the points c through j determined above, and the decision results, and the degree of parallelism, along with being stored in the measurement result management section 65, are displayed upon the CRT 70.

In this manner, since with the shape measurement device of this first embodiment the front edge surface 152 of the kinematic plate 20 is a surface which is parallel to the facial datum plane 142 of the carrier 18, therefore it is possible to measure the degree of planarity of the front surface 18a of the carrier 18 with reference to the facial datum plane 142 of the carrier 18. By doing this, it is possible to perform measurement with reference to the facial datum plane 142 without detecting the arrangement of the pins 20a, 20b and 20c. Accordingly, the result is obtained that it is possible accurately to ascertain the attitude of the carrier with reference to the facial datum plane 142 in practice during a manufacturing process for semiconductor devices which uses the carrier 18. Furthermore, if the position of the front edge surface 152 of the kinematic plate 20 coincides with the target position according to design of the front surface 18a of the carrier 18, then it is possible to perform measurement of the front surface 18a by a simple method of measuring the deviation of this front surface 18a with respect to the front edge surface 152. Also, when measuring the left side surface 18b of the carrier 18 as shown in FIG. 16, if the left edge surface 153 which shows the target position according to design of the left side surface 18b is prepared, it is likewise possible to perform measurement of the left side surface 18b by measuring their mutual deviation in the same manner. By forming upon the kinematic plate 20 a shape which shows the target position according to design in this way, it becomes possible to perform measurement without paying any attention to the datum plane of the carrier 18.

Further, since the kinematic plate 20 is made so as to have, not only a face parallel to the facial datum plane 142, but also faces parallel to the horizontal datum plane 141 and to the bilateral datum plane 143, therefore, in the same manner, by measuring the shape of the carrier 18 while taking these as datum planes, measurement can easily be performed based upon the horizontal datum plane 141 or upon the bilateral datum plane 143. Accordingly, in an actual process for manufacturing semiconductor devices using the carrier 18, it becomes possible to assure reliability of loading and unloading of the wafers which are stored in the carrier by the robot arm, and to ensure the reliability of opening and closing the door 92 of the FOUP type carrier 18, and to ensure the sealing characteristic with the load port which seals against the face 18a of the edge of the carrier 18.

Figure 29:
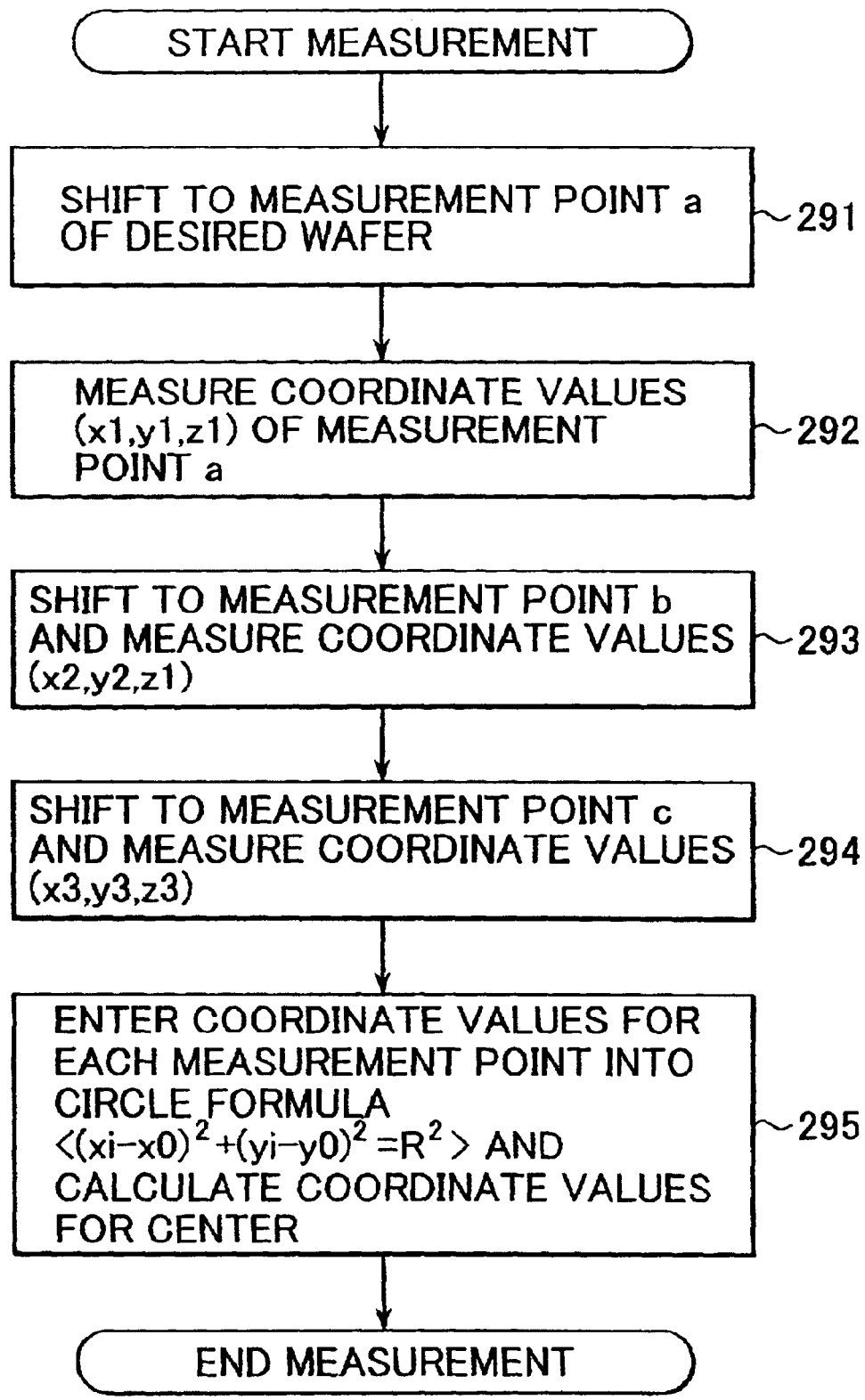
FIG. 29 shows a flow chart showing the measurement operation of FIG. 28.

Next as an example of yet another type of measurement using the laser AF section 30, the operation of measurement to obtain the X- and Y-coordinates of the center of a wafer 97 in its state as stored in a FOUP type carrier 18 from the shape of the front edges of this wafer 97 will be explained. This measurement operation as well is performed by the dimension measurement calculation processing section 64 executing a program which is stored in advance in the memory 67, like the one whose flow chart is shown in FIG. 29. Although in the FIG. 29 flow chart three points a, b and c are used as measurement points, the XYZ coordinates which are required for shifting the measurement head 10 to these points a through c, correspond to coordinates which the dimension measurement calculation processing section 64 had measured before these measurements by forming an image by the imaging section 25, or coordinates which were designated by the operator via the input and output section 114. First, in steps S291 and S292, the measurement head is shifted to the point a, and the coordinate values (X1, Y1, and Z1) of the point a are obtained by measuring with high accuracy the Y-coordinate by the laser AF section 30. In the same manner, for the points b and c, the coordinate values (X2, Y2, and Z2) of the point b and the coordinate values (X3, Y3, and Z3) of the point c are measured using the laser AF section 30. Then, in a step S295, the sets of X- and Y-coordinate values for each of the points a through c in turn are substituted into the formula for a circle $(Xi-X0)^2+(Yi-Y0)^2=R^2$, where i=1, 2 and 3, and the coordinate values (X0, Y0) for the center are calculated. By doing this, it is possible to calculate the X- and Y-coordinates (X0, Y0) of the center of the wafer 97 in its state when it is stored in the carrier 18.

Figure 30A:
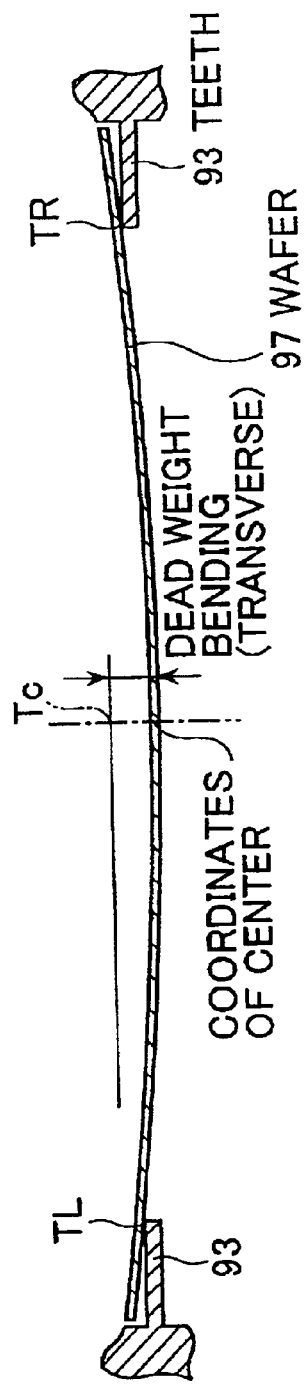
FIG. 30A shows, for the carrier shape measurement device according to the first embodiment of the present invention, a sectional view for explanation of the derivation of the height of the center of a wafer 97 from the coordinates of two teeth 93 which support the wafer in view of its dead weight bending.
Figure 31:
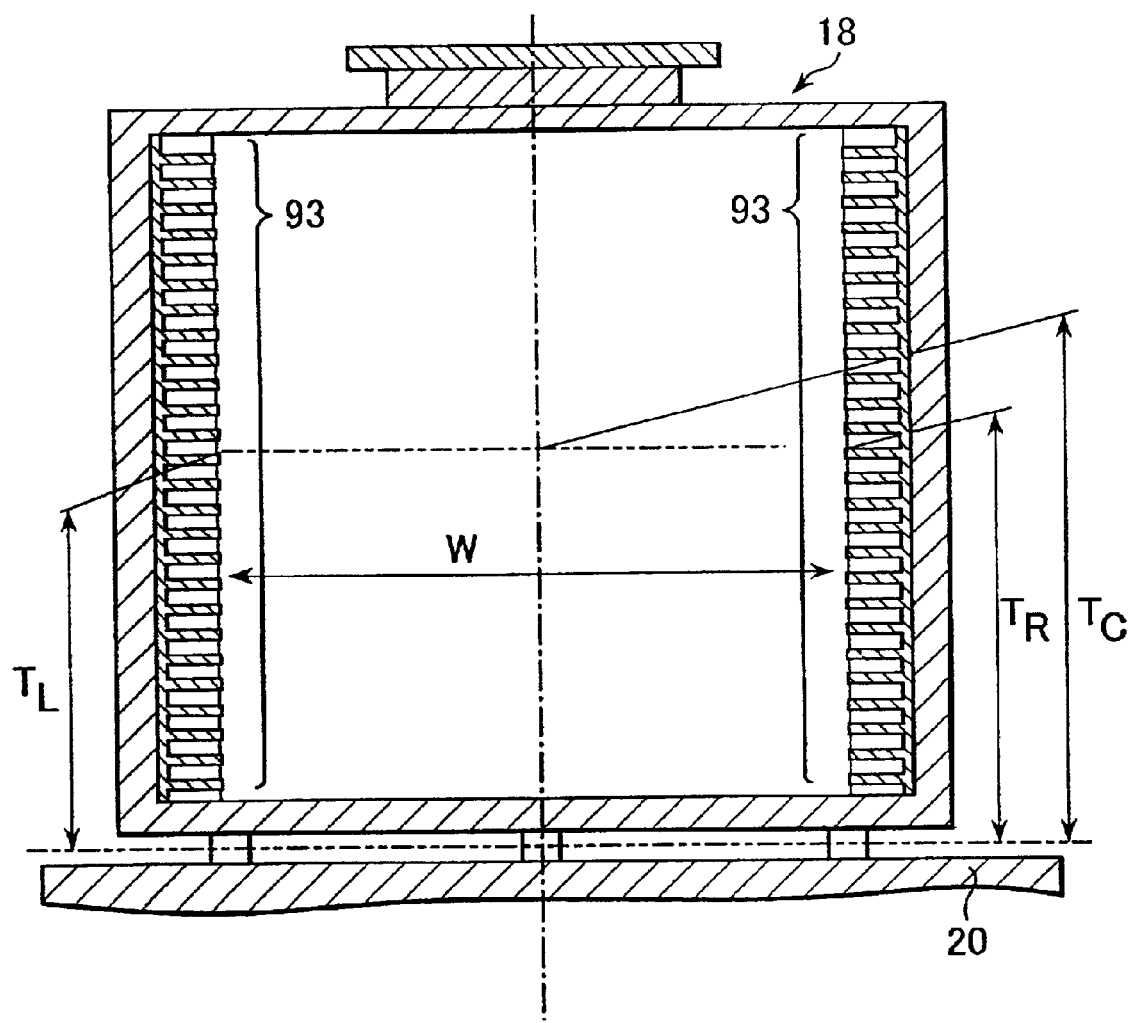
FIG. 31 shows a sectional view of the carrier 18 for explanation of the derivation of a hypothetical height Tc of a wafer from the coordinates of the teeth 93, with the carrier shape measurement device according to the first embodiment of the present invention.

Further, as for the height (the Z-axis coordinate Z0) of the coordinates of the center of the wafer 97, this can be derived by obtaining, from the coordinate values for the left and right teeth 93 which have been directly measured, a hypothetical height Tc of the wafer 97 as stored in a hypothetical state in which there is no dead weight bending in the wafer 97, as shown in FIG. 30A, and by adding thereto the amount of dead weight bending of the wafer 97. The dead weight bending of the wafer 97 is a bending amount which is determined by the diameter of the wafer 97 and by its thickness and material, and it can be obtained by calculation. It is possible to calculate the hypothetical height Tc by substituting the heights (Z-coordinates) TL and TR which have been measured for the end portions of the left and right teeth 93 at the position of the facial datum plane 142, as shown in FIG. 31, into the equation Tc=(TR+TL)/2. Furthermore, it is possible to calculate a hypothetical inclination θ of the wafer in its stored state from the equation $θ=\tan^{-1}((TR-TL)/W)$, where W is the space between the left and right teeth 93. And it is possible to obtain a hypothetical height Tc and a hypothetical inclination θ for each pair of mutually opposing teeth 93 in the two left and right stacks of teeth in the carrier 18. By doing this, it is possible to derive the height coordinate of the center of each of the wafers 97 which are stored in the carrier 18.

Figure 30B:
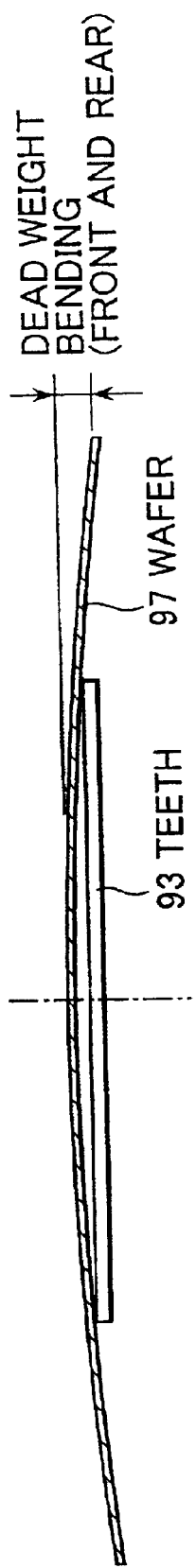
FIG. 30B shows a sectional view for explanation of the bending by the teeth 93 of the wafer 97 around said teeth 93.
Figure 32:
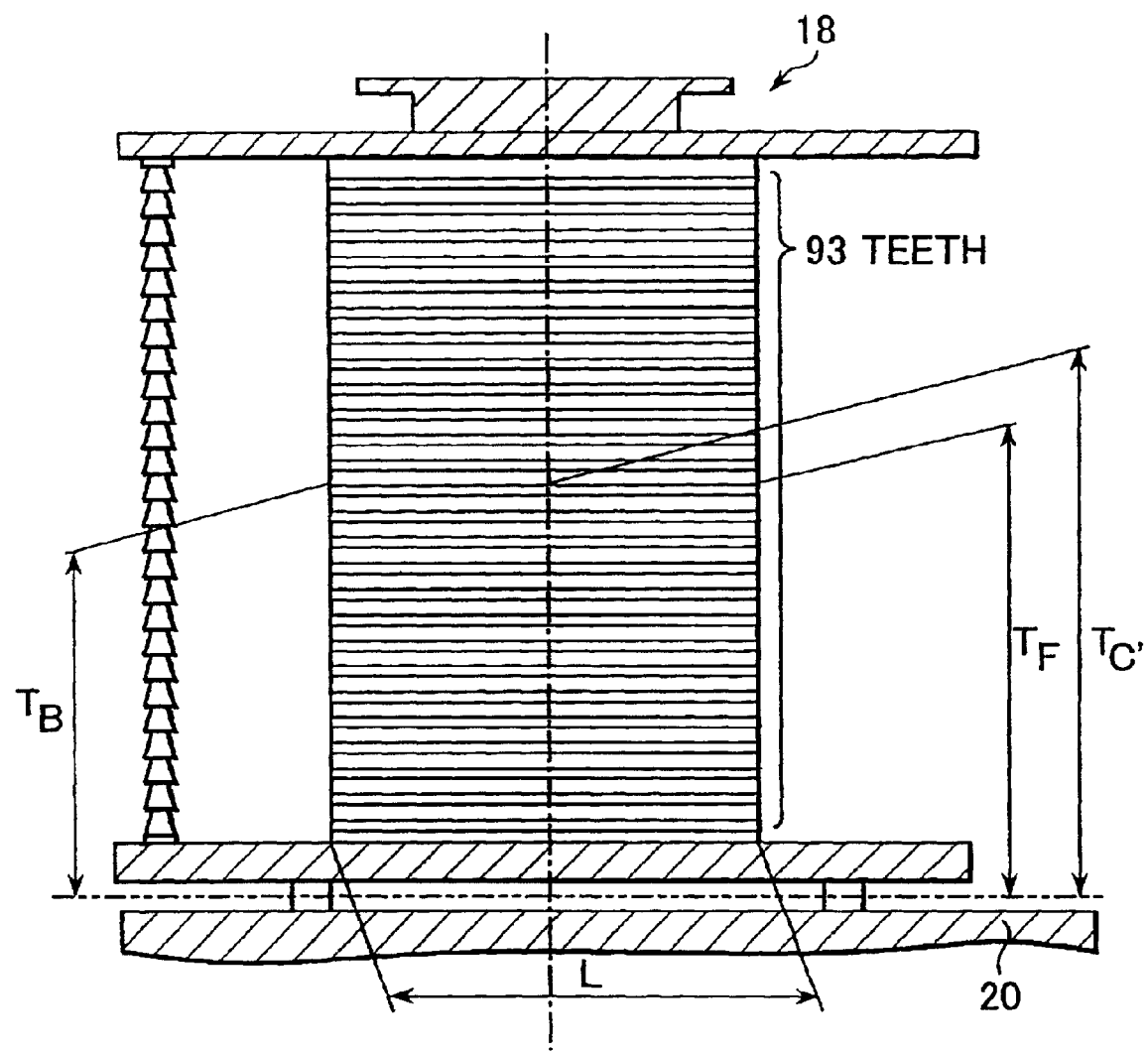
FIG. 32 shows a sectional view of a carrier 18 for explanation of the derivation of a hypothetical height Tc' of the teeth from the coordinates of the teeth 93, with the carrier shape measurement device according to the first embodiment of the present invention, in the case that the carrier 18 is an open carrier.

Further, in the case that the carrier 18 is not of the FOUP type but of the open type, as shown in FIG. 32 it is possible to measure the height TF of the front edge of each tooth 93 and the height TB of its rear edge. And then it is possible to calculate a hypothetical height Tc' of the center of the tooth 93 in the front to back direction by substituting these values into the equation Tc'=(TF+TB)/2. In the same manner, it is possible to calculate a hypothetical front to back inclination θ' of the tooth 93 from the equation $θ'=\tan^{-1}((TF-TB)/L)$, where L is the front to back length of the tooth 93. Furthermore, it is possible to obtain the height of the center of the wafer 97 as it rests upon the teeth 93 by allowing for bending of the wafer 97 around the teeth 93 due to its dead weight, as shown in FIG. 30B.

Next, the operation of adjusting the X-, Y- and Z-shift axes of the X-, Y-, and Z-axis shift sections 15, 16 and 17 to be parallel with the x-, y- and z-axes of the FOUP type carrier 18 will be explained. The x-, y- and z-axes of the FOUP type carrier 18, as shown in FIG. 14, are axes determined by taking the left corner of the front surface of the carrier 18 as origin, and based upon the horizontal datum plane 141, the facial datum plane 142, and the bilateral datum plane 143. The x-axis is parallel to an intersection line of the facial datum plane 142 and the horizontal datum plane 141; the y-axis is parallel to an intersection line of the bilateral datum plane 143 and the horizontal datum plane 141; and the z-axis is parallel to an intersection line of the facial datum plane 142 and the bilateral datum plane 143. By adjusting the X-, Y- and Z-shift axes of the X-, Y-, and Z-axis shift sections 15, 16 and 17 to be parallel with the x-, y- and z-axes of the carrier 18, it is possible accurately to ascertain the shape and the attitudes of the carrier 18 and of the wafers 97 which are stored therein based upon these x-, y-, and z-axes. Furthermore, as for the shape of the carrier 18, since there are many elements which are parallel with the x-, y-, and z-axes, simply by shifting one or two of the axes of the X-, Y-, and Z-axis shift sections 15, 16 and 17, it becomes possible to locate the measurement points within the focal depth of the imaging section 25 and the laser AF section 30, and thus it becomes possible to shorten the time taken for measurement.

Figure 23:
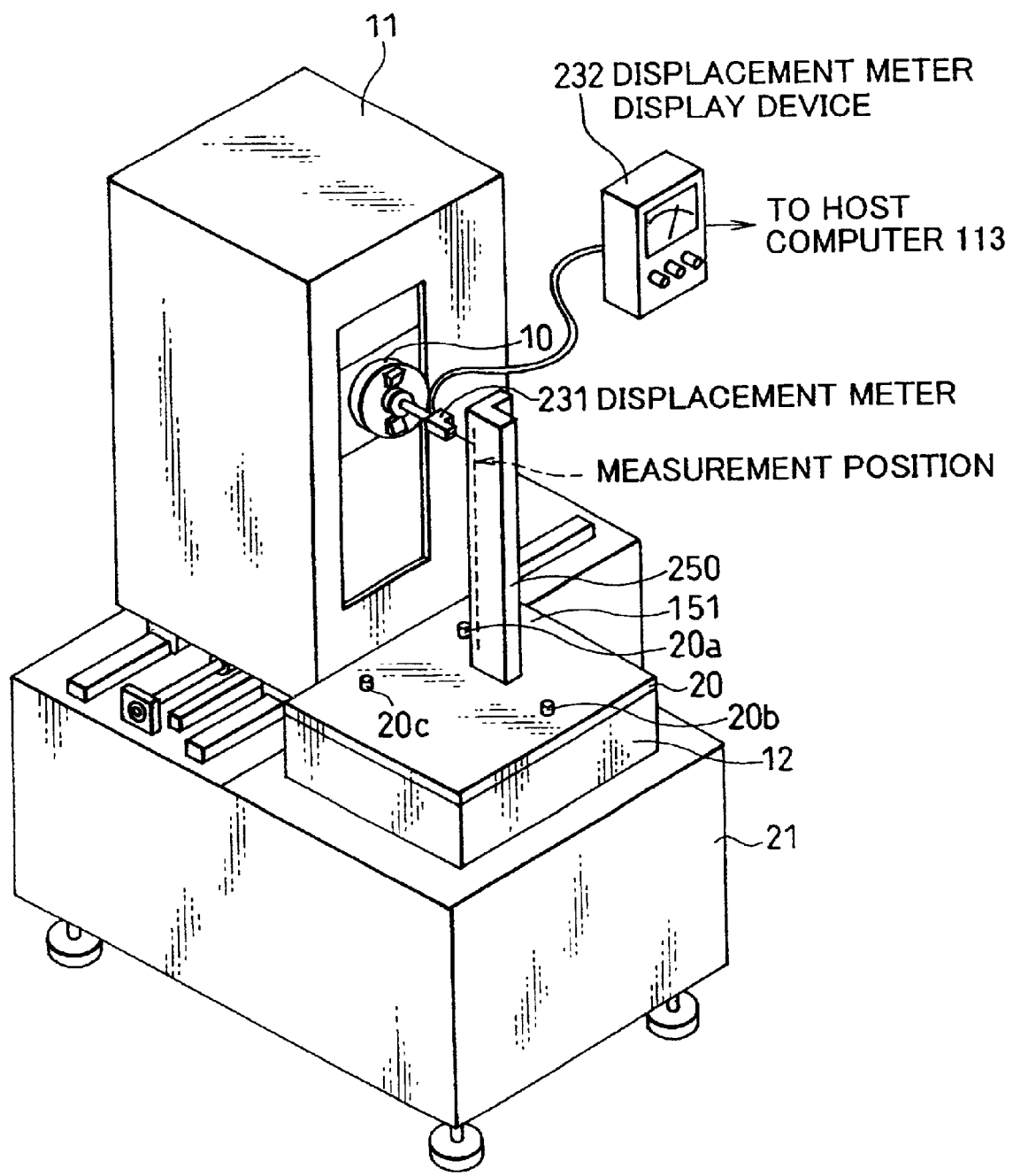
FIG. 23 shows a perspective view showing, for the carrier shape measurement device according to the first embodiment of the present invention, the structure when performing the operation of adjustment in the axial directions of X-, Y-, and Z-axis shift sections 15, 16, and 17.
Figure 25B:
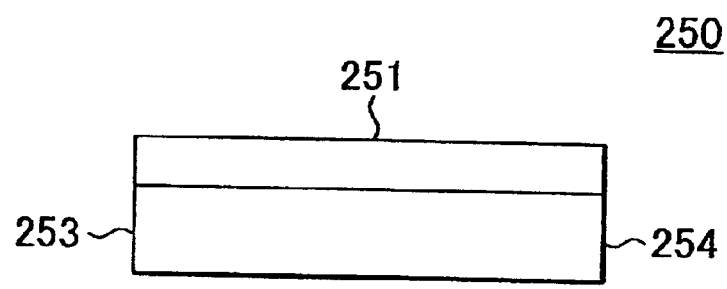
FIG. 25B shows a side view.
Figure 25A:
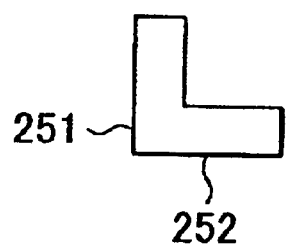
FIG. 25A shows a figure showing a plan view.
Figure 25C:
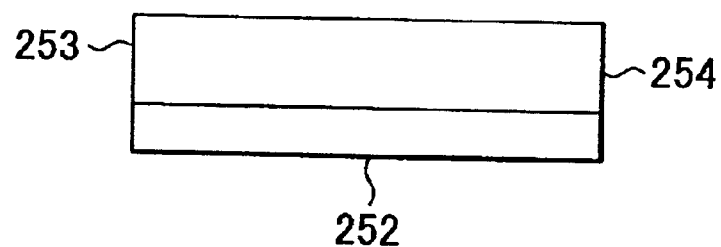
FIG. 25C shows another side view, of the structure of the right angle jig 250 which is utilized in the adjustment operation of FIG. 23.
Figure 26:
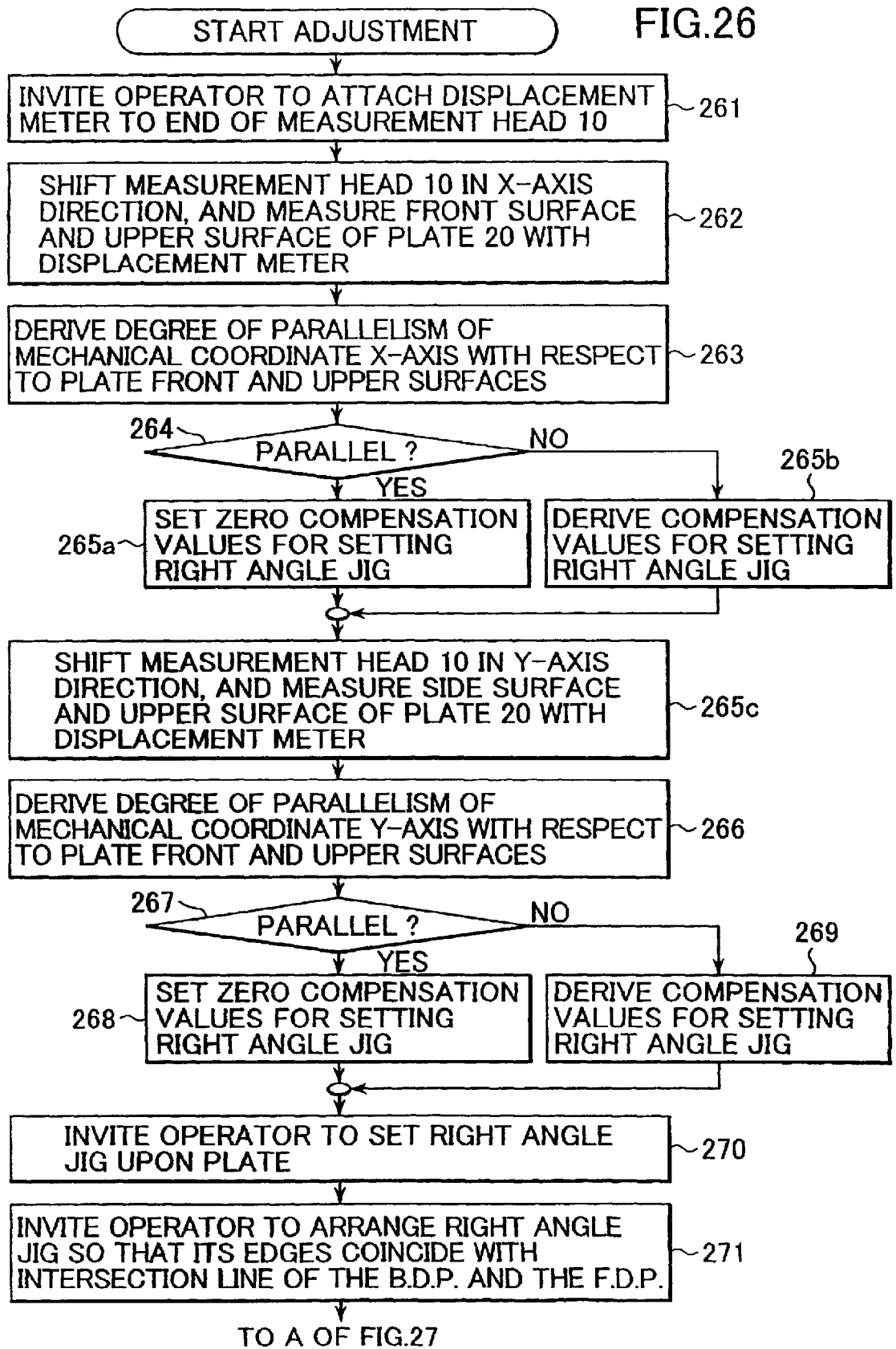
FIG. 26 shows a flowchart showing the adjustment operation of FIG. 23.
Figure 27:
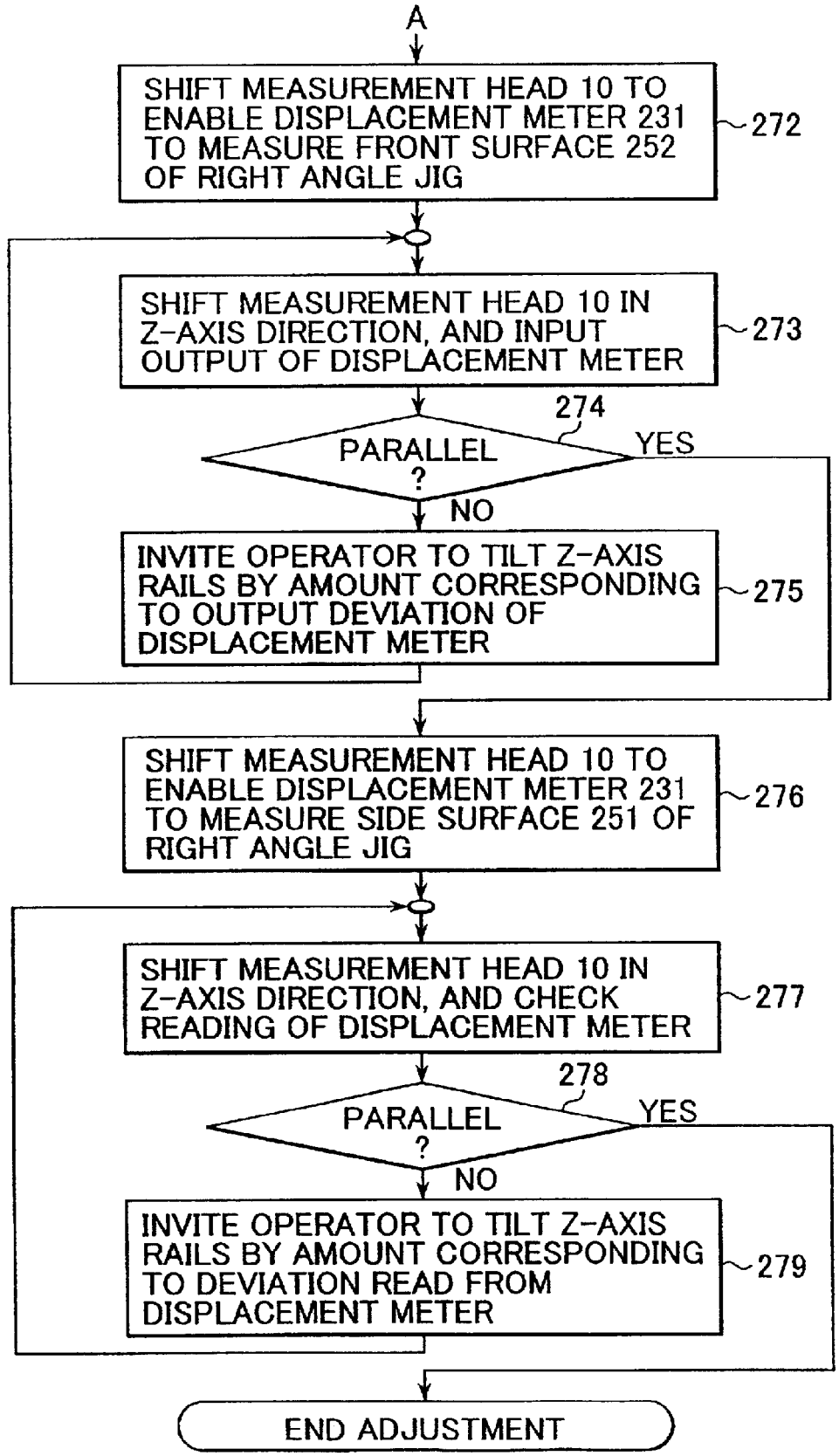
FIG. 27 shows a flow chart showing the adjustment operation of FIG. 23.
Figure 28:
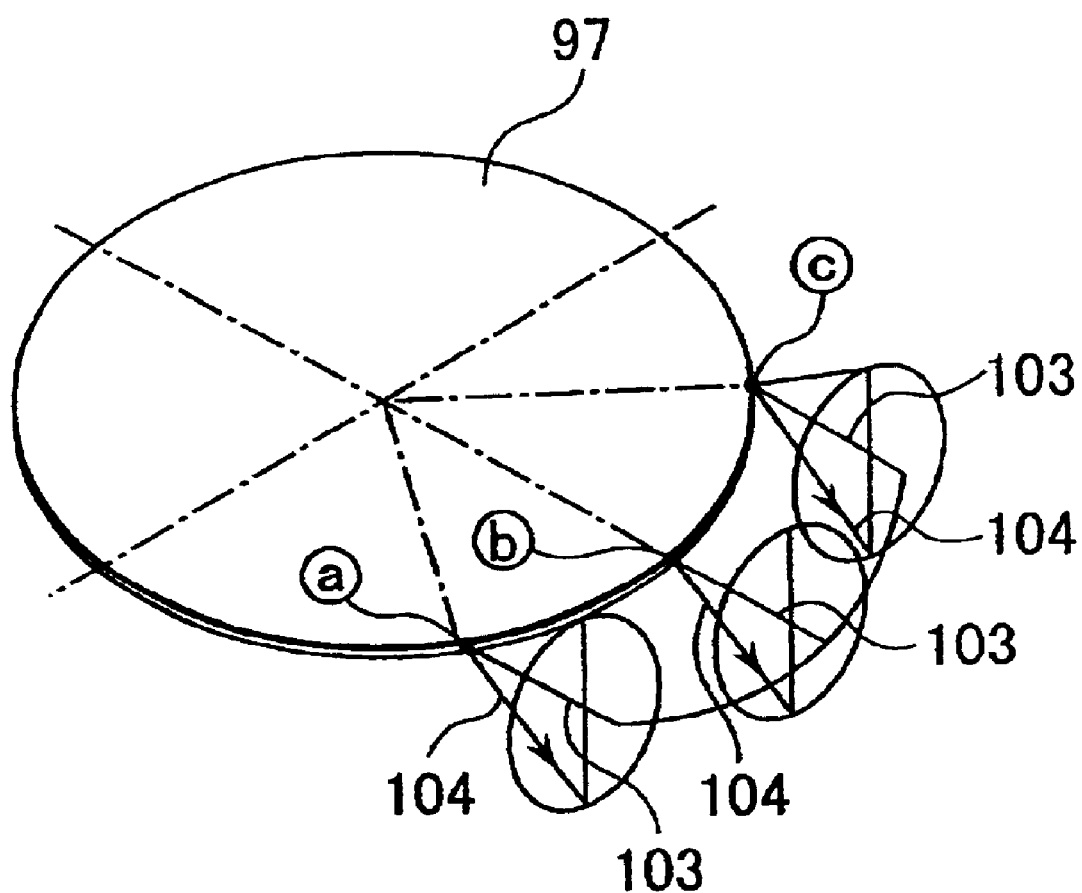
FIG. 28 shows an explanatory figure for explanation of measurement to derive the coordinates of the center of a wafer 97 from coordinates of points upon its front edge, with the carrier shape measurement device according to the first embodiment of the present invention.

The operation of adjusting the X-, Y- and Z-shift axes of the X-, Y-, and Z-axis shift sections 15, 16 and 17 to be parallel with the x-, y- and z-axes of the carrier 18 will now be explained with reference to FIGS. 23 through 27. A program whose flow chart is shown in FIGS. 26 and 27 is stored in advance in the memory 67 of the host computer 113. The dimension measurement calculation processing section 64 performs the above described adjustment process by reading in and executing this program. First, in a step S261, the dimension measurement calculation processing section 64 displays on the CRT 70 an invitation to the operator to attach a displacement meter to the end of the measurement head 10. The operator fits a displacement meter 231 as shown in FIG. 23. At this time, the axis of the sensor of the displacement meter 231 coincides with the optical axis 103 of the measurement head 10. Along with the output of the displacement meter 231 being displayed upon a displacement meter display device 232, it is also input to the dimension measurement calculation processing section 64. The operator actuates the joystick of the joystick unit 71, and shifts the end of the sensor of the displacement meter 231 up to the front edge surface 152 of the plate 20. In a step S262, while operating the X-axis shift section 15 to shift the measurement head 10 in the X-axis direction, the dimension measurement calculation processing section 64 inputs the output of the displacement meter 231 at this time. Since as has been explained previously the front edge surface 152 of the plate 20 is parallel to the facial datum plane 142, it is possible to detect the amount of inclination of the X-axis in the Y-axis direction by doing this. Next, the operator actuates the joystick, and shifts the end of the sensor of the displacement meter 231 up to the upper surface 151 of the plate 20. And, while operating the X-axis shift section 15 to shift the measurement head 10 in the X-axis direction, the dimension measurement calculation processing section 64 inputs the output of the displacement meter 231 at this time. Since the upper edge surface 151 of the plate 20 is parallel to the horizontal datum plane 141, it is possible to detect the amount of inclination of the X-axis in the Z-axis direction by doing this.

In a step S263 the dimension measurement calculation processing section 64 derives from the displacements which have been input the degree of parallelism of the X-axis of the X-axis shift section 15 with respect to the front edge surface 152 and the upper surface 151, and, if in a step S264 it is determined that they are adequately parallel then in a step S265a certain compensation values are taken to be zero, while if they are determined not to be adequately parallel then in a step S265b these compensation values (amounts of inclination) are derived for canceling the amounts of inclination of the X-axis with respect to the Y-axis and the Z-axis respectively; and then the flow of control proceeds to a step S265c. The dimension measurement calculation processing section 64 stores the derived compensation values in an internal memory, and thereafter, when shifting the X-, Y-, and Z-axis shift sections 15, 16 and 17 for adjustment or measurement operations, it always takes account of these compensation values, so that it is possible to adjust the shifting in the X-direction always to be parallel with the x-axis of the FOUP type carrier 18 by controlling the amounts of shifting.

Next, in the step S265c, the operator shifts the end of the sensor of the displacement meter 231 to the side edge surface 153 of the plate 20 and to its upper surface 152 respectively, and each time the dimension measurement calculation processing section 64 inputs the output of the displacement meter 231 while operating the Y-axis shift section 16 so as to shift the measurement head 10 in the Y-axis direction. By doing this, it is possible to detect the amount of inclination of the Y-axis in the direction of the X-axis and its amount of inclination in the direction of the Z-axis. In a step S266, the dimension measurement calculation processing section 64 derives from the values of displacement which have been input the degrees of parallelism of the Y-axis of the Y-axis shift section 16 with respect to the side edge surface 153 and the front edge surface 152, and, if in a step S267 it is determined that they are adequately parallel then in a step S268 the compensation values are taken to be zero, while if they are determined not to be adequately parallel then in a step S269 the compensation values (amounts of inclination) are derived for canceling the amounts of inclination of the Y-axis with respect to the X-axis and the Z-axis respectively; and then the flow of control proceeds to a step S270. The dimension measurement calculation processing section 64 stores the derived compensation values in an internal memory, and thereafter it always takes account of these compensation values when shifting the X-, Y- and Z-axis shift sections 15, 16 and 17, so that it is possible to adjust the shifting in the Y-direction always to be parallel with the y-axis of the FOUP type carrier 18 by controlling the amounts of shifting.

Figure 24:
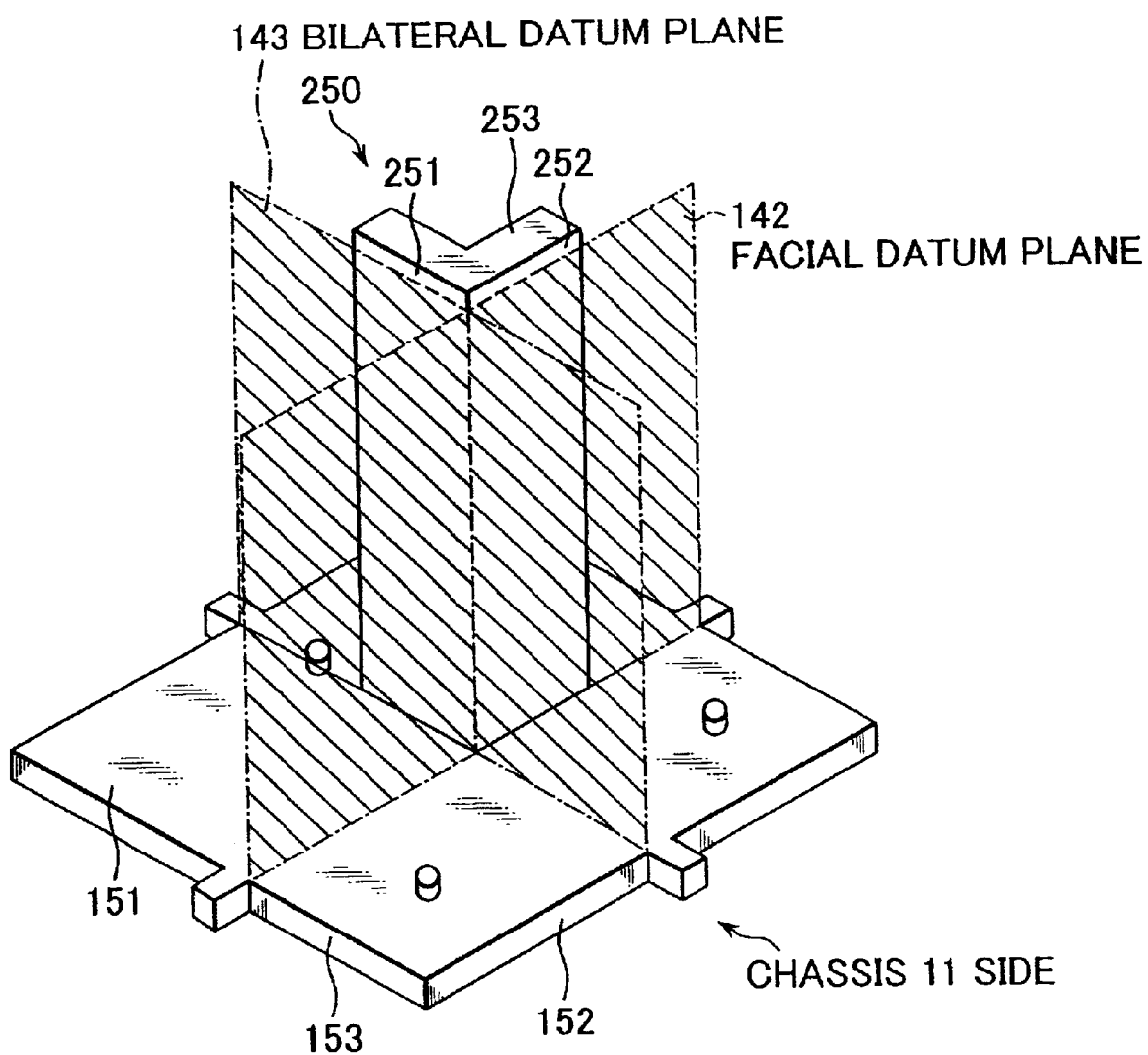
FIG. 24 shows an explanatory figure showing the relationship between the structure of a right angle jig 250 which is utilized in the adjustment operation of FIG. 23, and the datum planes.

Next, in steps S270 and S271, displays are provided which invite the operator to set a right angle jig (member) 250 upon the upper surface of the plate 20. As shown in FIG. 24, the operator loads the jig 250 upon the plate 20 so that the mutually perpendicular side surfaces 251 and 252 thereof coincide respectively with the bilateral datum plane 142 and with the facial datum plane 142. This right angle jig 250 is shaped as shown in FIGS. 25A, 25B and 25C, and its upper surface 253 and lower surface 254 are at right angles to its side surfaces 251 and 252; and, moreover, the side surface 251 and the side surface 252 are mutually at right angles to one another. And in a step S272 (refer to FIG. 27) the operator actuates the joystick so as to shift the end of the displacement meter 231 to a position for measuring the front surface 252 of the right angle jig 250. In this state, in a step S273, the dimension measurement calculation processing section 64 inputs the output of the displacement meter 231 while operating the Z-axis shift section 17 so as to shift the measurement head 10 in the Z-axis direction. By doing this, it is possible (in a step S274) to detect the amount of inclination of the Z-axis in the direction of the Y-axis. And, in order to compensate for this inclination amount, in a step S275 a display is provided upon the CRT 70 which invites the operator to perform adjustment in order to tilt the rails 17a of the Z-axis shift section 17 by the appropriate amount in the Y-axis direction. The operator adjusts the screws of the rails 17a, thus adjusting the direction of the rails 17a by tilting them in the Y-axis direction.

In the same manner, in the steps S276 through S279, the output of the displacement meter 231 is input while shifting the measurement head 10 in the Z-direction by shifting the Z-axis shift section 17, in order for the end of the displacement meter 231 to measure the side surface 251 of the right angle jig 250. And, again, the amount of inclination of the Z-axis in the direction of the X-axis is detected, and a display is provided upon the CRT 70 for extending an invitation to the operator to perform adjustment in order to tilt the rails 17a of the Z-axis shift section 17 by an appropriate amount in the X-axis direction for compensation. The operator adjusts the screws of the rails 17a, thus adjusting the axial direction of the rails 17a by tilting them in the X-axis direction. By doing this, it is possible to adjust the Z-direction of the Z-axis shift section 17 to parallelism with the z-axis of the FOUP type carrier 18 mechanically.

By the above operation, the XYZ axes of the X-, Y- and Z-axis shift sections 15, 16 and 17 can be adjusted to be parallel to the xyz axes of the FOUP type carrier 18. It should be noted that, by the above procedure, the adjustment of the X- and Y-axes is performed by compensation in software by the dimension measurement calculation processing section 64, while the adjustment of the Z-axis is performed mechanically; but it would also be possible, as an alternative, for the adjustment of all three of the X-, Y- and Z-axes to be performed by compensation in software, or alternatively for the adjustment of all three of the X-, Y- and Z-axes to be performed by mechanically adjusting the axes of their respective rails 15a, 16a and 17a.

Figure 33A:
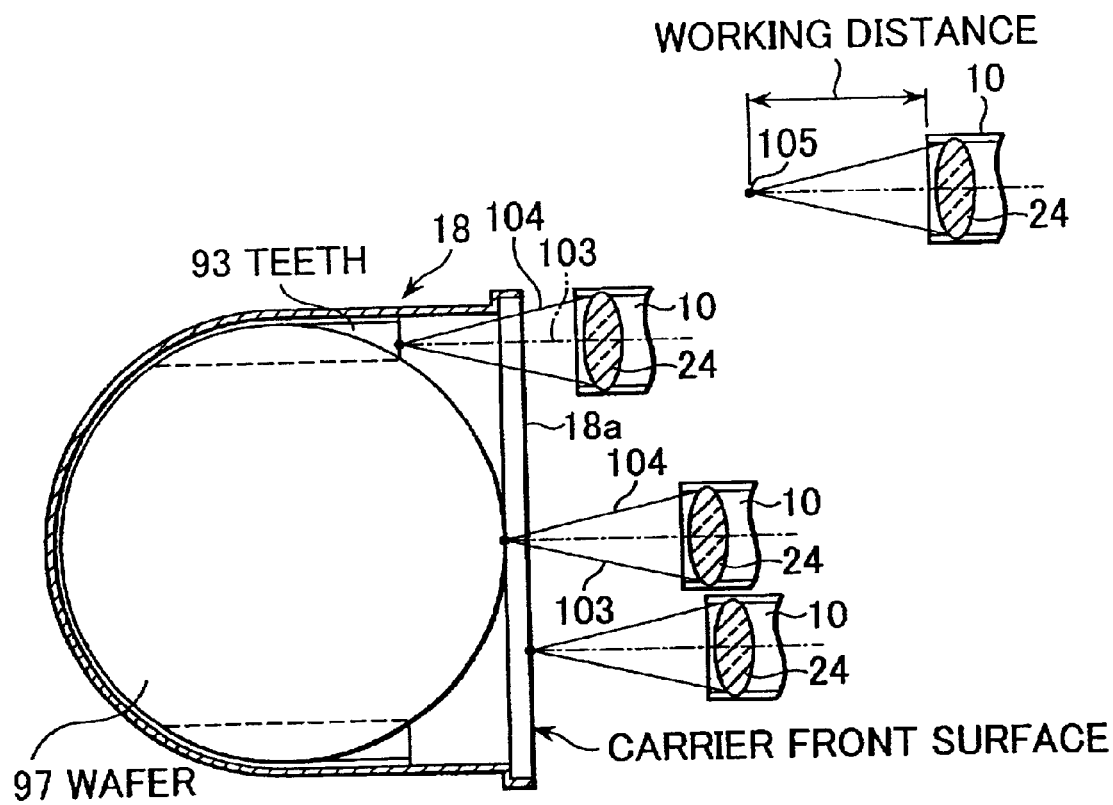
FIGS. 33A and 33B show explanatory figures showing the operational distance of the measurement head 10 of a carrier shape measurement device according to a second embodiment of the present invention.

Next, a second embodiment of the carrier shape measurement device according to the present invention will be explained. In this second embodiment, the distance between the focal point position 105 of the measurement head 10 and the tip of the measurement head 10, in other words the operational distance, is determined so as to be longer than the distance between the front surface 10a of the carrier 18 and the front ends of the teeth 93, as shown in FIG. 33A. Apart from this feature, the structure of this second embodiment is the same as that of the first embodiment described above. By the tip of the measurement head 10, there is meant its end portion which is positioned farthest in the direction of the subject of measurement. In the case of the structure shown in FIG. 4, the windows 39 and 40 of the ring shaped lens barrel 102 constitute the tip of the measurement head 10. It is possible to make the operational distance longer by suitably setting the focal distance of the lens system which includes the objective lens 24 and the condenser lenses 28 and 29 etc., and the orientation of the optical axis 104 of the laser AF section 30. Since, by making the operational distance longer than the distance between the front surface 18a of the carrier 18 and the front ends of the teeth 93, it is possible directly to measure the front ends of the teeth 93 while positioning the measurement head 10 in the vicinity of the front surface 18a of the carrier 18, therefore it is possible to measure the distance between the front surface 18a of the carrier 18 and the teeth 93, and the like, with good accuracy.

Figure 33B:
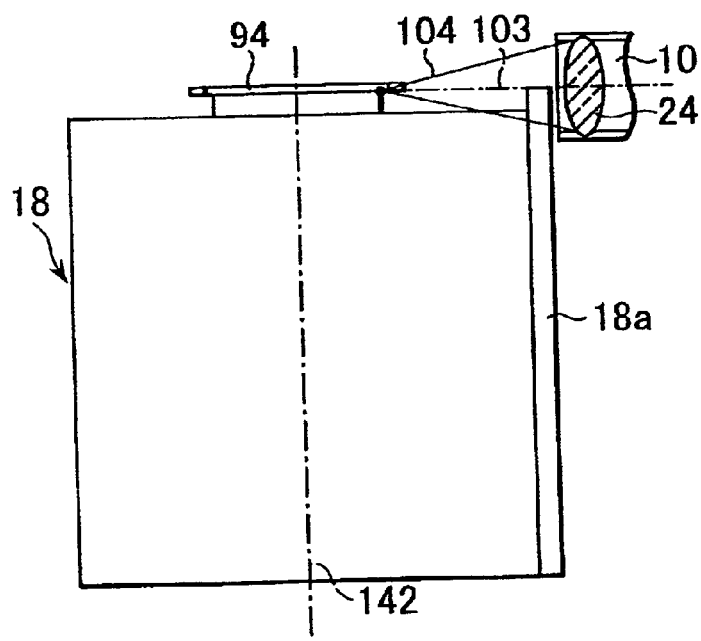

Further, by arranging that the operational distance of the measurement head 10 is even longer as shown in FIG. 33B, it becomes possible also to make it longer than the distance between the base portion of the robotic handling flange 94 and the front surface 18a. In this case, it becomes possible to measure the distance between the front surface 18a of the carrier 18 and the base portion of the robotic handling flange 94, and the like, with good accuracy.

It becomes possible to perform measurement with high accuracy, even for a large size carrier such as the carrier 18 which holds wafers 97 of 300 mm diameter, by setting the operational distance of the measurement head 10 in this manner to be long, since it is possible to measure the shape and the size by an optical method.

Figure 34A:
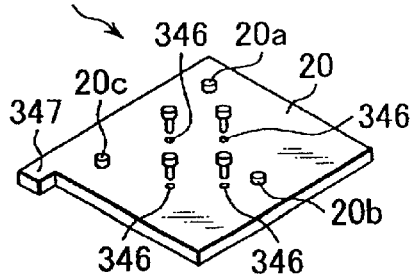
FIGS. 34A through 34D show, for a carrier shape measurement device according to a third embodiment of the present invention, perspective views of the kinematic plate 20 in various orientations.

Next, a third embodiment of the carrier shape measurement device according to the present invention will be described. Although in the first embodiment described above the kinematic plate 20 was fixed in such an orientation that the aperture of the carrier 18 confronted the measurement head 10, in this third embodiment, the structure allows for the orientation of the kinematic plate 20 to be rotated. Apart from this, the structure is the same as in the case of the first embodiment described above. In concrete terms, as shown in FIG. 34A, four bolt through holes 346 are provided in the kinematic plate 20, arranged in such positions as to constitute an arrangement which is rotationally symmetric around its central point. Furthermore, a projection 347 is provided in the vicinity of a corner of the kinematic plate 20. On the other hand, four screwed holes 345 are provided to the stage 12 in positions which correspond to the four bolt through holes 346, as shown in FIG. 34E. According to this structure, it is possible to fix the kinematic plate 20 to the stage 12 in any of the four orientations which are shown in FIGS. 34A through 34D by passing fixing bolts 348 through the bolt screw holes 346 and screwing them into the screwed holes 345. Switches 341 through 344 for detecting the presence of the projection 347 are provided to the four side surfaces of the stage 12.

Accordingly, as far as the front surface of the carrier 18 is concerned, i.e. if for example it is desired to measure the XZ surface of the FOUP type carrier 18 of FIG. 14, then, by fixing the kinematic plate 20 to the stage 12 in the orientation shown in FIG. 34A, it is possible to ensure that the front surface of the carrier 18 faces towards the chassis 11 when the carrier 18 is loaded. In the orientation shown in FIG. 34A, the projection 347 of the kinematic plate 20 is detected by the switch 341. Accordingly, if the switch 341 has detected the projection 347, it can be recognized that the kinematic plate 20 is in the proper orientation for measurement of the front surface of the carrier 18. The output signal of the switch 341 is used by a coordinate conversion device 351 which will be described hereinafter for coordinate conversion. In the same manner, if it is desired to measure the left side surface of the carrier 18 (the −yz surface in the xyz coordinate system of the carrier 18; refer to FIG. 14) then the kinematic plate 20 is loaded upon the stage 12 in the orientation shown in FIG. 34B; if it is desired to measure the rear surface of the carrier 18 (its −xz surface) then the kinematic plate is loaded upon the stage 12 in the orientation shown in FIG. 34C; and, if it is desired to measure the right side surface of the carrier 18 (its yz surface) then the kinematic plate is loaded upon the stage 12 in the orientation shown in FIG. 34D.

By rotating the kinematic plate 20 in this manner and fixing its orientation, it is possible, just by loading the carrier 18 upon the pins 20a, 20b and 20c, accurately to orient the carrier 18 in the desired orientation, and to measure its shape from this orientation. Accordingly, it becomes possible accurately to measure the entire shape of the carrier. Since by doing this it is possible to measure with good accuracy the entire shape of a large sized carrier 18 for which automated transport is required because it is difficult to transport it manually, thereby it is possible to ensure the operational reliability of such automated transport.

Further, the rotation of the kinematic plate to set its orientation is performed before loading the carrier 18 upon it. By doing this, there is no danger of subjecting the carrier 18 or the wafers which are loaded into it to any shock by rotation, and there is no disturbance of the attitudes of the carrier 18 or of the wafers. Accordingly, the beneficial result is obtained that it is possible to measure the attitude of the carrier 18 with good accuracy in its state with its position being determined by the kinematic coupling, whatever may be its orientation.

Figure 34B:
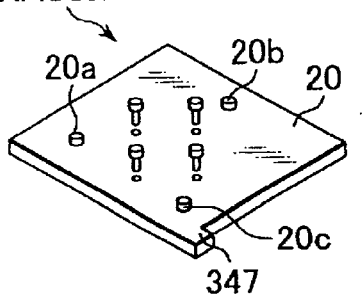
Figure 34C:
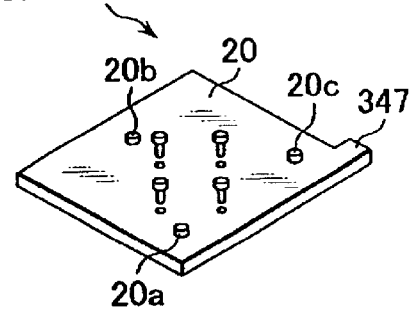
Figure 34D:
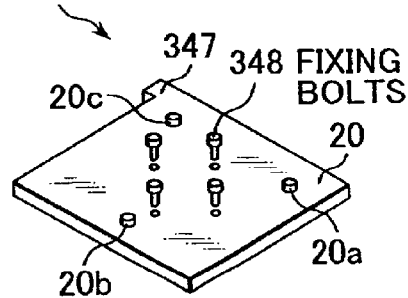
Figure 34E:
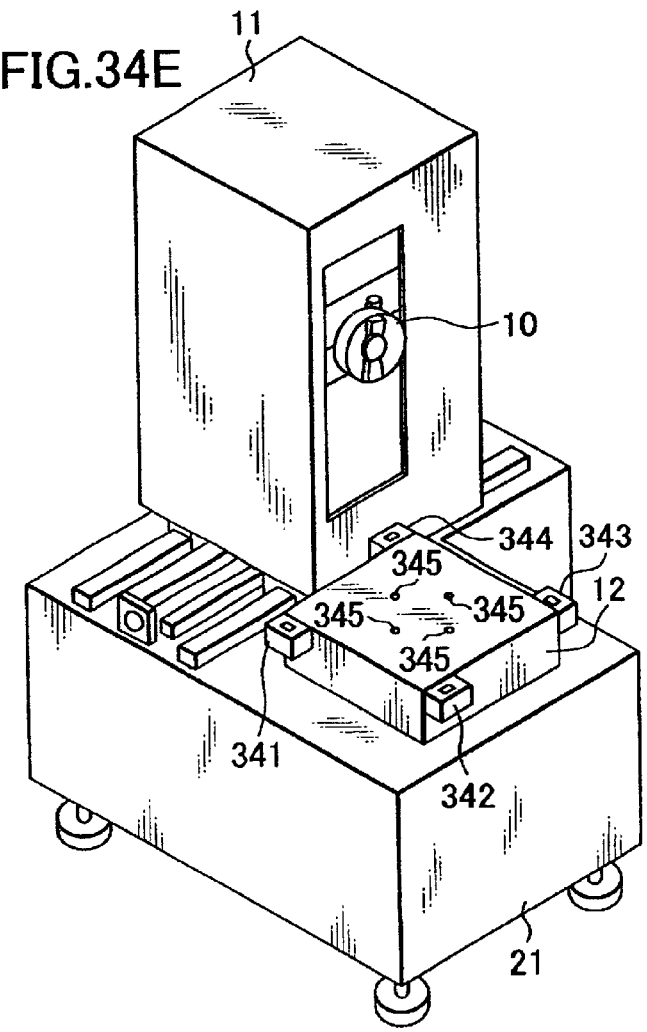
FIG. 34E shows is a perspective view showing the structure of the measurement device main body.

It should be understood that, when the kinematic plate 20 is arranged by being rotated as shown in FIGS. 34A through 34D, the coordinate system (xM, yM) upon the image of the CCD camera 22 (refer to FIG. 36B) corresponds to the xz plane in the xyz coordinate system of the carrier 18 if the orientation is as shown in FIG. 34A. corresponds to the −yz plane if the orientation is as shown in FIG. 34B, corresponds to the −xz plane if the orientation is as shown in FIG. 34C, and corresponds to the yz plane if the orientation is as shown in FIG. 34D. Due to this, the dimension measurement calculation processing section 64 must convert the coordinate axes before deriving the coordinates of various pixels upon the image by superimposing the coordinates of the central point of the image of the CCD camera 22 and the XYZ coordinates of the XYZ counter 56 (the mechanical XYZ coordinates of the X-, Y-, and Z-axis shift sections 15, 16 and 17) which represent the coordinates of the central point. In this third embodiment of the present invention, a coordinate axis conversion device 351 is arranged between the image processing section 111 and the host computer 113, as shown in FIG. 35. This coordinate axis conversion device 351 inputs the outputs of the switches 341 through 344, detects from these outputs in which of the orientations of FIGS. 34A through 34D the kinematic plate is currently arranged, coordinate-converts the coordinates of the output image of the image processing section 111 and the output coordinates of the XYZ counter 56, and transfers the results to the dimension measurement calculation processing section 64.

In concrete terms, when the coordinate axis conversion device 351 has received an output signal from the switch 341, it converts the coordinate axes xM, yM upon the image of the CCD camera 22 into the coordinate axes x and z (FIG. 36A) since the xz surface (the aperture surface) is loaded in the orientation which is being photographed by the CCD camera 22. As an example, if an image like the image 351 of FIG. 35 has been photographed by the CCD camera 22, and the points upon the image 351 are expressed in two dimensions upon the output image plane of the CCD camera 22 with reference to the coordinate axes xM, yM, then, when a third z-dimension is added to these, the coordinates (xM, yM, z) of the point p03 are (5,24, z). Since this xMyM surface corresponds to the xz plane in the axes of the carrier 18, the coordinate axis conversion device 351 establishes a correspondence of the xM to x and of the yM to y and performs coordinate conversion according thereto, so that the coordinates of the point p03 are converted into (5, y, 24) (refer to the image 352 of FIG. 35).

On the other hand, when the coordinate axis conversion device 351 has received an output signal from the switch 342, it converts the coordinate xM of the coordinate axis xM upon the image of the CCD camera 22 into −y, and the coordinate yM of the coordinate axis yM into Z (FIG. 36A), since the −yz surface (the left side surface) is loaded in the orientation which is being photographed by the CCD camera 22. Accordingly, as an example, the coordinates (5, 24, z) before conversion are converted into (x, −5, 24). In the same manner, when the coordinate axis conversion device 351 has received an output signal from the switch 343, it converts the coordinate xM of the coordinate axes xM upon the image of the CCD camera 22 into −x, and the coordinate yM of the coordinate axes yM into Z (FIG. 36A), since the −xz surface (the rear surface) is loaded in the orientation which is being photographed by the CCD camera 22. Accordingly, as an example, the coordinates (5, 24, z) before conversion are converted into (−5, y, 24). In the same manner, when the coordinate axis conversion device 351 has received an output signal from the switch 344, it converts the coordinate xM of the coordinate axes xM upon the image of the CCD camera 22 into y, and the coordinate yM of the coordinate axes yM into z (FIG. 36A), since the yz surface (the right side surface) is loaded in the orientation which is being photographed by the CCD camera 22. Accordingly, as an example, the coordinates (5, 24, z) before conversion are converted into (x, 5, 24).

On the other hand, the coordinate axis conversion device 351 also converts the output coordinates of the XYZ counter 56. Although the surface which confronts the measurement head 10 is given as the XZ plane in the coordinates of the XYZ counter 56, in actual practice the surface which confronts the measurement head 10 is: the xz plane in the coordinate axes of the carrier 18 when the switch 341 is outputting its signal; the −yz plane when the switch 342 is outputting its signal; the −xz plane when the switch 343 is outputting its signal; and the yz plane when the switch 344 is outputting its signal (refer to FIG. 36A) Accordingly, the coordinate axis conversion device 351 converts the coordinates of the XYZ counter 56 which give the position of the central point upon the image from the CCD camera 22 into the coordinate axes of the carrier 18, and transfers the results to the dimension measurement calculation processing section 64. If the switch 341 is outputting its signal, the XZ surface before conversion is converted into the image 354 in the coordinates of the xz plane of the carrier 18 (refer to the images 353 and 354 of FIG. 35). Accordingly, in this case, in actual fact the coordinates are not converted, and the coordinates (130, Y, 210) of the XYZ counter 56 which give the position of the central point of the image from the CCD camera 22 are converted into (130, y, 210) and are transferred to the dimension measurement calculation processing section 64. In the same manner, if the switch 342 is outputting its signal, the coordinate conversion device 351 converts the coordinates (130, Y, 210) of the XYZ counter 56 into (x, −130, 210); if the switch 343 is outputting its signal, it converts them into (−130, y, 210); and, if the switch 344 is outputting its signal, it converts them into (x, 130, 210).

In the dimension measurement calculation processing section 64, calculation is performed to superimpose the coordinates (0, y, 0) of the central point in the output image 352 of the CCD camera 22 after coordinate axis conversion which have been transmitted from the coordinate axis conversion device 351, upon the coordinates (130, y, 210) which have been converted from the coordinates of the XYZ counter 56 which represent the position of the central point, and the coordinates of the various pixels in the image 352 are calculated. The coordinates after calculation are as shown in the image 355 of FIG. 35. Using the coordinates of each point upon the image 355, the dimension measurement calculation processing section 64 performs calculation for the horizontal width and the vertical width of the shape shown in the image 355, as shown in FIG. 35.

In this manner, in this third embodiment of the present invention, by providing the coordinate axis conversion device as explained above, even though the kinematic plate 20 is rotated, it is possible to measure its shape by matching the coordinates to the orientation of the carrier 18.

Moreover, although with this third embodiment of the present invention the structure was such that dimensional calculation was performed using the coordinates which had been converted by the coordinate axis conversion device 351, it would also be acceptable, as an alternative, to perform dimensional calculation using coordinates in the output image of the CCD camera 22 directly, without converting these coordinates, provided that the portion for which it is desired to obtain the dimensions is included in a single image from the CCD camera 22, i.e. in a single screen. For example, it would be possible to obtain the vertical width and the horizontal width of a subject of measurement which was included in a single screen from the CCD camera 22 by performing the calculations shown by the equation 354 in FIG. 35.

Next, a fourth embodiment of the carrier shape measurement device according to the present invention will be described. With this carrier shape measurement device according to this fourth embodiment, just as in the case of the third embodiment, the structure provides for rotation of the kinematic plate 20. By contrast to the case of the third embodiment in which the construction was such that rotation of the kinematic plate 20 was implemented by removing and refixing the fixing bolts 348, in this fourth embodiment, the stage 12 comprises a rotation table 372 and a drive section 373 which rotates this rotation table 372, as shown in FIG. 37. In the rotation table 372 there are provided four screw holes 374 for screwing down the kinematic plate 20. By this screwing down, the center of the three pins 20a, 20b and 20c of the kinematic plate 20 (in other words, the intersection of the facial datum plane 142 and the bilateral datum plane 143) is positionally aligned with the center of rotation 375 of the rotation table 372, and the kinematic plate 20 is fixed upon the rotation table 372. A rotation drive control section 371 is connected to the drive section 373. Further, a detection section which detects the angle of rotation of the rotation table 372 is provided to the drive section 373. This rotation drive control section 371 receives operator commands via the input and output section 114 and the host computer 113, and outputs rotation commands to the drive section 373, whereby the rotation table 372 is rotated by 90 degrees at a time. By doing this, it is possible to perform measurement with the kinematic plate 20 facing in its four different orientations, just as in FIGS. 34A through 34D, so as to measure the front surface of the carrier 18, its left side surface, its rear surface, and its right side surface. Accordingly, it is possible to load the carrier 18 in the desired orientation in the same manner as in the case of the third embodiment described above by the operator orienting the kinematic plate 20 in the desired orientation before loading the carrier 18 upon the kinematic plate 20, and thus it is possible to measure the entire shape of the carrier 18.

It should be understood that the rotational angle information is input to the coordinate axis conversion device 351 from the rotation drive control section 371. The coordinate axis conversion device 351 determines the orientation of the kinematic plate 20 from this rotational angle information, and converts the coordinate axes in the same manner as in the third embodiment described above.

Next, a fifth embodiment of the carrier shape measurement device according to the present invention will be described. Although with this carrier shape measurement device according to this fifth embodiment, just as in the case of the third and fourth embodiments, the structure is such that the orientation in which the carrier 18 is loaded can be changed to any one of four directions, in this fifth embodiment the orientation of the kinematic plate 20 is not rotated, but, rather, the orientations of those from a plurality of kinematic coupling pins which are to be active are changed by selectively projecting the desired combination of said kinematic coupling pins. In detail, referring to FIG. 38, four groups of kinematic coupling pins 20*a* through 20*l* are arranged upon the kinematic plate 20. Among these, the group consisting of the pins 20*a*, 20*b* and 20*c* is a kinematic coupling pin group for measuring the front surface of the carrier 18, in the same manner as shown in FIG. 34A. Further, the group consisting of the pins 20*d*, 20*e* and 20*f* is a kinematic coupling pin group for measuring the left side surface of the carrier 18, in the same manner as shown in FIG. 34B. And the group consisting of the pins 20*g*, 20*h* and 20*i* is a kinematic coupling pin group for measuring the rear surface of the carrier 18, in the same manner as shown in FIG. 34C. Moreover, the group consisting of the pins 20*j*, 20*k* and 20*l* is a kinematic coupling pin group for measuring the right side surface of the carrier 18, in the same manner as shown in FIG. 34D.

Figure 39A:
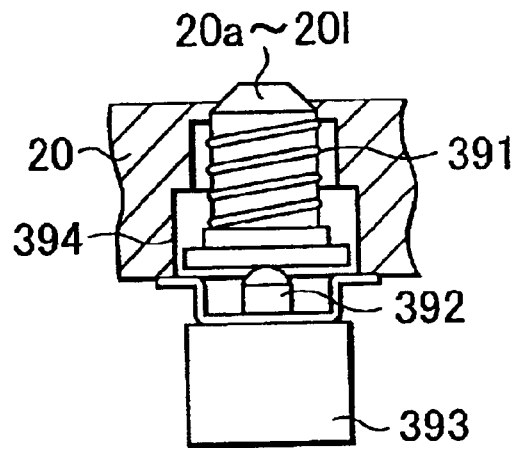
FIGS. 39A and 39B show sectional views and showing the structure of pins 20a through 20l of a plate 20 of the carrier shape measurement device of FIG. 38.
Figure 39B:
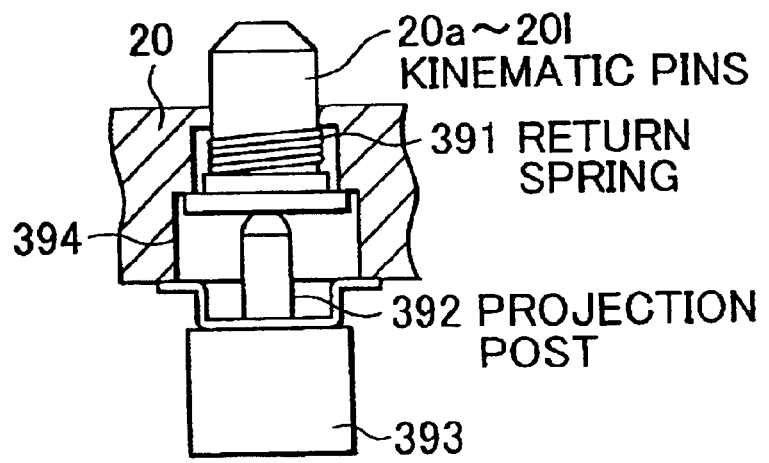

Each of these pins 20*a* through 20*l* is made so as to be able to be projected from the plate 20, or withdrawn thereinto, as desired. In concrete terms, as shown in FIGS. 39A and 39B, each of the pins 20*a* through 20*l* is fitted into a through hole 394 which is provided in the plate 20. A projection post 392 and a drive source 393 which projects and retracts said projection post 392 are arranged at the opening of each of the through holes 394 on the rear surface of the plate 20, for pushing up each of the pins 20*a* through 20*l*. Solenoids or air cylinders or the like may be used for these drive sources 393. Further, a return spring 391 is wound around each of the pins 20*a* through 20*l*. The drive sources 393 are connected to a pin raising and lowering drive control section 381, as shown in FIG. 38.

With this structure, when the pin raising and lowering drive control section 381 outputs signals to the drive sources 393 corresponding to the desired ones of the kinematic coupling pins (for example, the pins 20*a*, 20*b* and 20*c*) which command the projection of these pins, then the drive sources 393 project the corresponding ones of the projection posts 392, so that they assume the state shown in FIG. 39B. By doing this, these pins 20*a*, 20*b* and 20*c* project out from the through holes 394 of the kinematic plate 20, above its main plane. Further, when it is required to withdraw these projecting pins 20*a*, 20*b* and 20*c*, the pin raising and lowering drive control section 381 outputs signals to the drive source 393 which command the withdrawal of these kinematic coupling pins. Due to this, the corresponding projection posts 392 are pulled back by their drive sources 393, and because of the spring force of the return springs 391 the pins 20*a*, 20*b* and 20*c* are pulled back in through the through holes 394, as shown in FIG. 39A.

The pin raising and lowering drive control section 381 receives commands from the operator which indicate the orientation in which the carrier 18 is to be loaded, via the input and output section 114 and the host computer 113, and it projects that group of the four groups of kinematic coupling pins which corresponds to this orientation, while it keeps the other three groups of kinematic coupling pins retracted within the plate 20. If the loading orientation for the carrier 18 which is commanded by the operator is the orientation which is used for measuring the front face thereof, then the group consisting of the pins 20*a*, 20*b* and 20*c* is projected, while the other three groups are kept retracted. Further, if the loading orientation for the carrier 18 which is commanded by the operator is the orientation which is used for measuring the left side face thereof, then the group consisting of the pins 20*d*, 20*e* and 20*f* is projected, while the other three groups are kept retracted. Moreover, if the loading orientation for the carrier 18 which is commanded by the operator is the orientation which is used for measuring the rear face thereof, then the group consisting of the pins 20*g*, 20*h* and 20*i* is projected, while the other three groups are kept retracted. And, if the loading orientation for the carrier 18 which is commanded by the operator is the orientation which is used for measuring the right side face thereof, then the group consisting of the pins 20*j*, 20*k* and 20*l* is projected, while the other three groups are kept retracted.

By this structure, it is possible to project the appropriate ones of the pins 20*a* through 20*l* in the four types of arrangement for measuring the front surface, the left side surface, the rear surface, and the right side surface of the carrier 18, in the same manner as shown in FIGS. 34A through 34D. Accordingly, by the operator arranging to project the appropriate one of the groups of pins 20*a* through 20*l* which corresponds to the desired orientation for the carrier 18 before the carrier 18 is loaded upon the kinematic plate 20, it is possible to load the carrier 18 in the desired orientation, and it is possible to perform measurement of the entire shape of the carrier 18, in the same manner as with the third and the fourth embodiments described above.

It should be understood that information as to which of the groups of the pins 20*a* through 20*l* is projected is input from the pin raising and lowering drive control section 381 to the coordinate axis conversion device 351. This coordinate axis conversion device 351 detects the orientation in which the carrier 18 is loaded from this information as to which of the groups of pins is projected, and performs conversion of the coordinate axes in the same manner as with the third and the fourth embodiments described above.

Figure 42A:
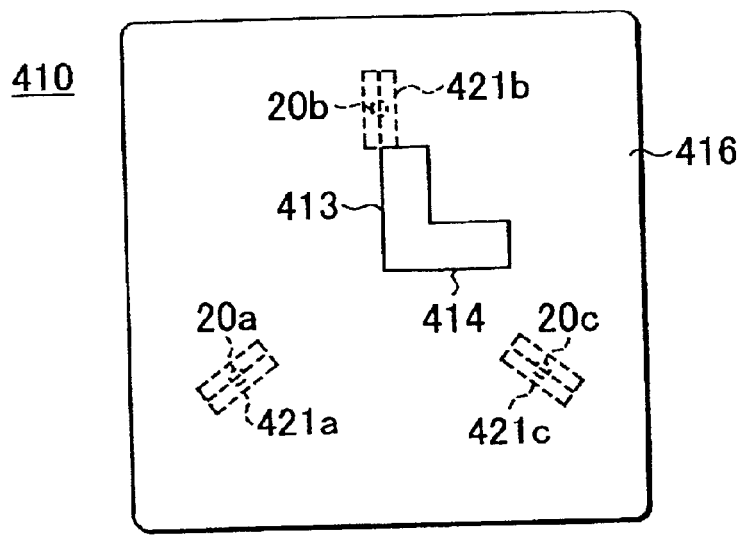
FIGS. 42A, 42B and 42C a plan view, a side view, and another side view, of a right angle jig 410 which is used in the adjustment operation of FIGS. 40 and 41.
Figure 42B:
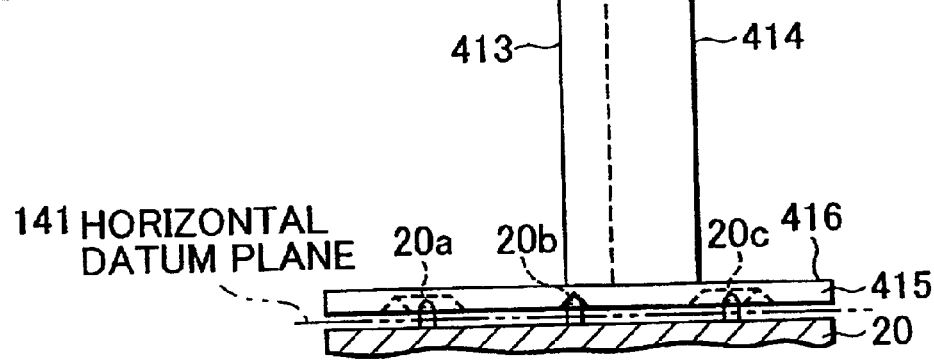
Figure 42C:
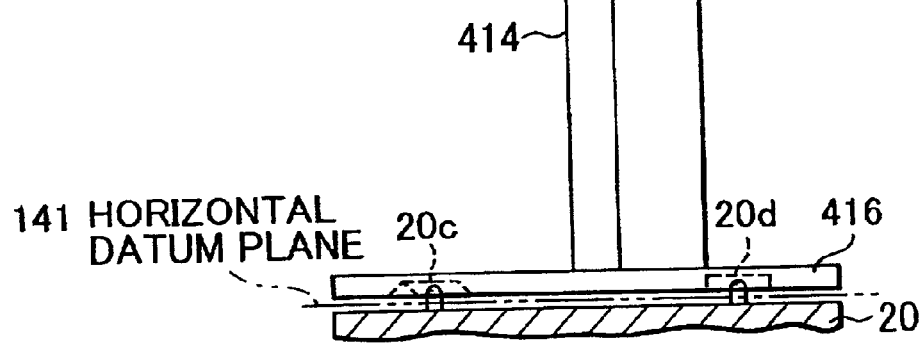
Figure 43:
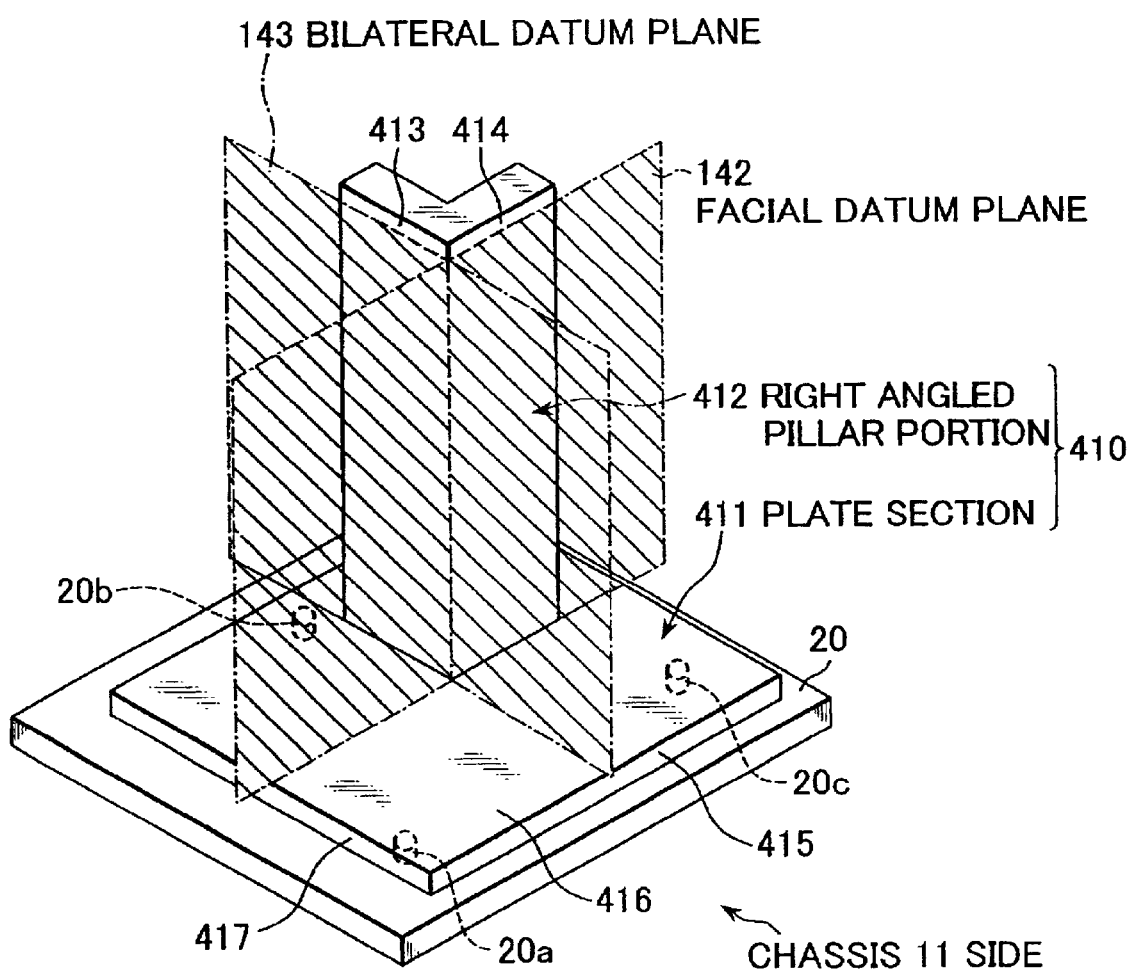
FIG. 43 shows an explanatory figure showing the relationship between the a right angle jig 410 which is used in the adjustment operation of FIGS. 40 and 41 and the datum planes.

In the above described first embodiment, as shown in FIG. 15, the kinematic plate 20 was made to have surfaces 151, 152 and 153 which were respectively parallel to the horizontal datum plane 141, the facial datum plane 142, and the bilateral datum plane 143, and the axial directions of the X-, Y-, and Z-axis shift sections 15, 16 and 17 were adjusted (see FIGS. 26 and 27) by taking advantage of these surfaces 151, 152 and 153. However, it is also possible to form the kinematic plate 20 not to have surfaces which are parallel to the datum planes 141, 142 and 143. In this case, it is possible to perform adjustment of the axial directions of the X-, Y-, and Z-axis shift sections 15, 16 and 17 by using a right angle jig (member) 410, as shown in FIGS. 42 and 43.

This right angle jig 410 comprises a plate portion 411 and a right angled pillar portion 412 which is fixed to the upper surface of the plate portion 411. Upon the rear surface of the plate portion 411 there are formed V-groove shaped concave members 421*a*, 421*b* and 421*c* which engage in kinematic coupling with the pins 20*a*, 20*b* and 20*c* when it is loaded upon the plate 20. Further, the upper surface 416 of the plate portion 411 is formed so as to constitute a surface which is parallel with the horizontal datum plane 141, in the state in which the right angle jig 410 has been loaded upon the plate 20 has been loaded by this kinematic coupling. Moreover, the side surface 415 of the front side (the chassis 11 side) of the plate portion 411 is formed so as to constitute a surface which is parallel with the facial datum plane 142, and its side edge surface 417 is formed so as to constitute a surface which is parallel with the bilateral datum plane 143. The right angled pillar portion 412 has side surfaces 413 and 414 which are mutually at right angles, and is arranged so that these surfaces respectively coincide with the facial datum plane 142 and the bilateral datum plane 143.

Figure 40:
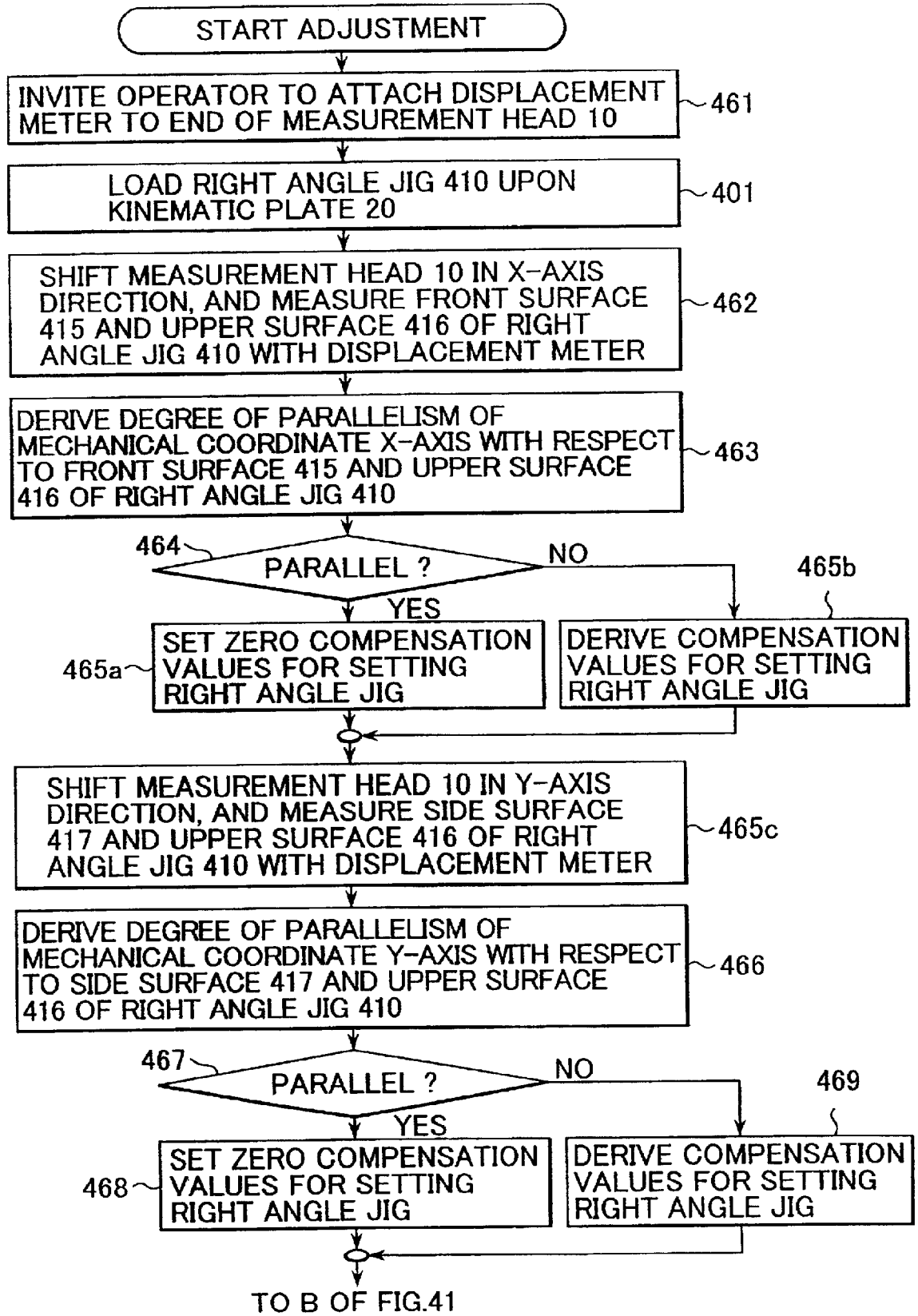
FIG. 40 shows a flow chart showing, for the carrier shape measurement device according to the first embodiment of the present invention, a method for adjustment of the axis directions of the X-, Y- and Z-axis shift sections 15, 16 and 17, when the plate 20 is made so as not to include any datum plane.
Figure 41:
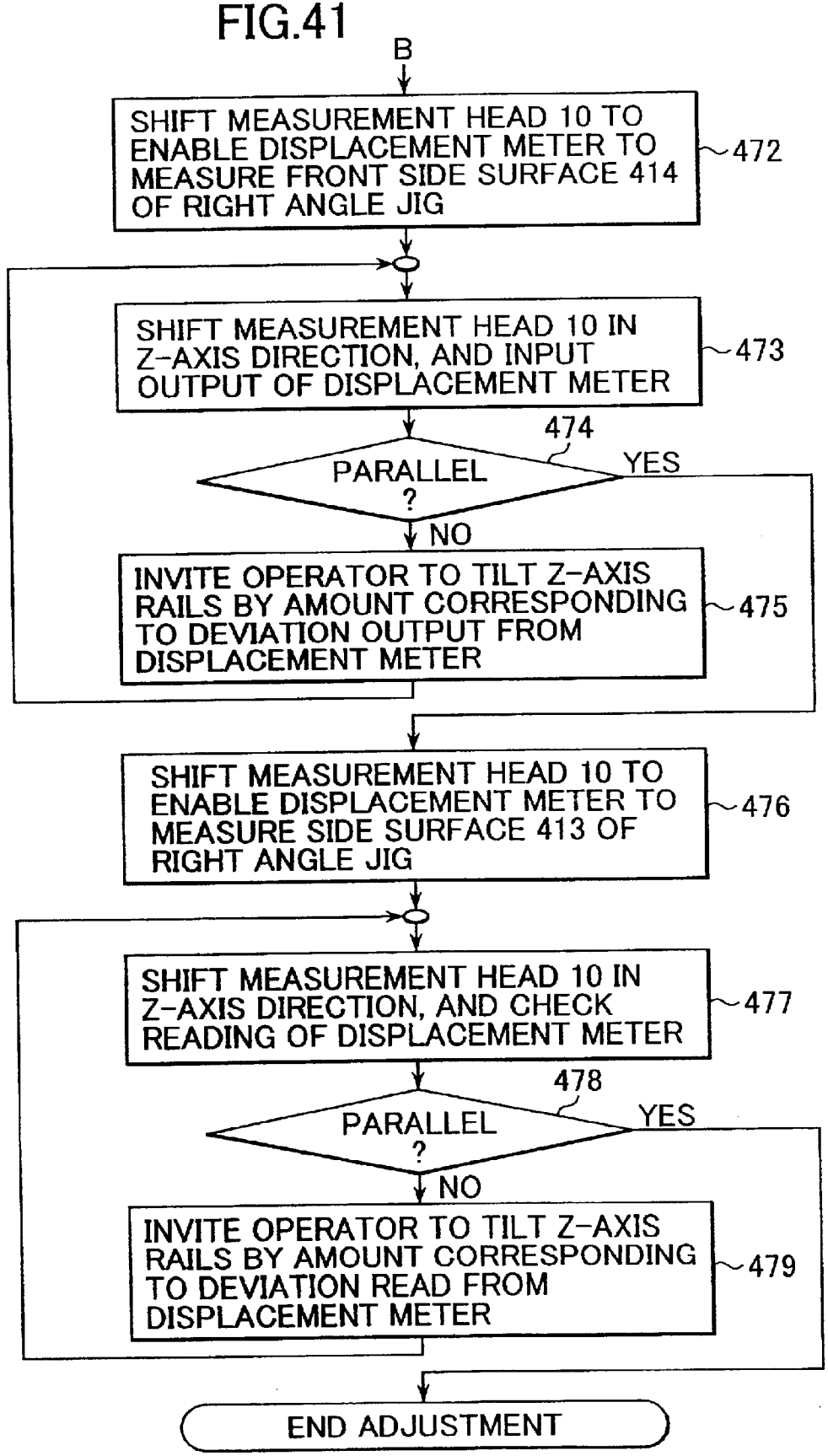
FIG. 41 shows another flow chart showing, for the carrier shape measurement device according to the first embodiment of the present invention, a method for adjustment of the axis directions of the X-, Y- and Z-axis shift sections 15, 16 and 17, when the plate 20 is made so as not to include any datum plane.

The procedure for adjusting the X-, Y- and Z-axes of the X-, Y-, and Z-axis shift sections 15, 16 and 17 by using this right angle jig 410 will now be explained in outline with reference to the flow charts which are given in FIGS. 40 and 41. This adjustment procedure is basically the same as that for the first embodiment described above whose flow chart was shown in FIGS. 26 and 27, except for the point that after a step 261 the right angle jig 410 is loaded upon the kinematic plate 20. In more detail, since the kinematic plate 20 does not have any surfaces which are parallel to the datum planes 141, 142 and 143, it is necessary for the right angle jig 410 to be loaded first, in order to perform the procedure of adjustment of the X-Y-axes using the surfaces 415, 416 and 417 of the right angle jig 410. Accordingly, the operations performed in the steps S462 through S469 of the FIG. 40 flow chart are basically the same as the operations performed in the corresponding steps S262 through S269 of the FIG. 26 flow chart, except for the point that in the steps of the FIG. 26 flow chart the front edge surface 152, the upper surface 151, and the side edge surface 153 of the plate 20 were utilized, while in the steps of the FIG. 40 flow chart the front edge surface 415, the upper surface 416, and the side edge surface 417 of the right angle jig 410 are utilized. It is possible to perform the adjustment by these steps of the FIG. 40 flow chart of the X-axis and the Y-axis of the X-Y-axis shift sections 15 and 16 in software by compensation values. In the same manner, the steps S472 through S479 of the flow chart of FIG. 41 are basically the same as the operations performed in the corresponding steps S272 through S279 of the FIG. 27 flow chart, except for the point that in the steps of the FIG. 27 flow chart the front edge surface 252 and the side edge surface 413 of the plate 20 were utilized, while in the steps of the FIG. 41 flowchart the front edge surface 414 and the side edge surface 413 of the right angle jig 410 are utilized. It is possible to perform the adjustment of the Z-axis of the Z-axis shift section 17 mechanically by these steps of the FIG. 41 flow chart.

Further, although with the first embodiment of the shape measurement device of the present invention the kinematic plate 20 was loaded upon the stage 12 in order to support the carrier 18 by kinematic coupling, it would be possible for the structure to provide the kinematic coupling pins 20a, 20b and 20c directly on the upper surface of the stage 12.

As has been described above, since in the shape measurement devices according to the first through the fifth embodiments of the present invention described above it is possible to measure the shape of the carrier 18 in its state in which it is supported upon the kinematic plate 20 by the kinematic coupling with its position being determined thereby, therefore it is possible to achieve the attitude of the carrier upon a semiconductor production line, and it is possible to measure the shape and the attitude of the carrier and the wafers with good accuracy in its state.

What is claimed is:

1. A carrier shape measurement device, comprising:
    a stage which supports a carrier which is to be a subject of measurement; and
    a measurement section which measures a shape of the carrier, wherein
    said stage comprises kinematic coupling pins to support the carrier by a kinematic coupling; and
    said measurement section specifies a horizontal datum plane based upon said kinematic coupling pins and a vertical datum plane vertical to the horizontal datum plane, and measures the shape of the carrier based upon the horizontal datum plane and the vertical datum plane.

2. A carrier shape measurement device according to claim 1, wherein said stage comprises a surface which coincides with or is parallel to at least one of the horizontal datum plane and the vertical datum plane.

3. A carrier shape measurement device according to claim 2, wherein said measurement section measures the shape of the carrier by taking as a reference said coinciding or parallel surface of said stage.

4. A carrier shape measurement device according to claim 2, further comprising:
    a shifting section which shifts said measurement section relatively to the carrier, wherein
        a direction of shifting by said shifting section is parallel or perpendicular to said coinciding or parallel surface of said stage.

5. A carrier shape measurement device according to claim 1, further comprising:
    a calculation section which calculates results of measurement by said measurement section, wherein
        said calculation section derives coordinates of a center of a wafer which is loaded into the carrier by substituting coordinates of a plurality of points upon an edge of the wafer which have been measured by said measurement section, into a predetermined equation.

6. A carrier shape measurement device according to claim 1, wherein:
    said kinematic coupling pins comprises three pins arranged in a predetermined arrangement; and
    in order to support the carrier in a desired orientation with said kinematic coupling pins, said stage is made with such a structure that an orientation of the arrangement of said three pins upon said stage can be changed while the arrangement is being maintained relatively between said three pins.

7. A carrier shape measurement device according to claim 6, wherein:
    said stage comprises a plate which comprises said kinematic coupling pins, and a support portion upon which said plate is loaded; and
    said support portion comprises a mechanism which can change a loading direction of said plate, in order to change the orientation of the arrangement of said three pins.

8. A carrier shape measurement device according to claim 7, further comprising:
    a dimension calculation section which calculates dimensions of the carrier from results of measurement by said measurement section, wherein
        said dimension calculation section calculates the dimensions of the carrier either by using coordinates which result from said measurements just as they are, or by using coordinates which have been converted by said coordinate conversion section.

9. A carrier shape measurement device according to claim 6, wherein said stage comprises a plate which comprises said kinematic coupling pins, and a rotation section which rotates said plate.

10. A carrier shape measurement device according to claim 6, wherein said stage comprises a plurality of kinematic coupling pins whose arrangements of the three pins differ from one another, a mechanism section for projecting and retracting said plurality of kinematic coupling pins from said stage, and a control section which controls said mechanism section so as to selectively to project one of said plurality of kinematic coupling pins from said stage.

11. A carrier shape measurement device according to claim 6, further comprising:
   a coordinate conversion section which converts coordinates of results of measurement according to the orientation of said kinematic coupling pins upon said stage.

12. A carrier shape measurement device according to claim 1, wherein said stage comprises a surface which coincides with or is parallel to a surface based upon a designed shape of the carrier.

13. A carrier shape measurement device according to claim 12, wherein said measurement section measures a shape of the carrier by comparison with said coinciding or parallel surface of said stage.

14. A carrier shape measurement device, comprising:
   a stage which supports a carrier which is to be a subject of measurement; and
   a measurement section which measures a shape of the carrier, wherein:
      said stage comprises kinematic coupling pins to support the carrier by a kinematic coupling; and
      said stage comprises a mechanism section which vibrates said kinematic coupling pins.

15. A carrier shape measurement device according to claim 14, further comprising:
   a detection section which detects whether or not an engagement between the carrier and said kinematic coupling pins is normal; and
   a control section which, if said detection section has detected that said engagement is normal, stops vibrating by said mechanism section.

16. A carrier shape measurement device, comprising:
   a stage which supports a carrier which is to be a subject of measurement; and
   a measurement section which measures a shape of the carrier, wherein:
      said stage comprises kinematic coupling pins to support the carrier by a kinematic coupling; and
      each of said kinematic coupling pins comprises an air ejection orifice for ejecting air from its tip towards the carrier, and a flow conduit which conducts air to said air ejection orifice.

17. A carrier shape measurement device according to claim 16, further comprising:
   a detection section which detects whether or not an engagement between the carrier and said kinematic coupling pins is normal; and
   a control section which, if said detection section has detected that said engagement is normal, stops supplying air to said flow conduit.

18. A carrier shape measurement device comprising:
   a stage which supports a carrier which is to be a subject of measurement;
   a measurement section which measures a shape of the carrier; and
   a calculation section which calculates results of measurement by said measurement section, wherein:
      said stage comprises kinematic coupling pins to support the carrier by a kinematic coupling; and
      said calculation section derives coordinates of a center of a wafer which is loaded into the carrier by adding a dead weight bending amount, which has been determined in advance from a weight of the wafer, to at least one of coordinates of a wafer support portion of the carrier which have been measured by said measurement section, and coordinates of a point upon an edge of the wafer which have been measured by said measurement section.

19. A carrier shape measurement device comprising:
   a stage which supports a carrier which is to be a subject of measurement;
   a measurement section which measures a shape of the carrier; and
   a calculation section which calculates results of measurement by said measurement section, wherein:
      said stage comprises kinematic coupling pins to support the carrier by a kinematic coupling; and
      said calculation section, by using coordinates of left and right wafer support portions of the carrier which have been measured by said measurement section, derives an inclination of a wafer which is loaded into the carrier and which is supported by said wafer support portions.

20. A carrier shape measurement device, comprising:
   a stage which supports a carrier which is to be a subject for measurement;
   an imaging section which forms an image of the carrier, an optical axis of the imaging section being substantially parallel to a plane of a wafer which is loaded into the carrier; and
   a calculation section which calculates image formation results of said imaging section, wherein
      said imaging section comprises an objective lens, and an operational distance of said objective lens is longer than a distance from an opening of an aperture for taking a wafer out from the carrier and inserting it thereinto, to a wafer support portion within the carrier.

21. A carrier shape measurement device, comprising:
   a stage which supports a carrier which is to be a subject of measurement; and
   a measurement section which measures a shape of the carrier, wherein
      said stage comprises a surface which coincides with or is parallel to a vertical datum plane based upon which said measurement section measures the shape of the carrier.

22. A carrier shape measurement device according to claim 21, wherein:
   said stage comprises a surface which coincides with or is parallel to a horizontal datum plane based upon which said measurement section measures the shape of the carrier.

23. A carrier shape measurement device according to claim 22, wherein:
   said stage comprises kinematic coupling pins to support the carrier by a kinematic coupling; and
   said measurement section specifies the horizontal datum plane based upon said kinematic coupling pins and the vertical datum plane vertical to the horizontal datum plane.

* * * * *